United States Patent
Nose et al.

(10) Patent No.: US 11,296,563 B2
(45) Date of Patent: *Apr. 5, 2022

(54) ROTOR, MOTOR, METHOD FOR MANUFACTURING ROTOR, AND METHOD FOR MANUFACTURING MOTOR

(71) Applicant: Denso Corporation, Kariya (JP)

(72) Inventors: Takaki Nose, Kosai (JP); Takumi Murayama, Toyohashi (JP); Toshihiro Nagata, Aichi-ken (JP); Yuuma Kobayashi, Kosai (JP); Yuuji Yamashita, Toyohashi (JP); Takafumi Yamano, Toyohashi (JP); Daisuke Koyano, Hamamatsu (JP)

(73) Assignee: Denso Corporation, Kariya (JP)

( * ) Notice: Subject to any disclaimer, the term of this patent is extended or adjusted under 35 U.S.C. 154(b) by 256 days.

This patent is subject to a terminal disclaimer.

(21) Appl. No.: 16/528,883

(22) Filed: Aug. 1, 2019

(65) Prior Publication Data
US 2019/0386529 A1 Dec. 19, 2019

Related U.S. Application Data

(62) Division of application No. 15/338,943, filed on Oct. 31, 2016, now Pat. No. 10,432,044.

(30) Foreign Application Priority Data

Nov. 2, 2015 (JP) ................. 2015-216018
Jan. 26, 2016 (JP) ................. 2016-012477
(Continued)

(51) Int. Cl.
*H02K 15/03* (2006.01)
*B21D 28/26* (2006.01)
(Continued)

(52) U.S. Cl.
CPC ............ *H02K 1/272* (2013.01); *B21D 28/26* (2013.01); *H02K 1/02* (2013.01); *H02K 1/146* (2013.01);
(Continued)

(58) Field of Classification Search
CPC .... H02K 15/022; H02K 15/03; H02K 15/095; H02K 1/272; H02K 1/02; H02K 1/146;
(Continued)

(56) References Cited

U.S. PATENT DOCUMENTS 4,144,469 A * 3/1979 Miyashita .............. H02K 21/46
310/156.28
2007/0230842 A1 10/2007 Tamaoka et al.
(Continued)

FOREIGN PATENT DOCUMENTS

JP S50-148503 U 2/1975
JP S 57-113755 A 7/1982
(Continued)

*Primary Examiner* — Michael Andrews
(74) *Attorney, Agent, or Firm* — Patterson Thuente Pedersen, P.A.

(57) ABSTRACT

A rotor includes a rotor core, permanent magnets, and a tubular non-magnetic cover. The permanent magnets are arranged along an outer surface of the rotor core in the circumferential direction. The permanent magnets each include a curved outer surface as viewed in the axial direction. The tubular non-magnetic cover covers the outer surfaces of the permanent magnets. The rotor core includes at least two stacked cores. Each stacked core includes a stack of core sheets. One of the stacked cores is formed from a material having a lower hardness than the other stacked core.

11 Claims, 28 Drawing Sheets

(30) Foreign Application Priority Data

| Feb. 12, 2016 | (JP) | 2016-024702 |
|---|---|---|
| May 19, 2016 | (JP) | 2016-100729 |
| Aug. 24, 2016 | (JP) | 2016-164045 |
| Aug. 24, 2016 | (JP) | 2016-164046 |
| Aug. 24, 2016 | (JP) | 2016-164047 |
| Oct. 25, 2016 | (JP) | 2016-208872 |

(51) Int. Cl.

| H02K 1/27 | (2006.01) |
|---|---|
| H02K 1/272 | (2022.01) |
| H02K 1/18 | (2006.01) |
| H02K 1/278 | (2022.01) |
| H02K 1/28 | (2006.01) |
| H02K 5/173 | (2006.01) |
| H02K 21/14 | (2006.01) |
| H02K 1/02 | (2006.01) |
| H02K 1/14 | (2006.01) |
| H02K 3/18 | (2006.01) |
| H02K 5/16 | (2006.01) |
| H02K 15/02 | (2006.01) |
| H02K 15/095 | (2006.01) |

(52) U.S. Cl.
CPC ............. *H02K 1/185* (2013.01); *H02K 1/278* (2013.01); *H02K 1/28* (2013.01); *H02K 3/18* (2013.01); *H02K 5/161* (2013.01); *H02K 5/1732* (2013.01); *H02K 15/022* (2013.01); *H02K 15/03* (2013.01); *H02K 15/095* (2013.01); *H02K 21/14* (2013.01); *H02K 2213/03* (2013.01)

(58) Field of Classification Search
CPC .......... H02K 1/28; H02K 1/185; H02K 1/278; H02K 3/18; H02K 21/14; H02K 2213/03; H02K 5/161; H02K 5/1732; B21D 28/26
USPC .................... 310/156.28, 156.29, 156.31
See application file for complete search history.

(56) References Cited

U.S. PATENT DOCUMENTS

| 2012/0313474 | A1* | 12/2012 | Yamamura | H02K 1/278 |
| | | | | 310/156.21 |
| 2014/0021831 | A1 | 1/2014 | Hayashi et al. | |
| 2014/0210284 | A1 | 7/2014 | Banba et al. | |
| 2014/0265699 | A1 | 9/2014 | Morikawa et al. | |
| 2015/0381017 | A1 | 12/2015 | Kitaji et al. | |
| 2017/0229929 | A1* | 8/2017 | Fahrenbach | H02K 1/24 |

FOREIGN PATENT DOCUMENTS

| JP | S59-145248 U | 9/1984 |
| JP | H05-111204 A | 4/1993 |
| JP | H05-276716 A | 10/1993 |
| JP | 2004/023854 A | 1/2004 |
| JP | 2005-278316 A | 10/2005 |
| JP | 2007-278313 A | 10/2007 |
| JP | 2007-318831 A | 12/2007 |
| JP | 2009-071994 A | 4/2009 |
| JP | 2011-091969 A | 5/2011 |
| JP | 2012-115016 A | 6/2012 |
| JP | 2014-023352 A | 2/2014 |
| JP | 2014-079054 A | 5/2014 |
| JP | 2014-147172 A | 8/2014 |
| JP | 2014/147177 A | 8/2014 |
| JP | 2014-160521 A | 9/2014 |
| JP | 2014-161210 A | 9/2014 |
| JP | 2015-023680 A | 2/2015 |
| JP | 2015-231254 A | 12/2015 |
| JP | 2016-010294 A | 1/2016 |

\* cited by examiner

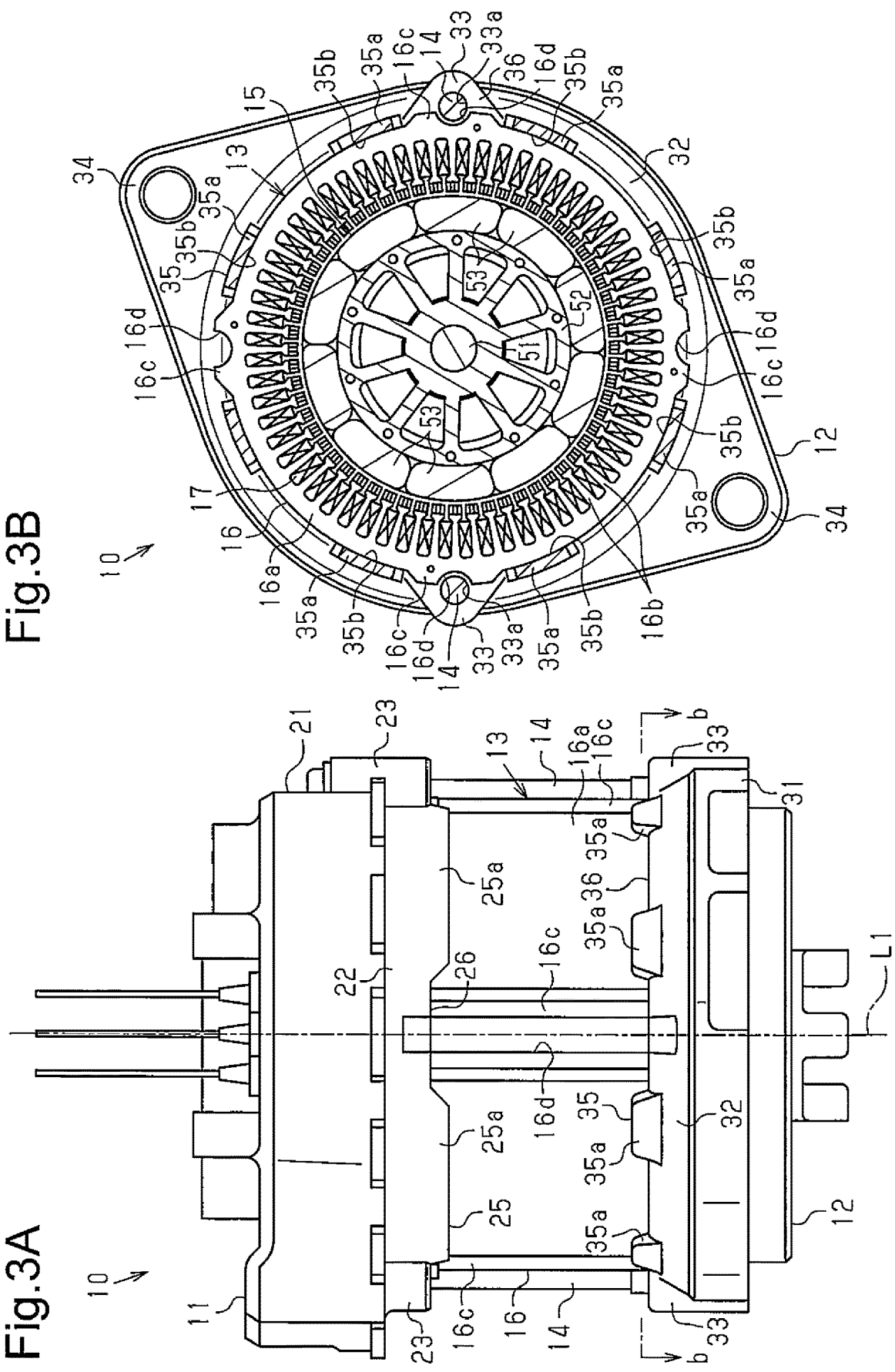

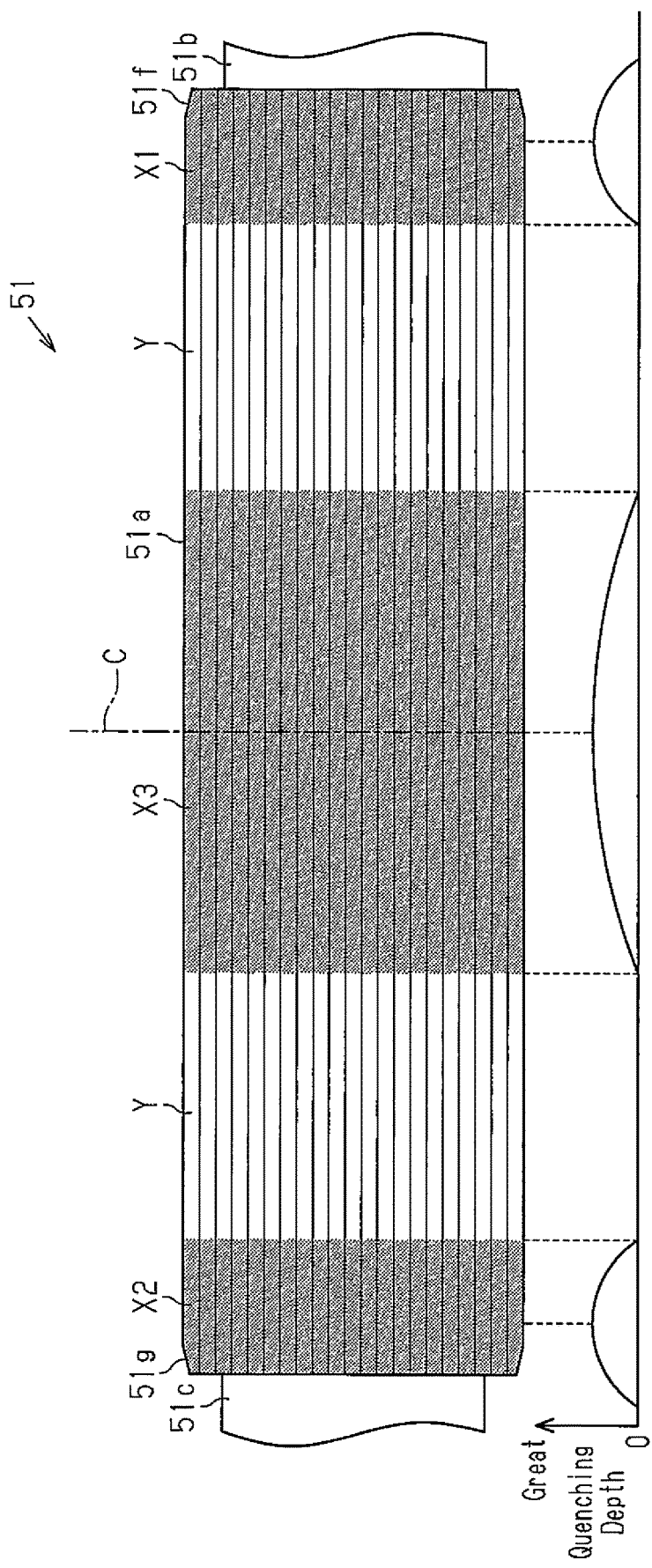

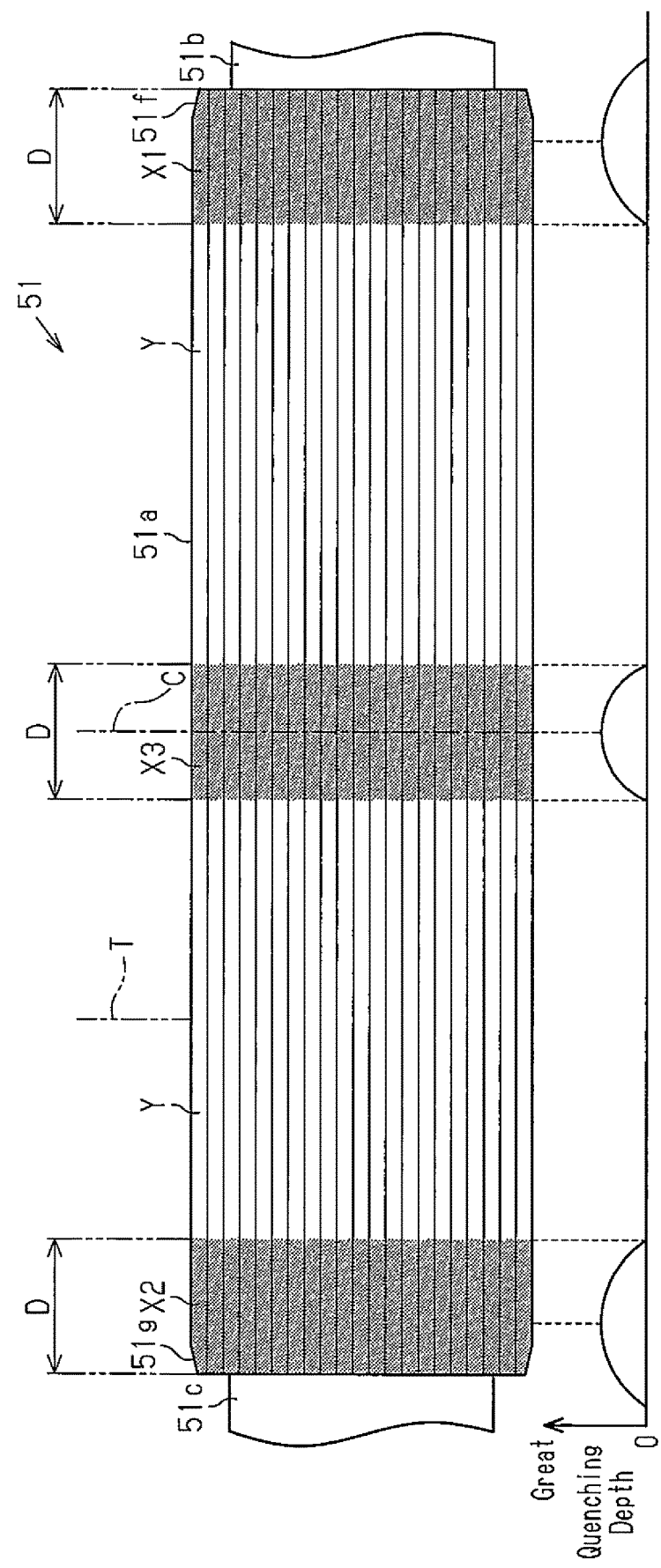

ROTOR, MOTOR, METHOD FOR MANUFACTURING ROTOR, AND METHOD FOR MANUFACTURING MOTOR

RELATED APPLICATION

This application is a division of application Ser. No. 15/338,943 filed Oct. 31, 2016, which claims the benefit of Japanese Application No. 2015-216018, filed Nov. 2, 2015, Japanese Application No. 2016-012477, filed Jan. 26, 2016, Japanese Application No. 2016-100729, filed May 19, 2016, Japanese Application No. 2016-024702, filed Feb. 12, 2016, Japanese Application No. 2016-164045, filed Aug. 24, 2016, Japanese Application No. 2016-164046, filed Aug. 24, 2016, Japanese Application No. 2016-164047, filed Aug. 24, 2016, and Japanese Application No. 2016-208872, filed Oct. 25, 2016, each of which is hereby fully incorporated herein by reference.

BACKGROUND ART

The present invention relates to a method for manufacturing a motor including a stator core and a rotor core that are formed by stacking magnetic metal plates.

As shown in FIG. 12, one type of a conventional motor includes a stator core 1 that is formed by stacking magnetic metal plates and a rotor core 2 that is also formed by stacking magnetic metal plates. The stator core 1 is a stack of stator core sheets 3, each formed by pressing and punching sheet metal. The rotor core 2 is also a stack of rotor core sheets 4, each formed by pressing and punching sheet metal.

A rotation shaft 5 is inserted through the rotor core 2 to form a rotor 6. The two ends of the rotation shaft 5 are rotationally supported by a frame. The stator core 1 generates magnetic force that rotates the rotor 6. The rotation shaft 5, which is rotated together with the rotor 6, outputs a certain rotation force.

In such a motor, magnetic plates 7 are coupled to the two axial ends of the stator core 1. Each magnetic plate 7 has an L-shaped cross-section to form a rotor opposing portion 8 that reduces leakage flux and increases the output of the motor.

Japanese Laid-Open Patent Publication No. 2014-147177 discloses a motor that includes magnetic plates like those described above on a stator core.

In a motor such as that described above, the stator core sheets 3 and the rotor core sheets 4 are formed by punching the same magnetic steel sheets. The rotor core sheets 4 are punched at inner sides of the portions where the stator core sheets 3 are punched, and the stator core sheets 3 and the rotor core sheets 4 are punched one at a time. Such a pressing process is repeated to manufacture the same number of the stator core sheets 3 and the rotor core sheets 4.

However, the magnetic plates 7 increase the axial length of the stator core. Thus, more rotor core sheets 4 than stator core sheets 3 are necessary to form the rotor core 2. Hence, when the stator core sheets 3 and the rotor core sheets 4 are punched from the same magnetic plate, there will not be enough rotor core sheets 4, that is, there will be lacking sheets 4a.

When pressing the rotor core sheets 4 and the stator core sheets 3 in accordance with the required number of the rotor core sheets 4, unnecessary stator core sheets will be produced. This increases the manufacturing cost.

In the above-described publication disclosing the motor, there is no reference to the manufacturing of the lacking rotor core sheets.

SUMMARY OF THE INVENTION

It is an object of the present invention to provide a method for manufacturing a motor including a different number of rotor core sheets and stator core sheets that simplifies the manufacturing process of the rotor core and reduces costs.

To achieve the above object, one aspect of the present invention is a rotor including a rotor core, permanent magnets, and a tubular non-magnetic cover. The permanent magnets are arranged on an outer surface of the rotor core in a circumferential direction. The permanent magnets each have a curved outer surface as viewed in an axial direction. The tubular non-magnetic cover covers the outer surfaces of the permanent magnets. The rotor core includes at least two stacked cores. The stacked cores each include a stack of core sheets. One of the stacked cores is formed from a material having a lower hardness than another one of the stacked cores.

BRIEF DESCRIPTION OF THE DRAWINGS

FIG. 3A is side view of the motor shown in FIG. 2.

FIG. 3B is a cross-sectional view of the motor taken along line b-b in FIG. 3A.

FIG. 34 is a schematic diagram illustrating quenched sections of a rotation shaft shown in FIG. 32.

FIG. 35 is a schematic diagram illustrating quenched sections of a rotation shaft in a further example of the fourth embodiment.

DETAILED DESCRIPTION OF THE PREFERRED EMBODIMENTS

A first embodiment of the present invention will now be described with reference to FIGS. 1 to 12.

Figure 1:
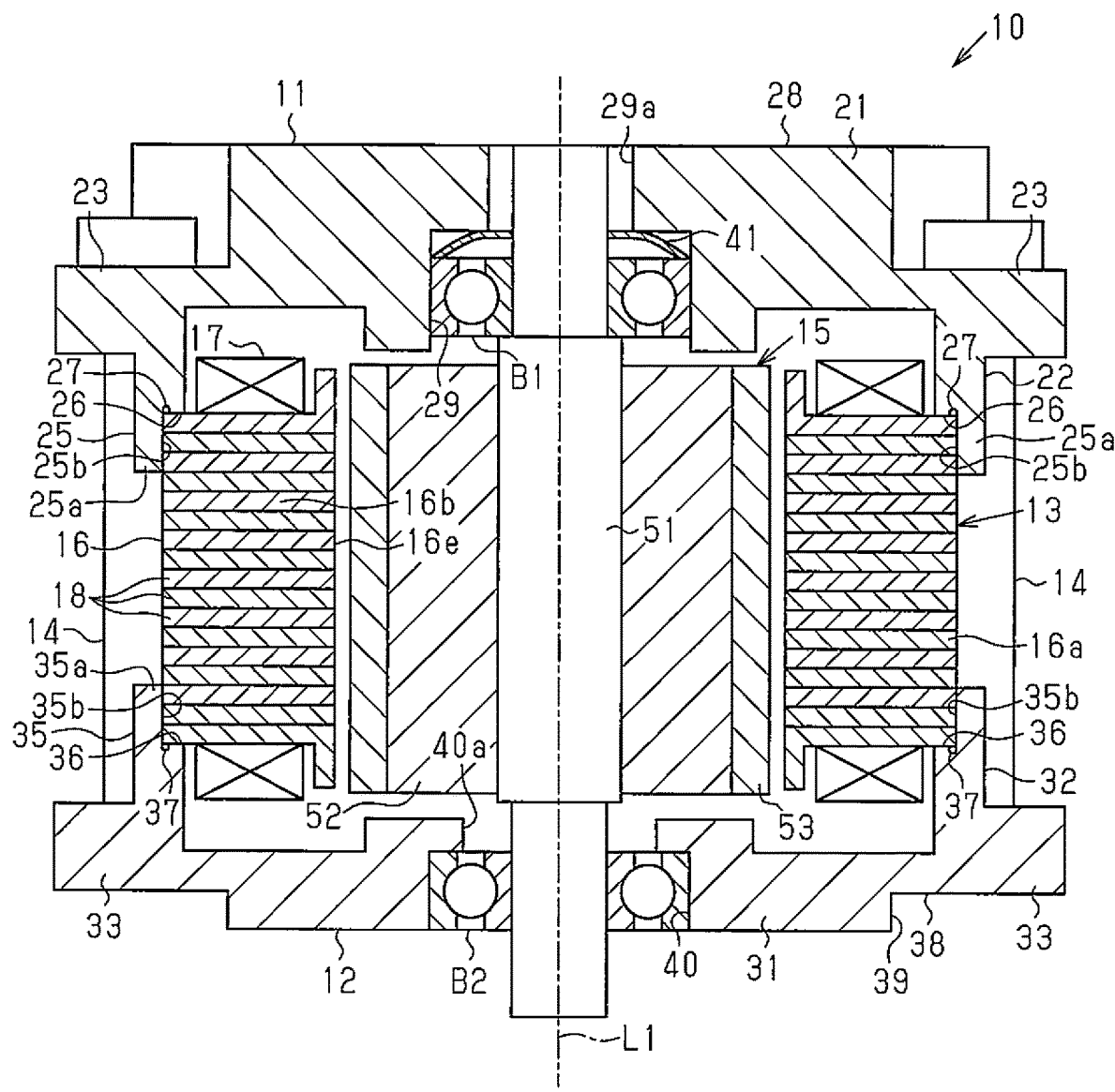
FIG. 1 is a schematic cross-sectional view showing the structure of a motor according to a first embodiment of the present invention.

As shown in FIG. 1, the motor 10 includes a first end frame 11 (hereinafter referred to as the first frame 11) and a second end frame 12 (hereinafter referred to as the second frame 12) that hold an annular stator 13 in the axial direction. The first frame 11 and the second frame 12 are fixed to each other by a plurality of (two in the present embodiment) through bolts 14 arranged in the outer circumference of the stator 13. A rotor 15 is rotationally arranged at the inner side of the stator 13. In the present embodiment, the end frame that holds the stator 13 at the side (upper side as viewed in FIG. 1) opposite to the output side in the axial direction of the motor 10 is referred to as the first frame 11, and the end frame that holds the stator 13 at the output side is referred to as the second frame.

Figure 2:
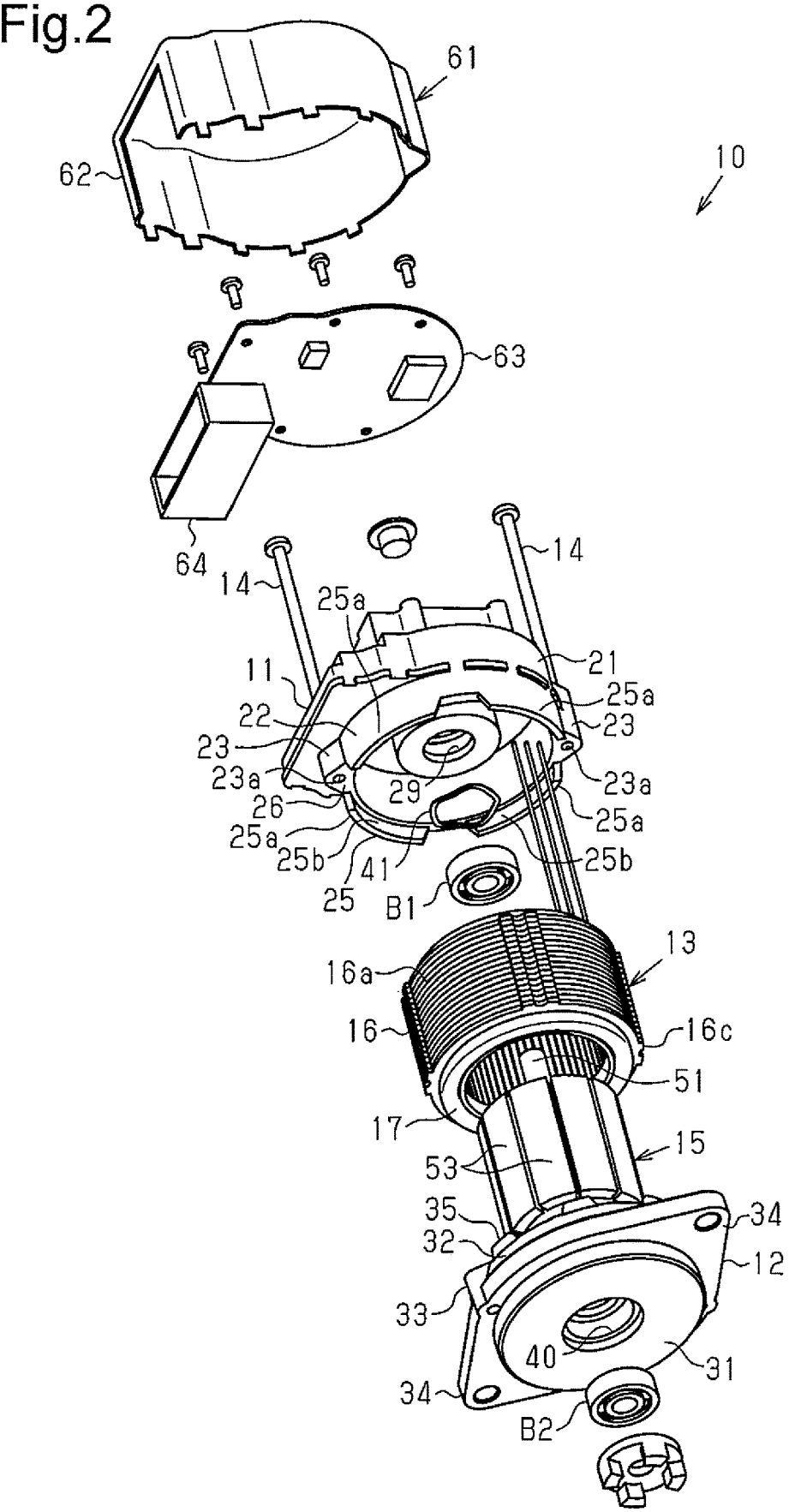
FIG. 2 is an exploded perspective view of the motor shown in FIG. 1.

As shown in FIGS. 1 and 2, the stator 13 includes an annular stator core 16 and coils 17 wound around the stator core 16. As shown in FIG. 3B, the stator core 16 includes a ring-shaped annular portion 16a, a plurality of (60 in the present embodiment) teeth 16b extending radially inward from the annular portion 16a and arranged in the circumferential direction, and four core outer circumference projections 16c projecting radially outward from the outer circumferential surface of the annular portion 16a and extending in the axial direction. The outer circumferential surface of the annular portion 16a is cylindrical, and the two axial end surfaces of the annular portion 16a are flat and orthogonal to the axial direction. The coils 17 are wound around the teeth 16b.

As shown in FIGS. 3A and 3B, the core outer circumference projections 16c are located at four positions in the outer circumferential surface of the annular portion 16a at equal angular intervals in the circumferential direction (90° intervals in the present embodiment). Each core outer circumference projection 16c is ridge-like and extends from one axial end to the other axial end of the annular portion 16a in the axial direction. Further, as viewed in the axial direction, each core outer circumference projection 16c is trapezoidal and has a circumferential width that decreases from the basal end toward the distal end. Each core outer circumference projection 16c includes an arcuate recess 16d extending from the distal end (radially outer end) of the core outer circumference projection 16c toward the basal end. The arcuate recess 16d is arcuate as viewed in the axial direction and extends throughout the core outer circumference projection 16c in the axial direction. The arcuate recess 16d has a radius of curvature that is slightly greater than the radius of the external threaded portion of each bolt 14. The through bolts 14, which are cylindrical and extend in the axial direction, are arranged in the arcuate recesses 16d of two of the four core outer circumference projections 16c that are located at 180° intervals in the circumferential direction (two core outer circumference projections 16c located at the left and right in FIG. 3B). The two core outer circumference projections 16c surround approximately one half of the corresponding through bolts 14 as viewed in the axial direction.

Figure 6:
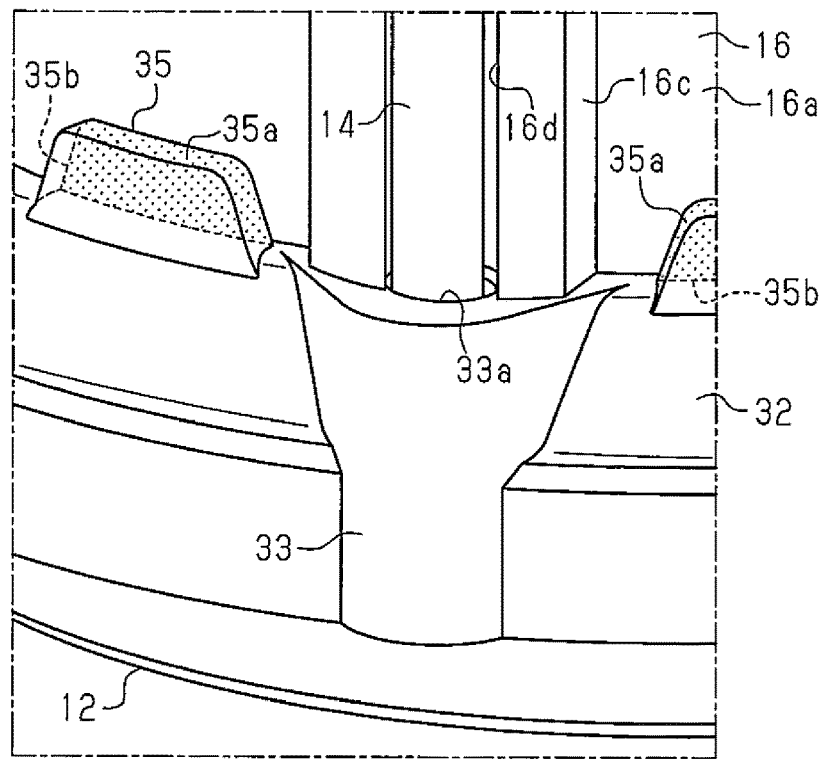
FIG. 6 is a partially, enlarged perspective view of the motor shown in FIG. 1.

As shown in FIG. 1, core sheets 18, which are formed by pressing and punching steel plates (preferably, magnetic steel sheets), are stacked in the axial direction and then swaged and integrated to form the stator core 16. The core sheets 18 at the two axial ends of the stator core 16 each have an L-shaped cross-section by bending the radially inner end of each tooth 16b toward the outer side in the axial direction. This obtains the axial length at the radially inner end surfaces 16e (surface opposing rotor 15) of the teeth 16b while reducing the stack thickness of the stator core 16 (thickness of entire stack of core sheets 18). In FIGS. 3A and 6, the stator core 16 is shown without the core sheets 18.

As shown in FIGS. 1 and 2, the first frame 11 and the second frame 12 that are arranged at the two axial ends of the stator core 16 are formed by casting a metal material. The first and second frames 11 and 12 respectively include disk-shaped first and second main bodies 21 and 31 and tubular first and second stator holders 22 and 32, which extend from the first and second main bodies 21 and 31 in the axial direction. Further, the first and second frames 11 and 12 respectively include a plurality of (two each) first and second bolt fastening portions 23 and 33 defined by the outer circumferential surfaces of the first and second stator holders 22 and 32 and formed integrally with the first and second main bodies 21 and 31. The first and second bolt fastening portions 23 and 33 are arranged at equal angular intervals in the circumferential direction (180° intervals in the present embodiment). Further, as shown in FIGS. 2 and 3B, each first bolt fastening portion 23 includes a first fastening hole 23a into which the corresponding through bolt 14 is inserted. Each second bolt fastening portion 33 includes an internally threaded second fastening hole 33a that is fastened with the corresponding through bolt 14. The through bolts 14 are inserted through the first fastening holes 23*a* and fastened to the second fastening holes 33*a* to couple the first and second bolt fastening portions 23 and 33 with each other and integrate the first frame 11 and the second frame 12 with each other. The second frame 12 includes fixed portions 34 used to fix the motor 10 to an external fixing location with bolts (not shown). The fixed portions 34 extend toward the outer side in the radial direction from the second main body 31 at two locations separated in the circumferential direction from the two second bolt fastening portions 33. The motor 10 is fixed to the fixing location so that, for example, the second frame 12 is located under the first frame 11.

As shown in FIGS. 2 and 3A, the distal portion of the first stator holder 22 includes a first receptacle 25 into which one axial end (upper end as viewed in FIG. 3A) of the stator core 16 is fitted at the radially inner side. In the same manner, the distal portion of the second stator holder 32 includes a second receptacle 35 into which the other axial end (lower end as viewed in FIG. 3A) of the stator core 16 is fitted.

The first receptacle 25 includes a plurality of (four in the present embodiment) first receptacle walls 25*a* arranged in the circumferential direction spaced apart from one another. The four first receptacle walls 25*a* are arranged at equal angular intervals in the circumferential direction (90° intervals in the present embodiment). Further, the four first receptacle walls 25*a* are arranged so that one is located between the core outer circumference projections 16*c* that are adjacent to each other in the circumferential direction. That is, the core outer circumference projections 16*c* are located between the first receptacle walls 25*a* that are adjacent to each other in the circumferential direction and overlapped with the first receptacle walls 25*a* in the circumferential direction. The core outer circumference projections 16*c* are not overlapped with the first receptacle walls 25*a* in the radial direction. As shown in FIG. 3B, the second receptacle 35 includes a plurality of (eight in the present embodiment) second receptacle walls 35*a* arranged in the circumferential direction spaced apart from one another. The second receptacle walls 35*a* are arranged so that one is located at each of the two circumferential sides of each core outer circumference projection 16*c* (i.e., two second receptacle walls 35*a* located between the core outer circumference projections 16*c* that are adjacent to each other in the circumferential direction). That is, the core outer circumference projections 16*c* are located between the second receptacle walls 35*a* that are adjacent to each other in the circumferential direction and overlapped with the second receptacle walls 35*a* in the circumferential direction. The core outer circumference projections 16*c* are not overlapped with the second receptacle walls 35*a* in the radial direction.

The first and second receptacles 25 and 35 (first and second receptacle walls 25*a* and 35*a*) are thinner in the radial direction than the basal portions of the first and second stator holders 22 and 32. Further, the first and second receptacle walls 25*a* and 35*a* extend in the axial direction and extend in the circumferential direction in an arcuate manner as viewed in the axial direction. Each of the first and second receptacle walls 25*a* and 35*a* have a circumferential width that decreases from the basal end toward the distal end (distal ends of first and second stator holders 22 and 35).

Figure 4A:
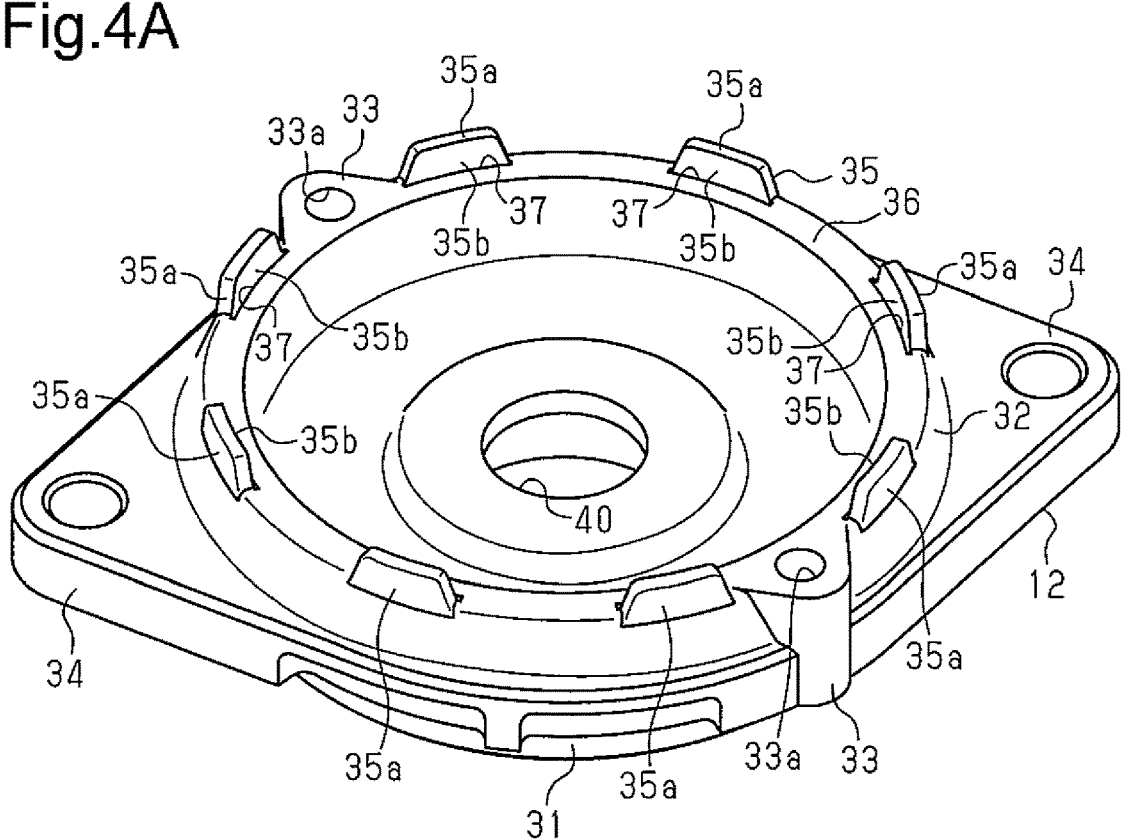
FIG. 4A is a perspective view of a second end frame shown in FIG. 1.
Figure 4B:
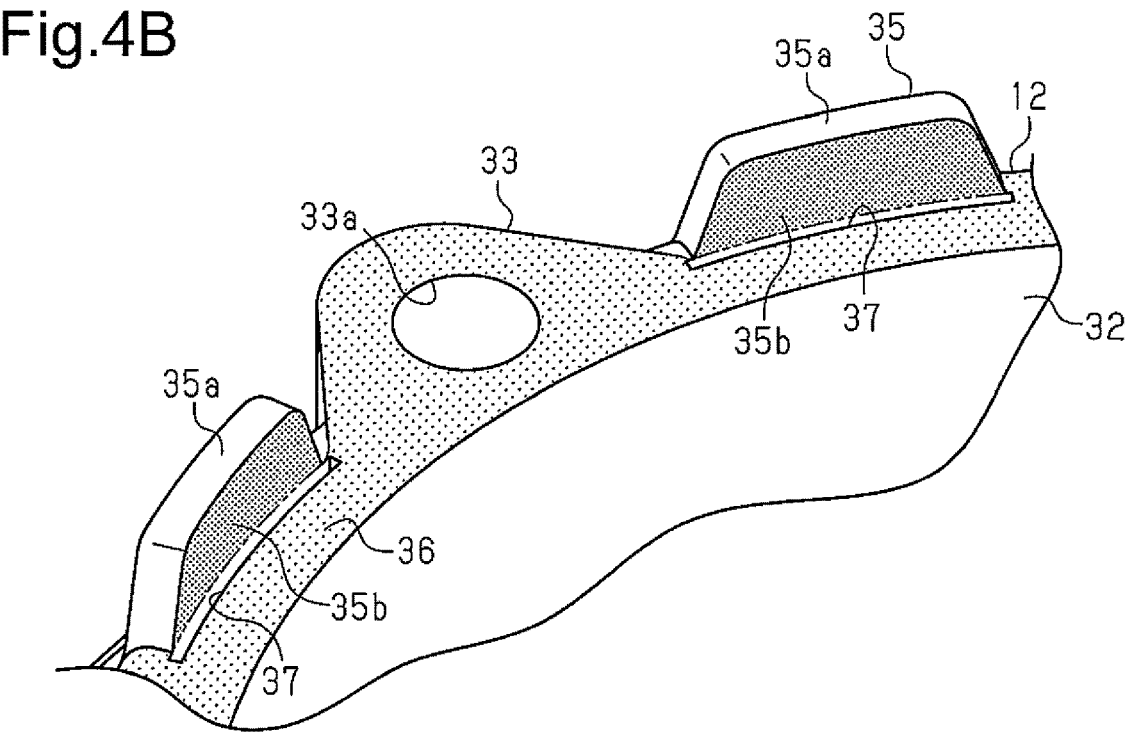
FIG. 4B is a partially, enlarged perspective view of FIG. 4A.

As shown in FIGS. 2, 4A, and 4B, the inner circumferential surfaces of the first and second receptacles 25 and 35, that is, the radially inner surfaces of the first and second receptacle walls 25*a* and 35*a* serve as first and second aligning surfaces 25*b* and 35*b* used to align the first and second frames 11 and 12 with the stator core 16. In FIG. 4B,
the second aligning surfaces 35*b* are shaded. The first and second aligning surfaces 25*b* and 35*b* are formed by machining the inner circumferential surfaces of the first and second receptacles 25 and 35 (i.e., radially inner surfaces of first and second receptacle walls 25*a* and 35*a*) to increase the dimensional accuracy of the inner circumferential surfaces of the first and second receptacles 25 and 35. In the first frame 11, the four first aligning surfaces 25*b* are located on the same circle, which is coaxial with the first stator holder 22, as viewed in the axial direction. In the same manner, in the second frame 12, the eight second aligning surfaces 35*b* are located on the same circle, which is coaxial with the second stator holder 32, as viewed in the axial direction (refer to FIG. 3B). In the motor 10, the axes of the first and second stator holders 22 and 32 coincide with the axis of the stator core 16. As shown in FIGS. 2 and 3B, the inner diameters of the first and second receptacles 25 and 35 are slightly larger than or equal to the outer diameter of the annular portion 16*a*. That is, the radius of curvature of each of the first and second aligning surfaces 25*b* and 35*b* is slightly larger than or equal to the radius of the annular portion 16*a*. As shown in FIG. 1, the inner diameter of the first and second stator holders 22 and 32 at portions located at the basal side of the first and second receptacles 25 and 35 is smaller than the outer diameter of the annular portion 16*a*.

As shown in FIGS. 2, 4A, and 4B, the first and second frames 11 and 12 include first and second contact surfaces 26 and 36 that are adjacent to the basal portions of the first and second receptacles 25 and 35 in a direction orthogonal to the axes of the first and second stator holders 22 and 32. In FIG. 4B, the second contact surface 36 is shaded more lightly than the second aligning surfaces 35*b*. In the second frame 12, the second contact surface 36 is annular and extends throughout the distal end surface of the second stator holder 32, excluding the second receptacle 35, and throughout the axial end surface of each second bolt fastening portion 33 that is closer to the stator core 16. As shown in FIGS. 1, 2, and 3A, in the first frame 11, the first contact surface 26 is annular and extends along the axial end surface of the first stator holder 22, excluding the first receptacle 25, and throughout the axial end surface of each first bolt fastening portion 23 that is closer to the stator core 16. Further, the first and second contact surfaces 26 and 36 are flat and orthogonal to the axes of the first and second stator holders 22 and 32 (coinciding with axis L1 of rotation shaft 51, described later, of the rotor 15). The first and second contact surfaces 26 and 36 are non-machined flat surfaces that do not undergo machining and are flat surfaces that are free of steps. The first contact surface 26 is in contact with one axial end surface (upper end surface as viewed in FIG. 3A) of the annular portion 16*a* fitted into the first receptacle 25 and one axial end surface (upper end surface as viewed in FIG. 3A) of each core outer circumference projection 16*c*. The second contact surface 36 is in contact with the other axial end surface (lower end surface as viewed in FIG. 3A) of the annular portion 16*a* fitted into the second receptacle 35 and the other axial end surface (lower end surface as viewed in FIG. 3A) of each core outer circumference projections 16*c*. In this state, the first frame 11 and the second frame 12 are fixed to each other by the through bolts 14 while holding the stator 13 between the first and second stator holders 22 and 32.

In the present embodiment, the first and second receptacles 25 and 35 (first and second receptacle walls 25*a* and 35*a*) located at the distal portions of the first and second stator holders 22 and 32 extend from the first and second contact surfaces 26 and 36 in the axial direction. Thus, in the first frame 11, the first aligning surfaces 25b are located proximate to the first contact surface 26 at a right angle. Further, in the second frame 12, the second aligning surfaces 35b are located proximate to the second contact surface 36 at a right angle.

Figure 5:
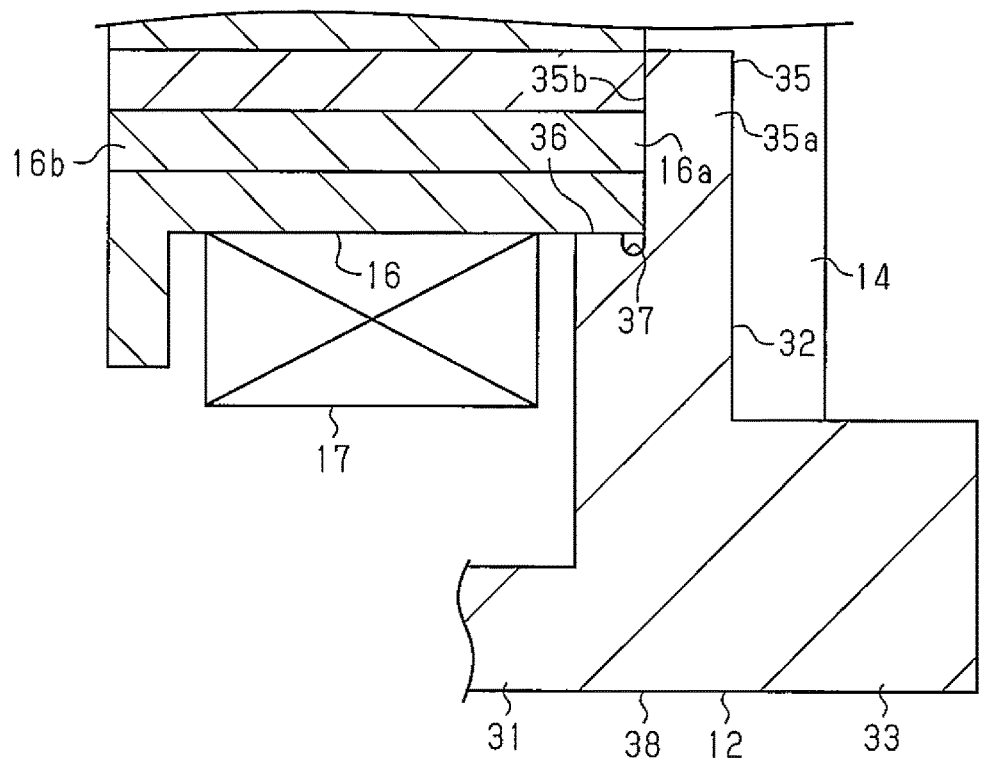
FIG. 5 is a partially, enlarged cross-sectional view of the motor shown in FIG. 1.

As shown in FIGS. 1, 4B, and 5, the first and second stator holders 22 and 32 respectively include first and second machining restriction grooves 27 and 37 at portions where the first and second aligning surfaces 25b and 35b border the first and second contact surfaces 26 and 36. When the inner circumferential surfaces of the first and second receptacles 25 and 35 are machined to form the first and second aligning surfaces 25b and 35b, the first and second machining restriction grooves 27 and 37 restrict machining of the first and second contact surfaces 26 and 36. The first and second machining restriction grooves 27 and 37 extend along the ends of the first and second aligning surfaces 25b and 35b that are closer to the first and second contact surfaces 26 and 36 at the radially inner side of the basal ends of the first and second receptacle walls 25a and 35a in the first and second stator holders 22 and 32. Further, the first and second machining restriction grooves 27 and 37 are recessed in the axial direction. Moreover, the circumferential lengths of the first and second machining restriction grooves 27 and 37 are generally equal to the circumferential width of the basal ends of the first and second receptacle walls 25a and 35a.

As shown in FIG. 1, the outer axial end surface of the first main body 21 includes a pressed surface 28, and the outer axial end surface of the second main body 31 includes a pressed surface 38. Each of the pressed surfaces 28 and 38 is a flat surface that is orthogonal to the axis L1 of the rotation shaft 51 of the rotor 15. Further, the pressed surface 28 is parallel to the first contact surface 26, and the pressed surface 38 is parallel to the second contact surface 36. The outer axial end surface of the second frame 12 also includes a step 39 that projects from the pressed surface 38 toward the outer side in the axial direction.

The central portion of the first main body 21 includes a bearing retainer 29 that allows a ball bearing B1 to be coupled in the axial direction from the inner side of the motor 10. The bearing retainer 29 is circular as viewed in the axial direction and has a cylindrical wall surface that extends in the axial direction. The axis of the bearing retainer 29 coincides with the axis of the first stator holder 22 (axis of first receptacle 25). The first frame 11 accommodates and retains the annular ball bearing B1 in the bearing retainer 29. The bottom central portion of the bearing retainer 29 includes a through hole 29a that extends through the bottom portion of the bearing retainer 29 in the axial direction. A wave washer 41 that urges the ball bearing B1 toward the stator 13 in the axial direction is located between the radially outer portion of the through hole 29a in the bottom portion of the bearing retainer 29 and the ball bearing B1 accommodated in the bearing retainer 29.

The central portion of the second main body 31 includes a bearing retainer 40 that accommodates and retains an annular ball bearing B2. The bearing retainer 40 is recessed from the outer axial end surface of the second frame 12 into the motor 10 (stator 13). More specifically, the bearing retainer 40 allows the ball bearing B2 to be coupled from the outer side of the motor 10 (side opposite to stator 13). Further, the axis of the bearing retainer 40 coincides with the axis of the second stator holder 32 (axis of second receptacle 35). The second frame 12 retains the ball bearing B2 in the bearing retainer 40 coaxially with the ball bearing B1 retained in the first frame 11. The ball bearing B2 is positioned in the axial direction by contacting the bottom portion of the bearing retainer 40 in the axial direction. The bottom central portion of the bearing retainer 40 includes a through hole 40a that extends through the bottom portion of the bearing retainer 40 in the axial direction.

The rotor 15 includes the rotation shaft 51 that is rotationally supported by the ball bearings B1 and B2, a tubular rotor core 52 that is rotatable integrally with the rotation shaft 51, and magnets 53 that are fixed to the outer circumferential surface of the rotor core 52. The magnets 53 are each opposed in the radial direction to the inner circumferential surface of the stator core 16 (radially inner end surfaces 16e of teeth 16b). The distal end (lower end) of the rotation shaft 51 extends through the through hole 40a and out of the motor 10 from the ball bearing B2. A joint (not shown) serving as an output is coupled to the projected portion of the rotation shaft 51.

As shown in FIG. 2, a control unit 61 is fixed to the outer side surface of the first frame 11. The control unit 61 includes a cover 62, which is fixed to the first frame 11, and a circuit board 63, which is accommodated in the cover 62. The circuit board 63 is electrically connected to the ends of the coils 17. A connector 64, which is connected to an external connector (not shown) that supplies power to the motor 10, is fixed to the circuit board 63. The connector 64 is located outside the cover 62. The rotor 15 is rotated by the power supplied from the external connector via the circuit board 63 to the coils 17.

Figure 9:
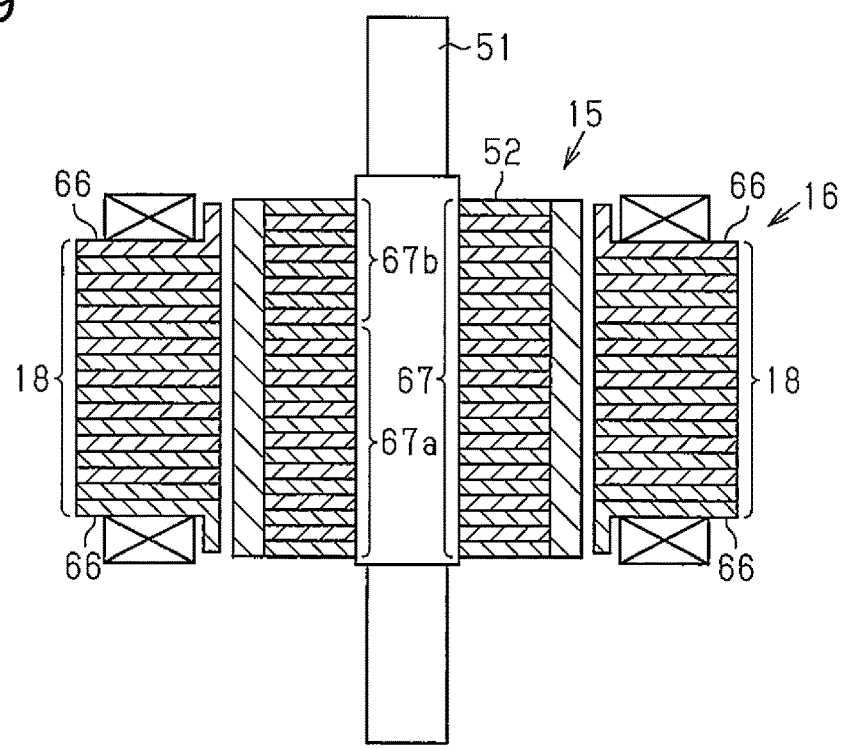
FIG. 9 is a cross-sectional view of a stator core and a rotor core shown in FIG. 1.

As shown in FIG. 9, the rotor core 52 of the rotor 15 is formed by a stack of rotor core sheets 67. Each rotor core sheet 67 has the same thickness as each stator core sheet 18. The rotor core sheets 67 include main rotor core sheets 67a, the number of which is the same as the number of the stacked stator core sheets 18, and auxiliary rotor core sheets 67b, the number of which corresponds to the number of the lacking rotor core sheets, so that the outer circumferential surface of the rotor core 52 opposes the entire inner circumferential surface of the stator core 16 that includes L-shaped cores 66. The stack of the main rotor core sheets 67a and the stack of the auxiliary rotor core sheets 67b each function as a stacked core.

Figure 10:
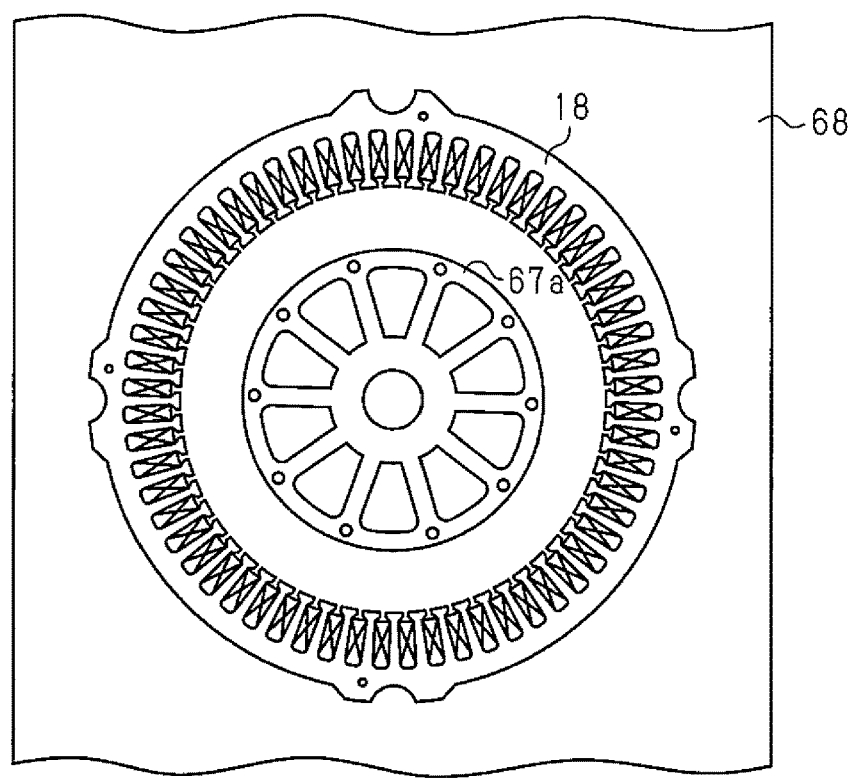
FIG. 10 is a diagram illustrating a manufacturing step of the stator core sheet and the rotor core sheet shown in FIG. 9.

The main rotor core sheets 67a are formed by pressing the same magnetic steel sheets as the stator core sheets 18. More specifically, as shown in FIG. 10, the stator core sheets 18 and the main rotor core sheets 67a are each formed by pressing the same magnetic steel sheet 68.

The auxiliary rotor core sheets 67b is formed in a separate process by punching SPCC steel (cold rolled steel sheet) that is softer than magnetic steel.

Figure 7:
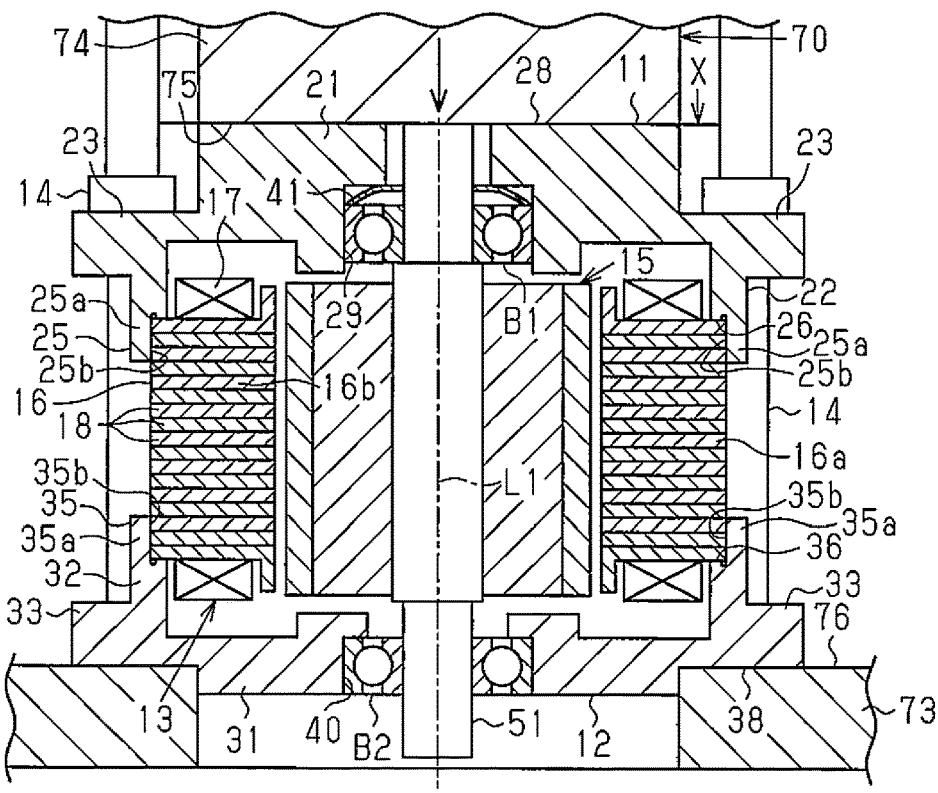
FIG. 7 is a schematic cross-sectional view illustrating a method for manufacturing the motor of FIG. 1.

A method for manufacturing the motor 10 of the present embodiment will now be described with reference to FIG. 7.

First, a machining step is performed to machine the inner circumferential surfaces of the first and second receptacles 25 and 35. This increases the dimensional accuracy of the inner circumferential surfaces of the first and second receptacles 25 and 35. In the machining step, machining is performed on the radially inner side surfaces of the first and second receptacle walls 25a and 35a of the first and second frames 11 and 12, which are formed through casting. This increases the dimensional accuracy of the inner surfaces of the first and second receptacles 25 and 35 and forms the first and second aligning surfaces 25b and 35b with the radially inner side surface of each of the first and second receptacle walls 25a and 35a. When machining the radially inner side of the first and second receptacle walls 25a and 35a, the first and second machining restriction grooves 27 and 37, which are recessed in the axial direction at the portion where the first and second receptacle walls 25a and 35a borders the first and second contact surfaces 26 and 36, restrict machining of the first and second contact surfaces 26 and 36.

Then, a positioning step is performed to position the first frame 11 and the second frame 12 at the two axial sides of the stator core 16. The coils 17 are wound in advance around the teeth 16b of the stator core 16. In the positioning step, one axial end (upper end in FIG. 7) of the annular portion 16a is first fitted to the radially inner side of the first receptacle 25. Here, the stator core 16 and the first frame 11 are aligned using the outer circumferential surface of the annular portion 16a as an alignment reference surface in the stator core 16 and the first aligning surfaces 25b as an alignment reference surface in the first frame 11. The annular portion 16a is fitted into the first receptacle 25 until the entire outer circumference of one axial end surface (upper end surface as viewed in FIG. 7) comes into contact with the first contact surface 26 in the axial direction. Further, one axial end surface of each of the four core outer circumference projections 16c also comes into contact with the first contact surface 26 in the axial direction (refer to FIG. 3A). Two of the four core outer circumference projections 16c that are separated in the circumferential direction by a 180° interval are arranged at positions corresponding to the two first bolt fastening portion 23 in contact in the axial direction with portions of the first contact surface 26 defining the first bolt fastening portions 23. The core outer circumference projections 16c are each arranged between the first receptacle walls 25a that are adjacent to each other in the circumferential direction and overlapped with the first receptacle walls 25a in the circumferential direction (refer to FIG. 2). Further, the inner circumferential surface of each arcuate recess 16d is concentric with the corresponding first fastening hole 23a as viewed in the axial direction.

Then, the first receptacle 25 undergoes swaging at a number of locations in the circumferential direction from the radially outer side. This plastically deforms and presses the swaged locations of the first receptacle 25 toward the inner circumferential side from the radially outer side against the outer circumferential surface of the stator core 16. As a result, the stator core 16 is fixed to the first receptacle 25. This forms an assembly X of the stator core 16 and the first frame 11.

Next, the ball bearing B2 is fixed to the bearing retainer 40 of the second frame 12. Then, the rotation shaft 51 of the rotor 15 is coupled to the ball bearing B2. Further, the ball bearing B1 is coupled proximate to the end of the rotation shaft 51 opposite to the output. The wave washer 41 is accommodated in the bearing retainer 29 of the first frame 11. Alternatively, the wave washer 41 is fitted onto the rotation shaft 51 and placed on the upper side of the ball bearing B1 (side opposite to stator 13). The ball bearing B1 does not necessarily have to be coupled to the rotation shaft 51 and may be coupled in advance. Then, the rotation shaft 51 of the rotor 15 is inserted through the stator core 16, and the bearing retainer 29 of the first frame 11 is fixed to the ball bearing B1.

Then, the assembly X is coupled to the second frame 12. This completes the positioning step. In this step, the other axial end of the annular portion 16a, that is, the axial end of the annular portion 16a at the side opposite to the first frame 11 is fitted into the second receptacle 35 of the second frame 12. Here, the stator core 16 (assembly X) and the second frame 12 are aligned using the outer circumferential surface of the annular portion 16a as the alignment reference surface in the stator core 16 and the second aligning surfaces 35b as the alignment reference surface in the second frame 12. The annular portion 16a is fitted into the second receptacle 35 until the other axial end surface (end surface at side opposite to first frame 11, lower end surface as viewed in FIG. 7) comes into contact with the second contact surface 36 in the axial direction. The outer axial end surfaces (end surfaces at side opposite to first frame 11) of the four core outer circumference projections 16c also come into contact with the second contact surface 36 in the axial direction. Two of the four core outer circumference projections 16c that are separated in the circumferential direction by an interval of 180° are arranged at positions corresponding to the two second bolt fastening portions 33 in contact in the axial direction with portions of the second contact surface 36 defining the second bolt fastening portion 33 (refer to FIG. 6). The core outer circumference projections 16c are each arranged between the second receptacle walls 35a that are adjacent to each other in the circumferential direction and overlapped with the second receptacle walls 35a in the circumferential direction (refer to FIG. 3B). Further, the inner circumferential surface of each arcuate recess 16d is concentric with the corresponding second fastening hole 33a as viewed in the axial direction.

After the positioning step, a pressing jig 70 including a first pressing surface 75 and a second pressing surface 76 is used to press the first and second frames 11 and 12 toward the stator core 16. The pressing jig 70 includes a fixed base 73 and a movable pressing portion 74 that are opposed to each other. The first pressing surface 75, which is defined on the movable pressing portion 74, is flat and orthogonal to the axis L1 of the rotation shaft 51. The second pressing surface 76, which is defined on the fixed base 73, is flat and orthogonal to the axis L1 of the rotation shaft 51 parallel to the first pressing surface 75. In the pressing step, the first pressing surface 75 contacts the pressed surface 28 of the first frame 11 in the axial direction. In the same manner, the second pressing surface 76 contacts the pressed surface 38 of the second frame 12 in the axial direction. The first pressing surface 75 of the movable pressing portion 74 presses the pressed surface 28 of the first frame 11 toward the stator core 16 in the axial direction. That is, the pressing jig 70 presses the first frame 11 and the second frame 12 toward the stator core 16 in the axial direction. Here, the frames 11 and 12 are each pressed toward the stator core 16 with the first and second contact surfaces 26 and 36, which are orthogonal to the axis L1 of the rotation shaft 51, maintained in parallel to each other. This presses the stator core 16 from the two axial sides between the first and second contact surfaces 26 and 36 that are orthogonal to the axis L1 of the rotation shaft 51.

In the present embodiment, during the pressing step, a coupling step is performed to couple the first frame 11 and the second frame 12 to each other with the through bolts 14. More specifically, when the first and second pressing surfaces 75 and 76 are pressing the pressed surfaces 28 and 38 of the first and second frames 11 and 12, the first frame 11 and the second frame 12 are coupled to each other with the through bolts 14. This integrally couples the first and second frames 11 and 12 with the stator core 16. Then, the control unit 61 is coupled to the first frame 11 to complete the motor 10.

The operation of the present embodiment will now be described.

The inner circumferential surfaces of the first and second receptacles 25 and 35, that is, the radially inner surfaces of the first and second receptacle walls 25a and 35a are machined to increase the dimensional accuracy of the inner circumferential surfaces of the first and second receptacles 25 and 35. Thus, when fitting the axial ends of the annular portion 16a into the radially inner side of the first and second receptacles 25 and 35, the inner circumferential surfaces of the first and second receptacles 25 and 35, namely, the first and second aligning surfaces 25b and 35b align the stator core 16 with the first and second frames 11 and 12.

Further, the first and second contact surfaces 26 and 36, which come into contact with the axial end surfaces of the annular portion 16a and the axial end surfaces of the core outer circumference projections 16c, are flat surfaces that do not undergo machining. Thus, the first and second contact surfaces 26 and 36 do not include steps that would be formed when machined. In addition to the axial end surfaces of the annular portion 16a, the first and second contact surfaces 26 and 36 contact the axial end surfaces of the core outer circumference projections 16c. Thus, compared with when only the axial end surfaces of the annular portion 16a contact the first and second frames 11 and 12, the first and second frames 11 and 12 of the present embodiment are pressed toward the stator core 16 contacting the axial end surfaces of the stator core 16 over a greater area. In the coupling step, when coupling and fixing the two frames 11 and 12 with the through bolts 14, the core outer circumference projections 16c are located between the portions of the two frames 11 and 12 pressed by the through bolts 14 toward the stator core 16 (i.e., the first and second bolt fastening portions 23 and 33). Accordingly, when tightening the through bolts 14, the axial pressure applied to the frames 11 and 12 is also received by the core outer circumference projections 16c. This limits deformation of the two frames 11 and 12 when pressed toward the stator core 16.

The first embodiment has the advantages described below.

The stator core 16 is easily aligned with the first and second frames 11 and 12 without using a separate aligning jig. When pressing the first and second frames 11 and 12 toward the stator core 16 in the pressing step and the coupling step, there is no need to use a jig to hold the first and second frames 11 and 12 like in the prior art in order to limit deformation of the frames 11 and 12 caused by the pressing. Accordingly, the stator core 16 may be aligned with the first and second frames 11 and 12 without using complicated equipment. Further, deformation of the first and second frames 11 and 12 is limited.

The first and second receptacles 25 and 35 include the first and second receptacle walls 25a and 35a that are arranged in the circumferential direction separated from one another. This reduces the time of the machining step that machines the inner circumferential surfaces of the first and second receptacles 25 and 35 into the first and second aligning surfaces 25b and 35b, which are used to align the first and second frames 11 and 12 with the stator core 16. Further, when the motor 10 that is fixed to the fixing location so that the second frame 12 is located below the first frame 11 becomes wet, water may enter the opening between the outer surface of the stator core 16 and the second receptacle 35 (the second receptacle walls 35a). In this case, the second receptacle walls 35a that are arranged next to one another in the circumferential direction are separated in the circumferential direction. Thus, the water that enters the opening between the outer surface of the stator core 16 and the second receptacle 35 (the second receptacle walls 35a) is easily drained out of the motor 10 from between the second receptacle walls 35a that are adjacent to one another in the circumferential direction.

The core outer circumference projections 16c are located between the first receptacle walls 25a that are adjacent to one another in the circumferential direction and between the second receptacle walls 35a that are adjacent to one another in the circumferential direction. Further, the core outer circumference projections 16c are overlapped with the first and second receptacle walls 25a and 35a in the circumferential direction. Thus, the core outer circumference projections 16c and the first and second receptacles 25 and 35 (the first and second receptacle walls 25a and 35a) are not overlapped in the radial direction. Accordingly, even though the stator core 16 includes the core outer circumference projections 16c that project radially outward from the annular portion 16a, enlargement of the first and second frames 11 and 12 in the radial direction is limited. As a result, deformation of the first and second frames 11 and 12 is limited without using complicated equipment and while limiting enlargement of the motor 10 in the radial direction.

The first and second receptacles 25 and 35 (the first and second receptacle walls 25a and 35a) project from the first and second contact surfaces 26 and 36 in the axial direction. Thus, the inner circumferential surfaces of the first and second receptacles 25 and 35 (i.e., first and second aligning surfaces 25b and 35b) are proximate to and located at a right angle to the first and second contact surfaces 26 and 36. Further, the first and second frames 11 and 12 include the first and second machining restriction grooves 27 and 37, which extend along the ends of the first and second aligning surfaces 25b and 35b that are closer to the first and second contact surfaces 26 and 36, at the portions where the first and second aligning surfaces 25b and 35b borders the first and second contact surfaces 26 and 36. Thus, when machining the inner circumferential surfaces of the first and second receptacles 25 and 35 in the machining step, the first and second machining restriction grooves 27 and 37 restrict machining of the first and second contact surfaces 26 and 36. This limits the formation of steps in the first and second contact surfaces 26 and 36 that would occur when machined. Further, the first and second machining restriction grooves 27 and 37 are grooves. Thus, the first and second frames 11 and 12, which include the first and second machining restriction grooves 27 and 37, are easy to form.

The auxiliary rotor core sheets 67b are formed by punching SPCC steel, which is less expensive than magnetic steel. This obtains the axial length of the rotor core 52 and increases the motor output.

The manufacturing costs are lowered compared to when punching the auxiliary rotor core sheets 67b from the same magnetic steel sheets as the stator core sheets 18.

The auxiliary rotor core sheets 67b, which are formed from SPCC steel, has a lower hardness than the main rotor core sheets 67a, which are formed from magnetic steel. When the auxiliary rotor core sheets 67b are stacked from one axial end of the rotor core 52 and then the rotation shaft 51 is press-fitted into the rotor core 52 from that axial end, the formation of burrs at the rotation shaft 51 are reduced. This allows a deburring step to be omitted and lowers the manufacturing costs.

The first embodiment may be modified as described below.

In the above embodiment, the first and second frames 11 and 12 include the first and second machining restriction grooves 27 and 37 serving as machining restriction portions that limit machining of the first and second contact surfaces 26 and 36 in the machining step at portions where the inner circumferential surfaces of the first and second receptacles 25 and 35 (i.e., first and second aligning surfaces 25a and 35a) borders the first and second contact surfaces 26 and 36. The machining restriction portions that restrict machining of the first and second contact surfaces 26 and 36 in the machining step are not limited to the illustrated shapes.

Figure 8:
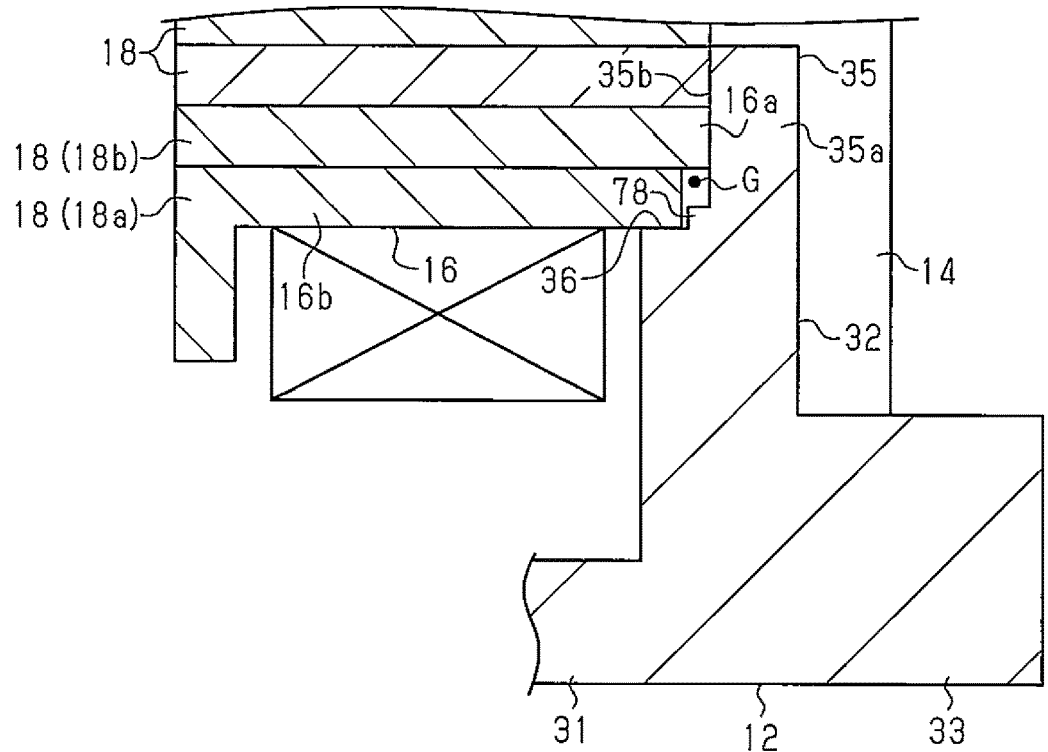
FIG. 8 is a partially, enlarged cross-sectional view of a motor in a further example of the first embodiment.

For instance, in the example shown in FIG. 8, the second frame 12 includes a machining restriction projection 78 at the bordering portion between the second aligning surfaces 35b and the second contact surface 36. The machining restriction projection 78 projects from the second contact surface 36 toward the stator core 16 in the axial direction at the bordering portion between the second aligning surfaces 35b and the second contact surface 36. Further, the machining restriction projection 78 extends along the ends of the second aligning surfaces 35b that are close to the second contact surface 36 (lower end as viewed in FIG. 8). Further, the machining restriction projection 78 has a tetragonal cross-section that is orthogonal to the circumferential direction, and the machining restriction projection 78 has a dimension corresponding to the height in the axial direction that is smaller than the dimension corresponding to the thickness of each core sheet 18. In the example of FIG. 8, among the core sheets 18 of the stator core 16, core sheets 18a located at the two axial ends (only the one near the second frame 12 is shown in FIG. 8) have a smaller outer diameter than the core sheets 18 located between the two core sheets 18a. Further, the machining restriction projection 78 has a width in the radial direction that is smaller than the difference in outer diameter (radius) between the core sheets 18a arranged at the axial ends in the stator core 16 and core sheets 18b arranged adjacent to these core sheets 18a in the axial direction.

When the axial end of the annular portion 16a is fitted into the second receptacle 35, the machining restriction projection 78 is opposed in the radial direction to the core sheet 18a at the axial end of the stator core 16 and opposed in the axial direction to the outer circumferential portion of the core sheet 18b located adjacent to the core sheet 18a. In this state, the basal ends of the second receptacle walls 35a in the second aligning surfaces 35b do not contact the outer circumferential surface of the annular portion 16a. Further, in this state, a gap G is formed between the outer surface of the stator core 16 (core sheets 18a and 18b) and the machining restriction projection 78. The second receptacle 35 includes the second receptacle walls 35a that are spaced apart from one another in the circumferential direction. Thus, the gap G is in communication with the outside of the motor 10 through the space between the second receptacle walls 35a that are adjacent in the circumferential direction.

Consequently, the machining restriction projection 78 restricts machining of the second contact surface 36 when machining the inner circumferential surface of the second receptacle 35 into the second aligning surfaces 35b that are used to align the stator core 16 with the second frame 12. This limits the formation of steps in the second contact surface 36 when machining is performed. The motor 10 may be fixed to the fixing location (refer to FIG. 1) so that the second frame 12 is located below the first frame 11. In this case, even when the motor 10 becomes wet and water enters the opening between the outer surface of the stator core 16 and the second receptacle 35 (the second receptacle walls 35a), the water will flow out of the gap G through the openings between the second receptacle walls 35a in the circumferential direction and out of the motor 10 (outer surface of second main body 31). In this manner, the second receptacle walls 35a that are adjacent in the circumferential direction are spaced apart in the circumferential direction. Thus, the water that enters the opening between the outer surface of the stator core 16 and the second receptacle 35 (the second receptacle walls 35a) is easily drained out of the motor 10 from between the second receptacle walls 35a that are adjacent in the circumferential direction.

In the same manner as the first frame 11, a machining restriction projection similar to the machining restriction projection 78 may be arranged instead of the first machining restriction groove 27 at the bordering portion between the first aligning surfaces 25b and the first contact surface 26. Moreover, the first and second frames 11 and 12 do not necessarily have to include a machining restriction portion such as the first and second machining restriction grooves 27 and 37 or the machining restriction projection 78.

In the above embodiment, the core outer circumference projections 16c are located between the first receptacle walls 25a that are adjacent in the circumferential direction and between the second receptacle walls 35a that are adjacent in the circumferential direction. Further, the core outer circumference projections 16c are overlapped in the circumferential direction with the first and second receptacle walls 25a and 35a. That is, the first and second receptacle walls 25a and 35a are not overlapped in the radial direction with the core outer circumference projections 16c. However, the first and second receptacle walls 25a and 35a may be overlapped in the radial direction with the core outer circumference projections 16c.

In the above embodiment, the first receptacle 25 includes the four first receptacle walls 25a, and the second receptacle 35 includes the eight second receptacle walls 35a. However, there is no limit to the number of the first and second receptacle walls 25a and 35a in the first and second receptacles 25 and 35 as long as the number is larger than one.

In the above embodiment, the first and second receptacles 25 and 35 include the first and second receptacle walls 25a and 35a that are arranged in the circumferential direction separated from one another. However, the first and second receptacles 25 and 35 are not limited to the illustrated shapes and may have any shape as long as the axial end of the annular portion 16a may be fitted at the radially inner side. For example, the first receptacle 25 (or second receptacle 35) may be a single arcuate wall extending in the circumferential direction that allows the axial end of the annular portion 16a to be fitted in to hold the fitted axial end of the annular portion 16a at the radially inner side. Further, for example, the first and second receptacles 25 and 35 may be annular.

The core outer circumference projections 16c are not limited to the shape illustrated in the above embodiment. Each core outer circumference projection 16c only needs to project radially outward from the annular portion 16a and extend in the axial direction to be able to at least partially surround the circumference of the corresponding through bolt 14. For example, the core outer circumference projections 16c may be annular to completely surround the circumference of the corresponding through bolts 14. In this case, the axial end surfaces of the core outer circumference projections 16c are increased in area. Thus, in the pressing step, the first and second frames 11 and 12 are pressed toward the stator core 16 contacting the axial end surface of the stator core 16 over a wider surface. Further, the pressure applied to the frames 11 and 12 when tightening the through bolts 14 is also received by the core outer circumference projections 16c over a wider area. Accordingly, when the first and second frames 11 and 12 are pressed toward the stator core 16 in the pressing step and the coupling step, deformation of the first and second frames 11 and 12 is further limited.

In the above embodiment, the stator core 16 includes the four core outer circumference projections 16c. However, the number of the core outer circumference projections 16c in the stator core 16 is not necessarily limited to four and may be any number that is larger than one.

In the above embodiment, the first frame 11 and the second frame 12 are fixed to each other by the two through bolts 14. However, the number of the through bolts 14 fixing the first frame 11 and the second frame 12 is not limited to two and may be three or more. In this case, the number of the core outer circumference projections 16c of the stator core 16 may be increased in accordance with the number of the through bolts 14.

In the above embodiment, the core sheets 18 at the two axial ends of the stator core 16 each have an L-shaped cross-section in which the radially inner end of the portion forming the corresponding tooth 16b is bent toward the outer side in the axial direction. However, the core sheets 18 of the stator core 16 may all be formed by flat plates that are identical in shape.

In the above embodiment, the stator core 16 is formed by the core sheets 18 that are stacked in the axial direction. However, the stator core 16 does not necessarily have to be formed from the core sheets 18. For example, the stator core 16 may be formed through sintering (sintered body). Alternatively, the stator core 16 may be formed by coupling a plurality of core segments in the circumferential direction. In this case, each core segment has the shape that would be obtained when dividing the annular portion 16a in the circumferential direction, and each core segment includes a tooth 16b.

In the above embodiment, the stator core 16 includes sixty teeth 16b. However, the stator core 16 may include any number of teeth 16b.

In the above embodiment, the coupling step is performed during the pressing step but may be performed after the pressing step.

In the above embodiment, the first receptacle 25 and the stator core 16 of the first frame 11 are fixed together through swaging but may be fixed to each other through other processes. For example, the first receptacle 25 and the stator core 16 may be fixed together by bolts or through welding. Further, in the positioning step, the first frame 11 and the first receptacle 25 do not necessarily have to be fixed.

The bearing of the motor 10 are not limited to the ball bearings B1 and B2. For example, the motor 10 may include a pair of plain bearings instead of the ball bearings B1 and B2.

The auxiliary rotor core sheets 67b may be formed in, for example, a step of punching stator core sheets of a Lundell motor.

Figure 11:
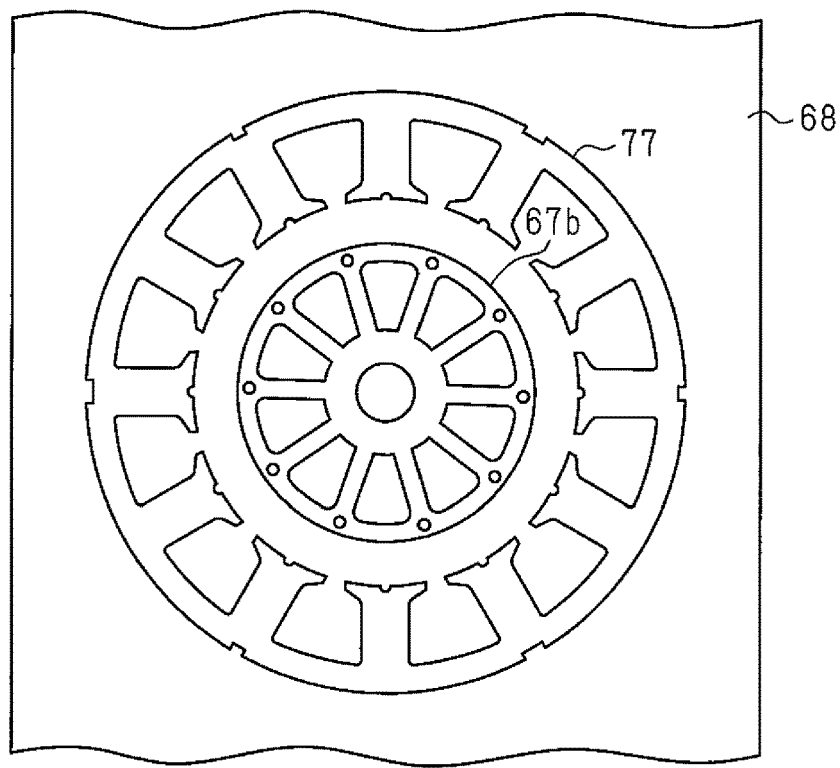
FIG. 11 is a diagram illustrating a manufacturing step of the stator core sheet and the rotor core sheet in a further example of the first embodiment.
Figure 12:
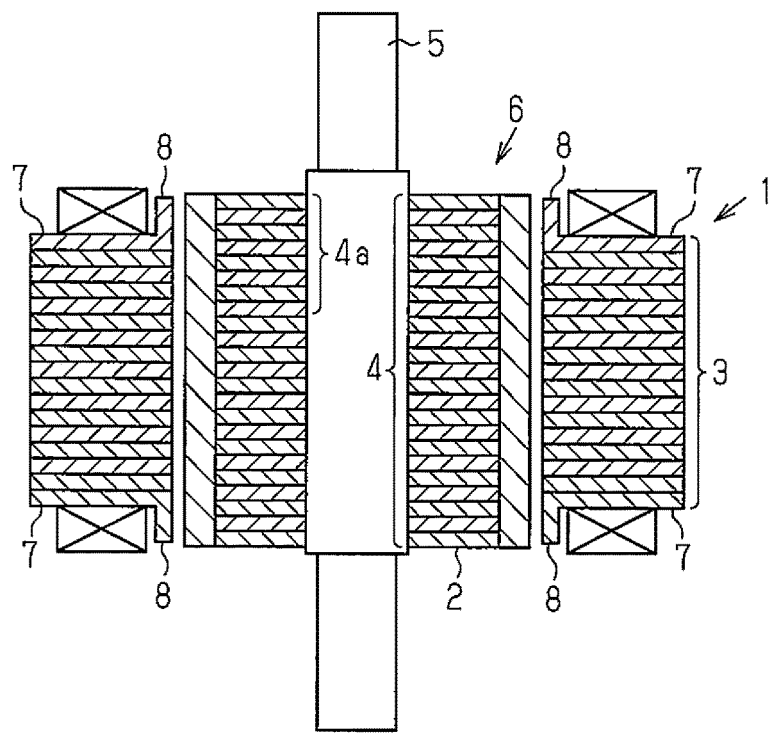
FIG. 12 is a diagram showing a prior art example.

Referring to FIG. 11, when punching the magnetic steel sheet 68 to form stator core sheets 77 of a Lundell motor, the auxiliary rotor core sheets 67b are simultaneously punched at the inner side of the stator core sheets 77.

In such a manufacturing method, the auxiliary rotor core sheets 67b are formed in the punching step of the stator core sheets 77 for a Lundell motor. Accordingly, a separate step of forming the auxiliary rotor core sheets 67b may be omitted, and the material of the magnetic steel sheet 68 may be effectively used.

The auxiliary rotor core sheets 67b may be formed in a stator core sheet punching step for a motor other than a Lundell motor.

Technical concepts that may be acknowledged from the first embodiment and its modified examples will now be described.

(A) The motor according to claim 2, wherein:
the receptacle projects from the contact surface in the axial direction; and
the end frames each include a machining restriction groove extending along an end of the aligning surface that is closer to the contact surface at a portion where the aligning surface borders the contact surface.

In this structure, when machining the inner circumferential surface of the receptacle into an aligning surface used to align the stator core and the end frame, the machining restriction groove restricts machining of the contact surface. This limits the formation of steps in the contact surface that would occur when machined. Further, the machining restriction groove is a groove and facilitates the formation of the end frame that includes the machining restriction groove.

(B) The motor according to claim 2, wherein:
the receptacle projects from the contact surface in the axial direction; and
the end frames each include a machining restriction projection extending along an end of the aligning surface that is closer to the contact surface at a portion where the aligning surface borders the contact surface.

In this structure, when machining the inner circumferential surface of the receptacle into an aligning surface used to align the stator core and the end frame, the machining restriction projection restricts machining of the contact surface. This limits the formation of steps in the contact surface that would occur when machined.

A second embodiment according to the present invention will now be described with reference to FIGS. 13 to 16. Elements that are the same as the first embodiment shown in FIGS. 1 to 12 will not be described.

The rotor 15 includes a tubular non-magnetic cover 54 that covers the outer surfaces of the permanent magnets 53. The permanent magnets 53 are opposed to the inner circumferential surface of the stator core 16 (radially inner end surfaces 16e of teeth 16b) through the non-magnetic cover 54 in the radial direction.

Figure 14:
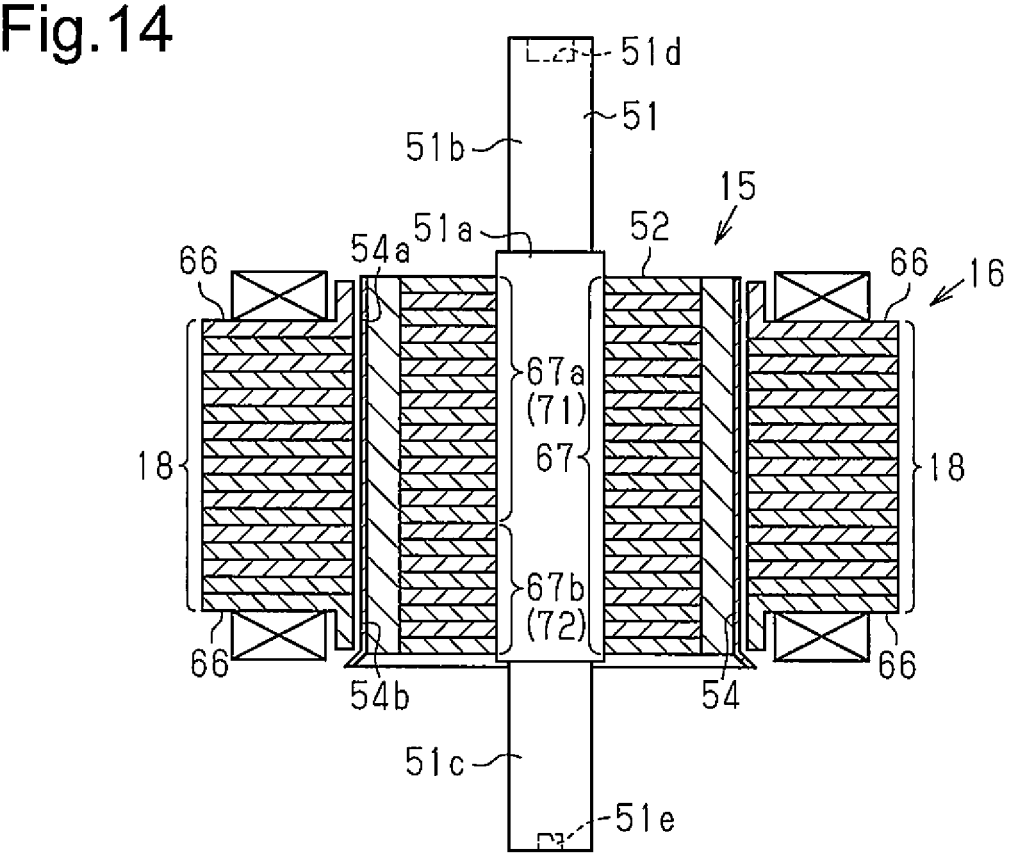
FIG. 14 is a cross-sectional view of a stator core and a rotor shown in FIG. 14.

As shown in FIG. 14, the rotor core 52 includes a high hardness portion 71, which has a high hardness and is formed by a stack of the main rotor core sheets 67, and a low hardness portion 72, which has a low hardness and is a stack of the auxiliary rotor core sheets 67b. The high hardness portion 71 and the low hardness portion 72 are arranged in the axial direction.

Figure 13:
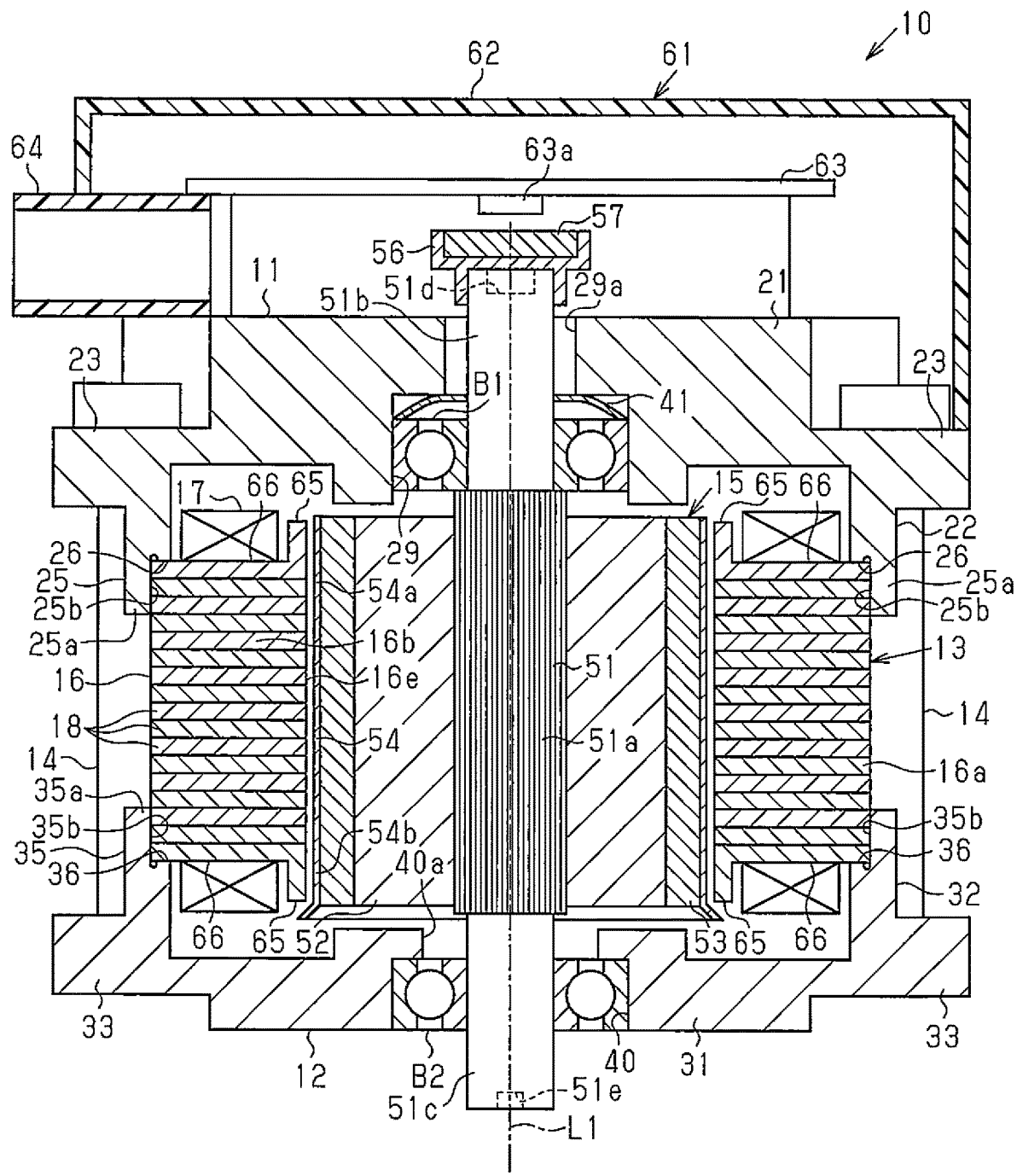
FIG. 13 is a schematic cross-sectional view showing the structure of a motor of a second embodiment.
Figure 15:
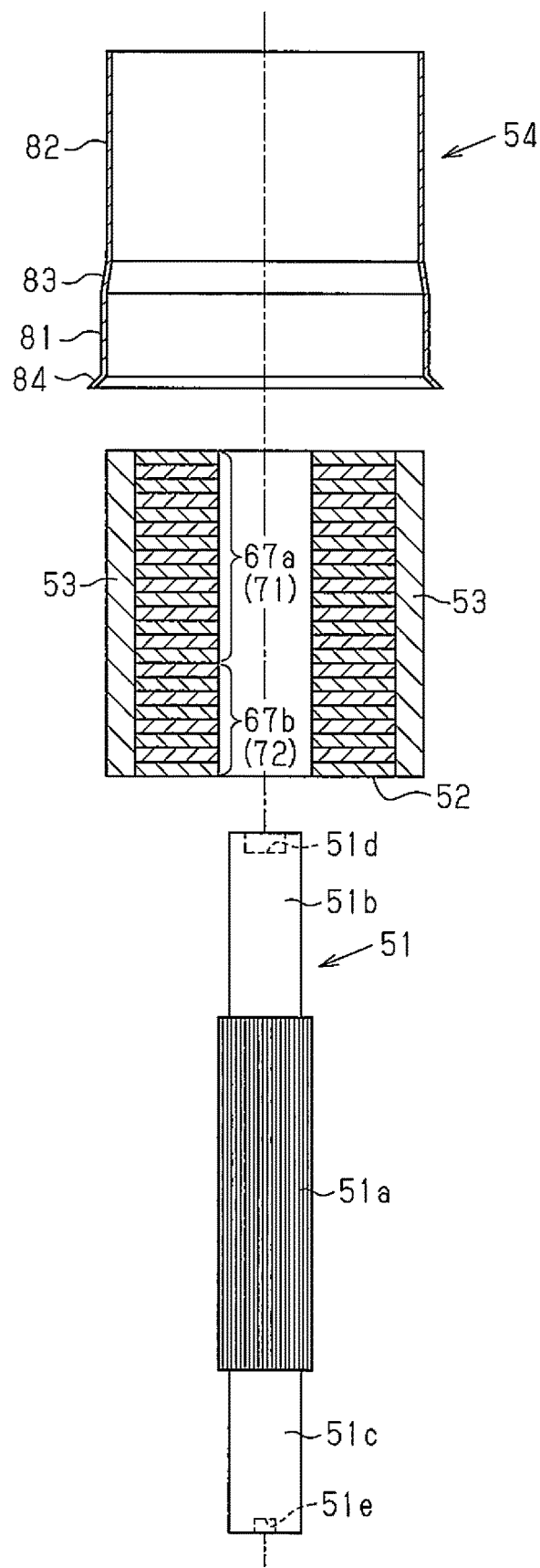
FIG. 15 is a diagram illustrating a method for manufacturing the rotor shown in FIG. 13.

As shown in FIGS. 13 and 15, the axially middle portion of the rotation shaft 51 includes a knurled portion 51a (not shown in FIG. 14) to which the rotor core 52 is fitted and fixed. Knurling is performed to form a large number of grooves that extend in the axial direction next to one another in the circumferential direction. This forms the knurled portion 51a of the present embodiment. Further, the rotation shaft 51 includes non-knurled portions 51b and 51c defined at opposite sides of the knurled portion 51a. The non-knurled portions 51b and 51c have different lengths. The non-knurled portion 51b located at one axial end (upper end as viewed in FIG. 13) of the rotation shaft 51 is longer than the non-knurled portion 51c located at the other axial end (lower end as viewed in FIG. 13) of the rotation shaft 51. A sensor magnet 57 is fixed to non-knurled portion 51b. One axial end surface of the rotation shaft 51 (upper end surface in FIG. 13) and the other axial end surface (lower end surface in FIG. 13) respectively include grooves 51d and 51e. In the present embodiment, the groove 51d in one axial end surface of the rotation shaft 51 and the groove 51e in the other axial end surface of the rotation shaft 51 are circular grooves of different diameters as viewed in the axial direction. The groove 51d in one axial end surface is a circular groove having a larger diameter than the groove 51e in the other axial end surface. The rotation shaft 51 is fixed to the rotor core 52 with the knurled portion 51a press-fitted into the rotor core 52 so that the longer non-knurled portion 51b, that is, the non-knurled portion 51b located at the one axial end including the large-diameter groove 51d, is located at the side of the rotor core 52 where the high hardness portion 71 is located.

Further, as shown in FIG. 3B, a plurality of (ten in the present embodiment) the permanent magnets 53 are arranged in the circumferential direction in contact with the outer surface (outer circumferential surface) of the rotor core 52.

Figure 16A:
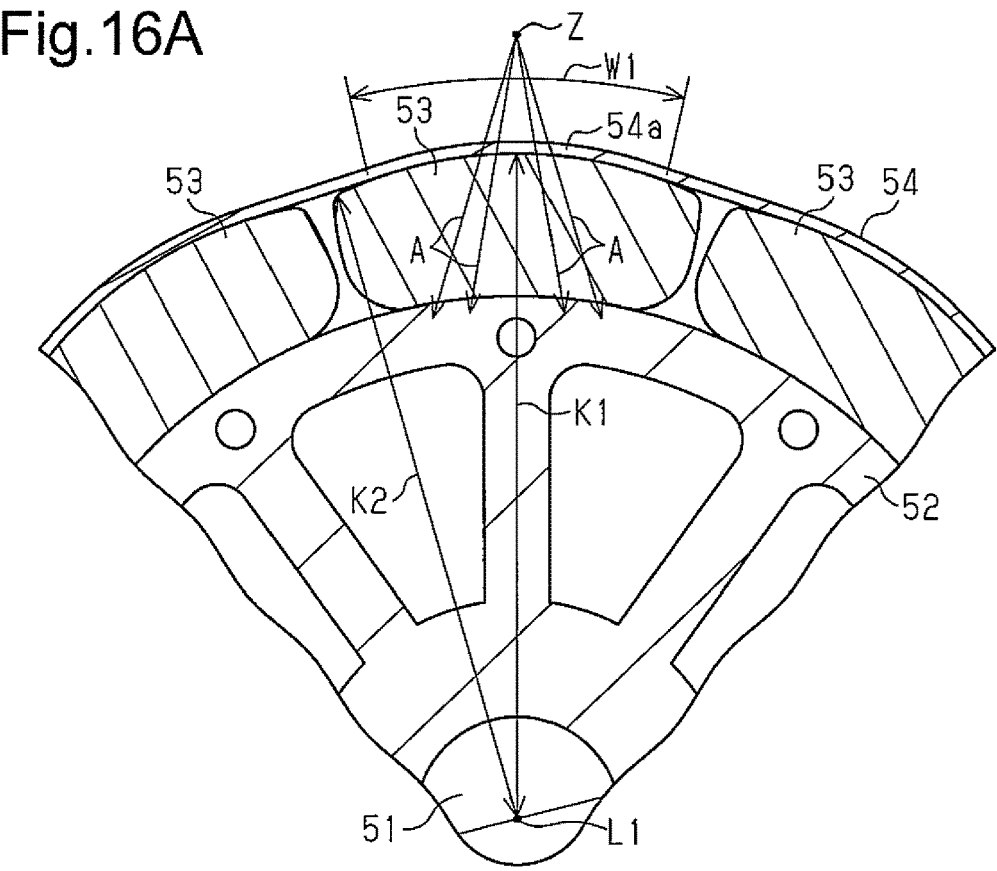
FIG. 16A is a partially, enlarged cross-sectional view of the rotor shown in FIG. 13.
Figure 16B:
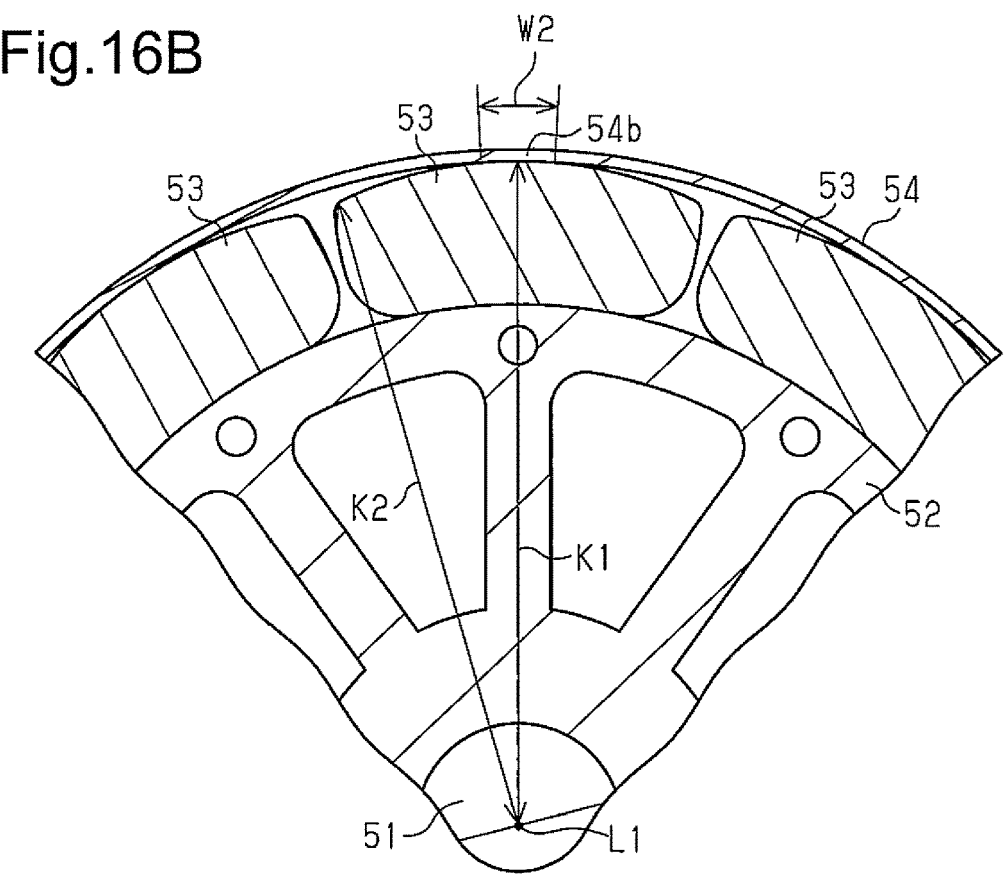
FIG. 16B is a partially, enlarged cross-sectional view of the rotor shown in FIG. 13.

As shown in FIGS. 16A and 16B, each permanent magnet 53 has a curved shape as viewed in the axial direction so that the distance from the axis L1 to the outer surface (radially outer surface) of the permanent magnet 53 is longer at the circumferentially middle portion than at the two circumferential ends. In detail, when the permanent magnets 53 are in contact with the outer surface of the rotor core 52, the distance K1 from the axis L1 to the circumferentially middle portion in the outer surface is longer (greater) of than the distance K2 from the axis L1 to each circumferential end of the outer surface. Further, referring to FIG. 16A, each permanent magnet 53 of the present embodiment is magnetized so that magnetic flux (refer to arrows A) passes through an orientation point A located at a radially outer side (rear radial side) of the circumferentially middle portion of the outer surface of the permanent magnet 53.

The tubular non-magnetic cover 54 that covers the outer surface of each permanent magnet 53 includes, in the axial direction, a high-pressure contact portion 54a (refer to FIG. 16A) and a low-pressure contact portion 54b (refer to FIG. 16B). As shown in FIG. 16A, the high-pressure contact portion 54a, which is located on the high hardness portion 71 of the rotor core 52 (upper side as viewed in FIG. 14), presses the outer surface of each permanent magnet 53 with a high pressure over a wide range W1 in the circumferential direction. As shown in FIG. 16B, the low-pressure contact portion 54b, which is located on the low hardness portion 72 of the rotor core 52 (lower side as viewed in FIG. 14), presses the outer surface of each permanent magnet 53 with a low pressure over a narrow range W2 in the circumferential direction (in generally point contact as viewed in the axial direction).

A method for manufacturing the rotor 15 will now be described.

The method for manufacturing the rotor 15 of the present embodiment includes a "shaft press-fitting step," a "non-magnetic cover forming step," and a "cover press-fitting step."

Referring to FIG. 15, in the "shaft press-fitting step," the rotation shaft 51 is inserted into the low hardness portion 72, and the knurled portion 51a is press-fitted into the rotor core 52. Here, the rotation shaft 51 is inserted from one axial end (upper end as viewed in FIG. 15), that is, the longer non-knurled portion 51b including the large-diameter circular groove 51d, into the rotor core 52.

Further referring to FIG. 15, the "non-magnetic cover forming step" forms the tubular non-magnetic cover 54 that covers the outer surface of each permanent magnet 53. The non-magnetic cover 54 includes a large-diameter portion 81 and a small-diameter portion 82 that are arranged in the axial direction. The large-diameter portion 81 (subsequently forming low-pressure contact portion 54b) has a large diameter, and the small-diameter portion 82 (subsequently forming high-pressure contact portion 54a) has a small inner diameter. In the "non-magnetic cover forming step" of the present embodiment, a diameter decreasing portion 83 having a gradually decreasing inner diameter is formed between the large-diameter portion 81 and the small-diameter portion 82. Further, the "non-magnetic cover forming step" of the present embodiment forms a diameter increasing guide portion 84 having an inner diameter that gradually increases on the open end of the large-diameter portion 81.

In the subsequent "cover press-fitting step," in a state in which the permanent magnets 53 are held in contact with the outer surface of the rotor core 52, the non-magnetic cover 54 formed in the "non-magnetic cover forming step" is press-fitted into the rotor core 52 so that the inner surface of the large-diameter portion 81 and the inner surface of the small-diameter portion 82 both come into contact with the outer surfaces of the permanent magnets 53. More specifically, a strong pressure is applied to the non-magnetic cover 54 in the axial direction to force the non-magnetic cover 54 onto the rotor core 52. In the "cover press-fitting step" of the present embodiment, the non-magnetic cover 54 is press-fitted onto the rotor core 52 from the large-diameter portion 81 (diameter increasing guide portion 84). Further, in the "cover press-fitting step" of the present embodiment, the non-magnetic cover 54 is press-fitted into the rotor core 52 from the high hardness portion 71. The diameter increasing guide portion 84 smoothly guides the non-magnetic cover 54 and first (lightly) press-fits the large-diameter portion 81 onto the rotor core 52 so as to cover the permanent magnets 53. Then, the diameter decreasing portion 83 smoothly guides the non-magnetic cover 54 and press-fits the small-diameter portion 82 onto the rotor core 52 so as to cover the permanent magnets 53. As a result, the large-diameter portion 81 forms the low-pressure contact portion 54b. Further, the small-diameter portion 82 is greatly deformed to form the high-pressure contact portion 54a. This manufactures the rotor 15.

The second embodiment has the advantages described below.

(8) In the "forming step," the non-magnetic cover 54 is formed with the large-diameter portion 81, which has a large inner diameter, and the small-diameter portion 82, which has a small inner diameter, arranged in the axial direction. In the "cover press-fitting step," when the permanent magnets 53 are held in contact with the outer surface of the rotor core 52, the non-magnetic cover 54, which has been formed in the "non-magnetic cover forming step," is press-fitted to the rotor core 52 so that the inner surface of the large-diameter portion 81 and the inner surface of the small-diameter portion 82 both come into contact with the outer surfaces of the permanent magnets 53. As a result, the small-diameter portion 82 (subsequently forming high-pressure contact portion 54a) rigidly holds the permanent magnets 53. Further, the large-diameter portion 81 keeps the press-fitting force from becoming too strong in the "cover press-fitting step" and thereby limits buckling of the non-magnetic cover 54. The inner surface of the large-diameter portion 81 (subsequently forming low-pressure contact portion 54b) also contacts the outer surfaces of the permanent magnets 53. Thus, the large-diameter portion 81 (low-pressure contact portion 54b) limits enlargement of the maximum outer diameter of the entire rotor 15. Further, the large-diameter portion 81 (low-pressure contact portion 54b) limits enlargement of a gap from the stator 13, which is opposed to the rotor 15.

(9) In the "cover press-fitting step," the non-magnetic cover 54 is fitted from the large-diameter portion 81 to the rotor core 52. Thus, the press-fitting is performed more easily as compared with when press-fitting the rotor core 52 from the small-diameter portion 82.

(10) The "non-magnetic cover forming step" forms the diameter decreasing portion 83 that gradually decreases the inner diameter between the large-diameter portion 81 and the small-diameter portion 82. This smoothly and easily press-fits the rotor core 52 from the large-diameter portion 81 to the small-diameter portion 82 in the "cover press-fitting step."

(11) The rotor core 52 includes the high hardness portion 71, which has a high hardness, and the low hardness portion 72, which has a low hardness, arranged in the axial direction. In the "cover press-fitting step," the non-magnetic cover 54 is press-fitted to the rotor core 52 from the high hardness portion 71. This reduces deformation of the rotor core 52 as compared with when press-fitting the non-magnetic cover 54 to the rotor core 52 from the low hardness portion 72.

(12) The non-magnetic cover 54 includes the high-pressure contact portion 54a, which contacts each permanent magnet 53 with a high pressure over the wide range W1 in the circumferential direction, and the low-pressure contact portion 54b, which contacts each permanent magnet 53 with a low pressure over the narrow range W2 in the circumferential direction. The high-pressure contact portion 54a and the low-pressure contact portion 54b are arranged in the axial direction. Thus, the high-pressure contact portion 54a rigidly holds the permanent magnets 53. Further, the low-pressure contact portion 54b keeps the press-fitting force from becoming too strong when coupling the non-magnetic cover 54 and thereby limits buckling of the non-magnetic cover 54. The low-pressure contact portion 54b also contacts the permanent magnets 53. This limits enlargement of the maximum outer diameter of the entire low-pressure contact portion 54b. Further, the low-pressure contact portion 54b limits enlargement of a gap from the stator 13, which is opposed to the rotor 15.

The second embodiment may be modified as described below.

In the "cover press-fitting step" of the above embodiment, the non-magnetic cover 54 is press-fitted to the rotor core 52 from the large-diameter portion 81 of the non-magnetic cover 54 but may instead be press-fitted from the small-diameter portion 82. In this case, it is preferred that the diameter increasing guide portion 84 be formed at the open end of the small-diameter portion 82.

In the "non-magnetic cover forming step" of the above embodiment, the diameter decreasing portion 83, which has a gradually decreasing inner diameter, is formed between the large-diameter portion 81 and the small-diameter portion 82. However, the diameter decreasing portion 83 does not have to be formed.

In the above embodiment, the rotor core 52 includes the high hardness portion 71, which has a high hardness, and the low hardness portion 72, which has a low hardness, arranged in the axial direction. Instead, for example, the hardness of the rotor cover may be uniform in the axial direction. That is, the rotor core sheets of the rotor core may all have the same hardness.

In the "cover-press-fitting step" of the above embodiment, the non-magnetic cover 54 is press-fitted to the rotor core 52 from the high hardness portion 71. Instead, the non-magnetic cover 54 may be fitted from the low hardness portion 72 to the rotor core 52.

A third embodiment according to the present invention will now be described with reference to FIGS. 17 to 20. Elements that are the same as the first embodiment shown in FIGS. 1 to 12 will not be described.

Figure 17:
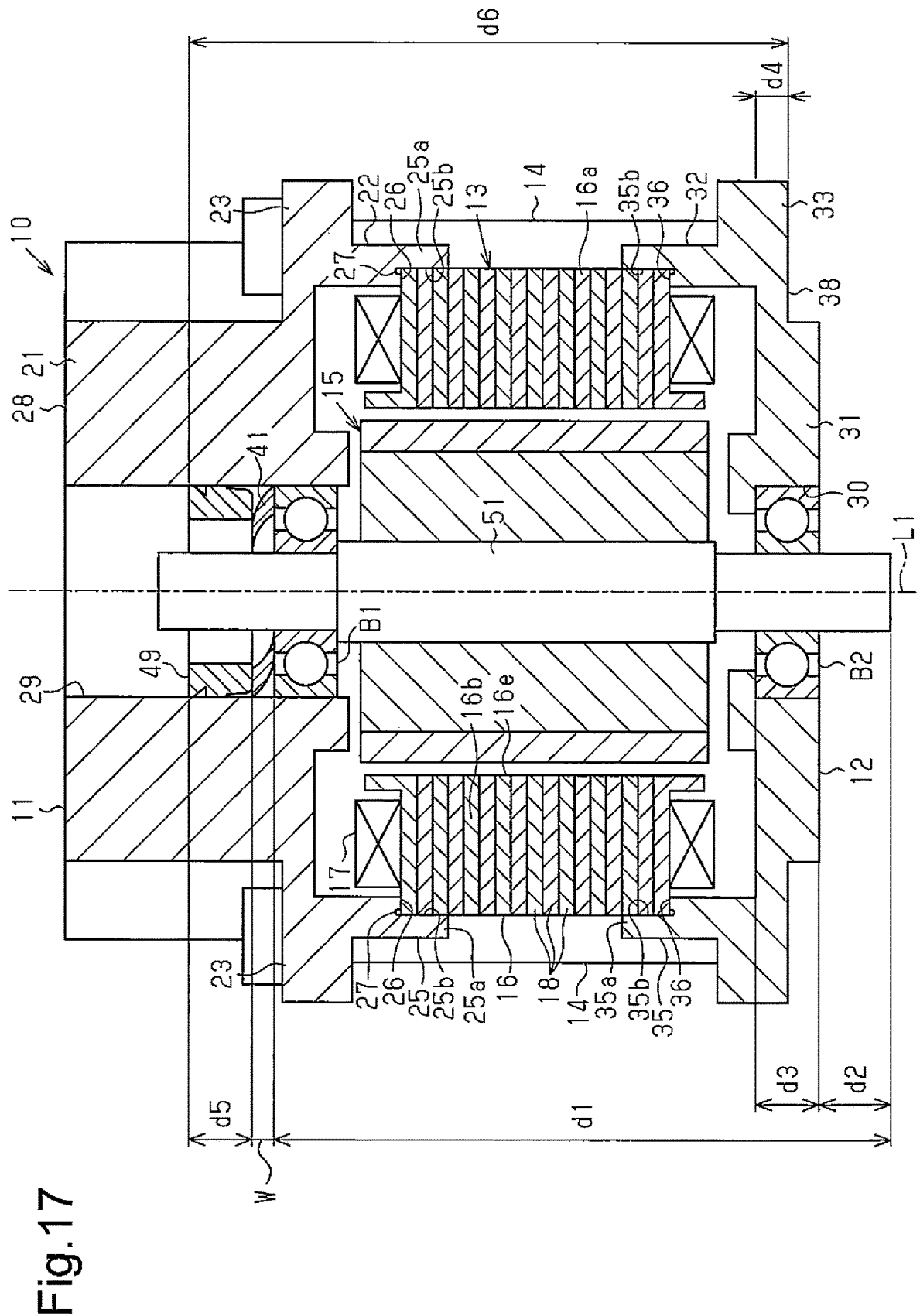
FIG. 17 is a schematic cross-sectional view showing the structure of a motor of a third embodiment.

FIG. 17 shows the first frame 11 that has sufficient thickness and functions as a heat sink for absorbing the heat generated by the motor 10.

As shown in FIG. 17, the bearing retainer 29, which allows for the insertion of the ball bearing B1, extends through the radially central portion of the first main body 21. The radially central portion of the second main body 31 includes the retainer 30 that allows for the insertion of the ball bearing B2.

The bearing retainer 29 has substantially the same inner diameter as the outer diameter of the ball bearing B1 and allows the ball bearing B1 to be fitted from the outer surface of the first main body 21. The retainer 30 opens toward the outer side of the second main body 31 and allows the ball bearing B2 to be retained from the output side in the axial direction.

One end of the rotation shaft 51 of the rotor 15 is inserted through the ball bearing B1 that is received in the bearing retainer 29 and the other end of the rotation shaft 51 is inserted through the ball bearing B2 that is received in the retainer 30. This rotationally supports the rotor 15 between the first frame 11 and the second frame 12.

Figure 18:
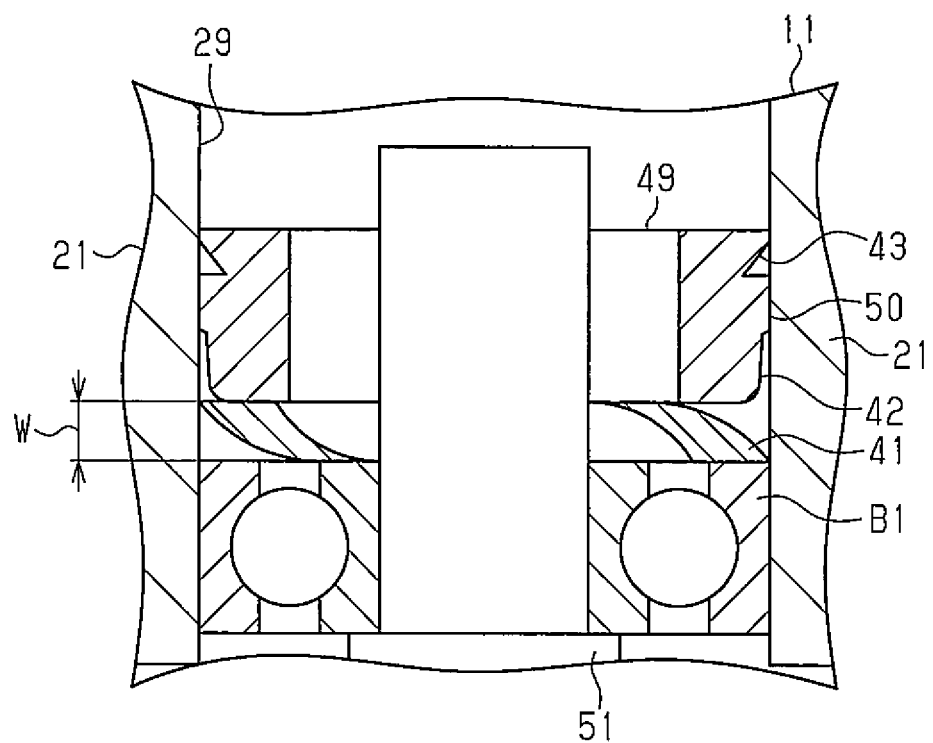
FIG. 18 is a cross-sectional view of a holding member shown in FIG. 17.

Referring to FIG. 18, the wave washer 41 is inserted into bearing retainer 29 following the ball bearing B1. The wave washer 41 is inserted into the bearing retainer 29 so that the central portion of the wave washer 41 receives one end of the rotation shaft 51.

Further, a holding member 49 is fitted into the bearing retainer 29 following the wave washer 41. The holding member 49 is annular and formed from a softer material than the first frame 11. Further, the holding member 49 has an outer diameter that is substantially the same as the inner diameter of the bearing retainer 29. The holding member 49 is fitted into the bearing retainer 29 by inserting the end of the rotation shaft 51 into the central portion of the holding member 49. This positions the wave washer 41 and the ball bearing B1 in the axial direction of the rotation shaft 51.

The axially middle portion of the outer circumferential surface of the holding member 49 defines a pressure-contact portion 50. The pressure-contact portion 50 has a slightly larger outer diameter than the inner diameter of the bearing retainer 29. The pressure-contact portion 50 produces friction with the inner circumferential surface of the bearing retainer 29 when fitted into and entering the bearing retainer 29.

As shown in FIG. 18, in the outer circumferential surface of the holding member 49, the portion closer to the wave washer 41 than the pressure-contact portion 50 defines an entering portion 42 that has a slightly smaller outer diameter than the pressure-contact portion 50. The entering portion 42 forms a slight gap with the inner circumferential surface of the bearing retainer 29. The entering portion allows the holding member 49 to be easily fitted into the bearing retainer 29.

In the outer circumferential surface of the holding member 49, the portion located toward the outer side of the pressure-contact portion 50 in the axial direction defines a burr retaining groove 43 in the circumferential direction. In other words, the burr retaining groove 43 extends between the outer circumferential surface of the holding member 49 and the inner circumferential surface of the bearing retainer 29. The burr retaining groove 43 includes a triangular cross-section and has a groove depth that increases toward the pressure-contact portion 50.

When the holding member 49 is fitted into the bearing retainer 29, the pressure-contact portion 50 is rubbed against the inner circumferential surface of the bearing retainer 29. This scrapes the surface of the pressure-contact portion 50 and generates burrs that are retained in the burr retaining groove 43.

When assembling the motor, the rotor 15 is positioned in the stator 13, the stator 13 is held between the first frame 11 and the second frame 12, and the two ends of the rotation shaft 51 of the rotor 15 are respectively inserted through the two ends of the ball bearings B1 and B2 of the first frame 11 and the second frame 12.

Then, while performing aligning with an aligning tool, pressing surfaces of a pressing device, held in contact with the pressed surfaces 28 and 38, press the first frame 11 and the second frame 12 toward each other.

In this state, the first frame 11 and the second frame 12 are fixed together with the through bolts 14. This fixes the stator 13, which is the stack of the core sheets 18, between the first frame 11 and the second frame 12 and rotationally supports the rotor 15 at the inner side of the stator 13.

Next, the wave washer 41 is inserted into the bearing retainer 29, and the holding member 49 is fitted into the bearing retainer 29. This positions the ball bearing B1 in the axial direction.

Under this situation, the ball bearing B1 is positioned with a certain pressure produced by the wave washer 41. Thus, the wave washer 41 needs to be fitted into the holding member 49 so that a set length W, which is the thickness of the wave washer 41 in the axial direction, has a predetermined value.

Referring to FIG. 17, d1 denotes the press-fit dimension of the ball bearing B1 from the end of the rotation shaft 51 that is proximate to the second end frame 12, d2 denotes the press-fit dimension of the rotation shaft 51 projecting out of the ball bearing B2, and d3 denotes the thickness of the ball bearing B2. Further, d4 denotes the dimension between the pressed surface 38, which serves as a reference surface, and the end surface of the ball bearing B2 that is closer to the rotor 15, that is, the substantial thickness of the second frame 12. Additionally, d5 denotes the thickness of the holding member 49, and d6 denotes the press-fit dimension of the holding member 49 from the pressed surface 38.

In this case, the set length W is expressed by W=d6−d1+d2+d3−d4−d5. Accordingly, the set length W of the wave washer 41 may be set regardless of the dimensional tolerance of the stator pressed between the first frame 11 and the second frame 12.

The advantages of the third embodiment will now be described.

(13) After coupling the rotor 15 and the stator 13 between the first frame 11 and the second frame 12, the wave washer 41 and the holding member 49 are fitted into the bearing retainer 29. This facilitates the coupling of the wave washer 41 and the holding member 49.

(14) When fitting the holding member 49 in the bearing retainer 29, burrs scraped from the holding member 49 are held in the burr retaining groove 43. This limits the entrance of burrs into the ball bearing B1 so that the generation of noise is limited at the ball bearing B1 and so that smooth rotation of the rotation shaft 51 is not impeded.

(15) The set length W of the wave washer 41 is set by fitting the holding member 49 and may be set regardless of the axial dimension toleration of the stator 13 pressed between the first frame 11 and the second frame 12. This facilitates the setting of the set length W.

The third embodiment may be modified as described below.

Figure 19:
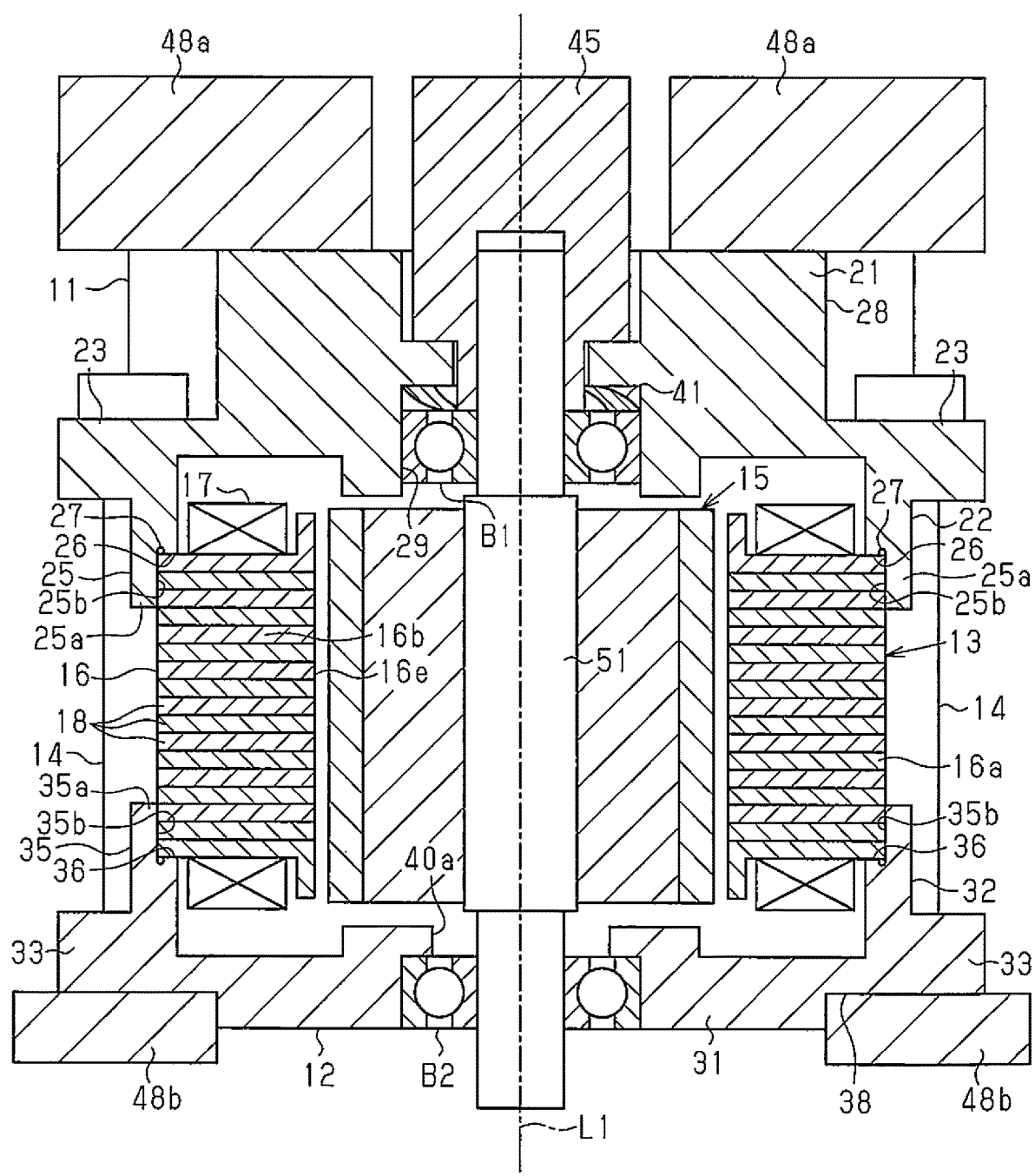
FIG. 19 is a cross-sectional view of a motor in a further example of the third embodiment.
Figure 20:
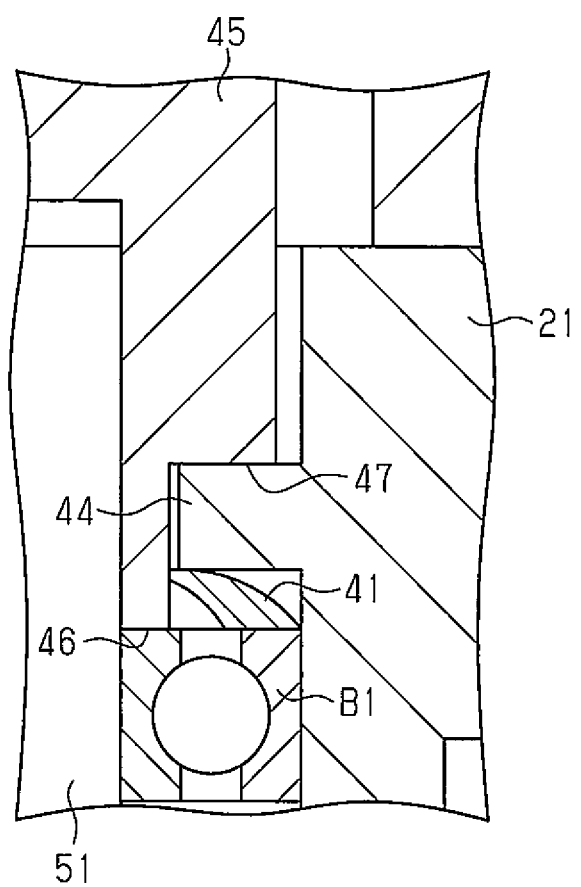
FIG. 20 is a cross-sectional view showing a holding portion of FIG. 19.

FIGS. 19 and 20 show a holding member formed integrally with a first end frame. As shown in the drawings, the first frame 11 includes a holding portion 44 that has a rectangular cross-section and projects toward the rotation shaft 51. A predetermined gap is formed between the distal end of the holding portion 44 and the circumferential surface of the rotation shaft 51 to allow for the insertion of a distal end 46 of a pressing member 45 that presses the ball bearing B1.

The pressing member 45 includes an abutment portion 47 that is pressed against the holding portion 44. The distance between the distal end 46 of the pressing member 45 and the abutment portion 47 is set to be the optimal set length W of the wave washer 41.

When assembling the motor, with the rotation shaft 51 inserted through the ball bearing B1 and the wave washer 41 in advance, pressing members 48*a* and 48*b* press the first frame 11 and the second frame 12 and couple the stator 13 and the rotor 15 between the first frame 11 and the second frame 12.

Then, the distal end of the pressing member 45 downwardly presses the ball bearing B1 until the abutment portion 47 of the pressing member 45 abuts against the holding portion 44. This holds the wave washer 41 with the optimal set length W between the holding portion 44 and the ball bearing B1.

In such a structure, the holding portion 44 is formed integrally with the first frame 11. This allows the press-fitting step of the holding member to be omitted.

The outer circumferential surface of the holding member 49 includes a plurality of burr retaining grooves extending in the circumferential direction and arranged in the axial direction.

A fourth embodiment according to the present invention will now be described with reference to FIGS. 21 to 31. Elements that are the same as the first embodiment shown in FIGS. 1 to 12 will not be described.

The rotor 15 includes the tubular non-magnetic cover 54 that holds and covers the outer surface of each permanent magnet 53. The permanent magnets 53 are each opposed to the inner circumferential surface of the stator core 16 (teeth 16*b* of radially inner end surface 16*e*) in the radial direction through the non-magnetic cover 54. The rotation shaft 51 includes a distal end (lower end as viewed in FIG. 21) that extends through the through hole 40*a* and projects from the ball bearing B2 out of the second frame 12, or the motor 10. A joint 55, which serves as an output, is coupled to the projecting portion of the rotation shaft 51 (refer to FIG. 22). Further, the rotation shaft 51 includes a basal end (upper end as viewed in FIG. 21) that extends through the through hole 29*a* and projects out of the first frame 11. The disk-shaped sensor magnet 57 is fixed by a fixing member 56 to the projecting portion.

Figure 21:
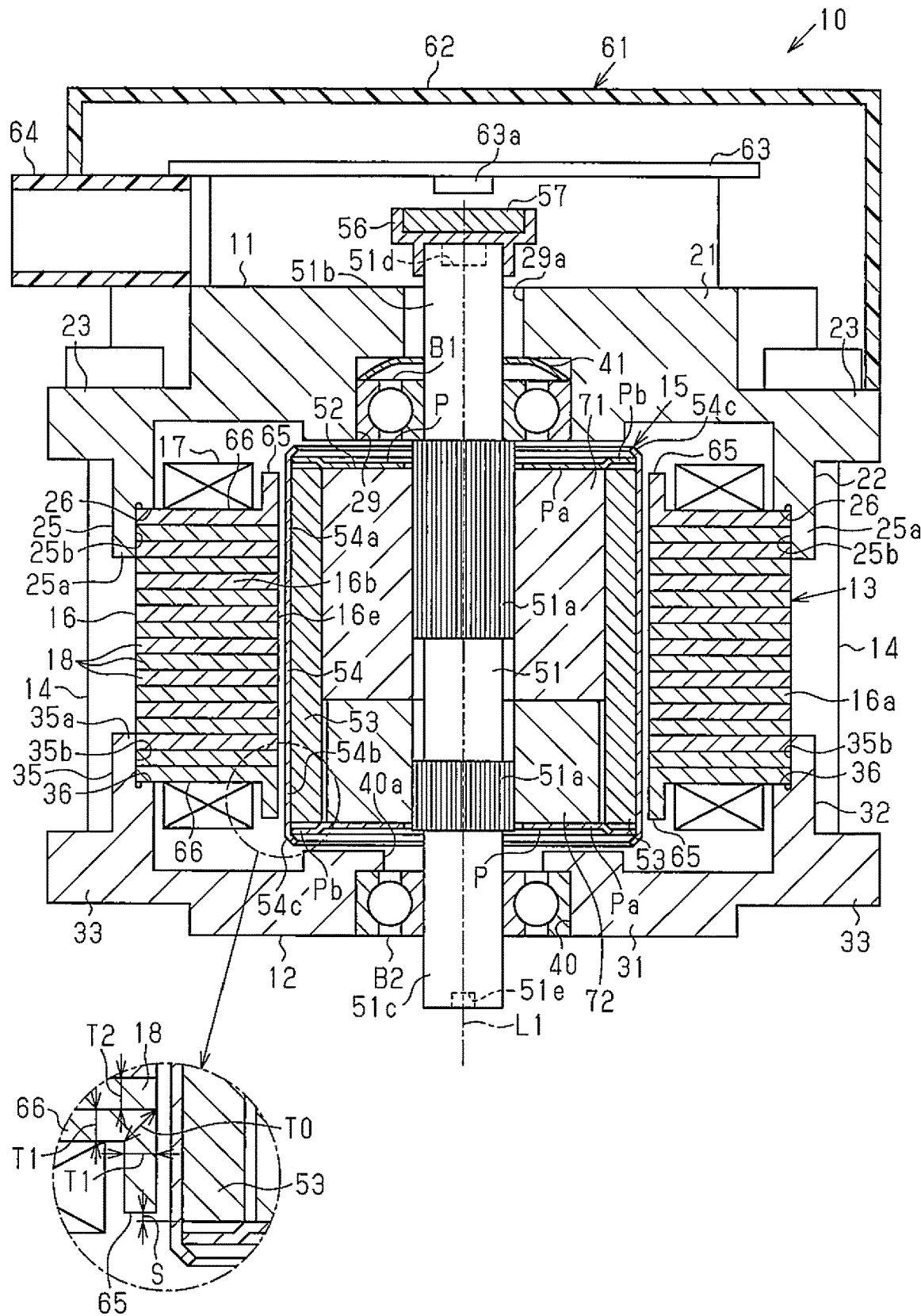
FIG. 21 is a schematic cross-sectional view showing the structure of a motor of a fourth embodiment.
Figure 22:
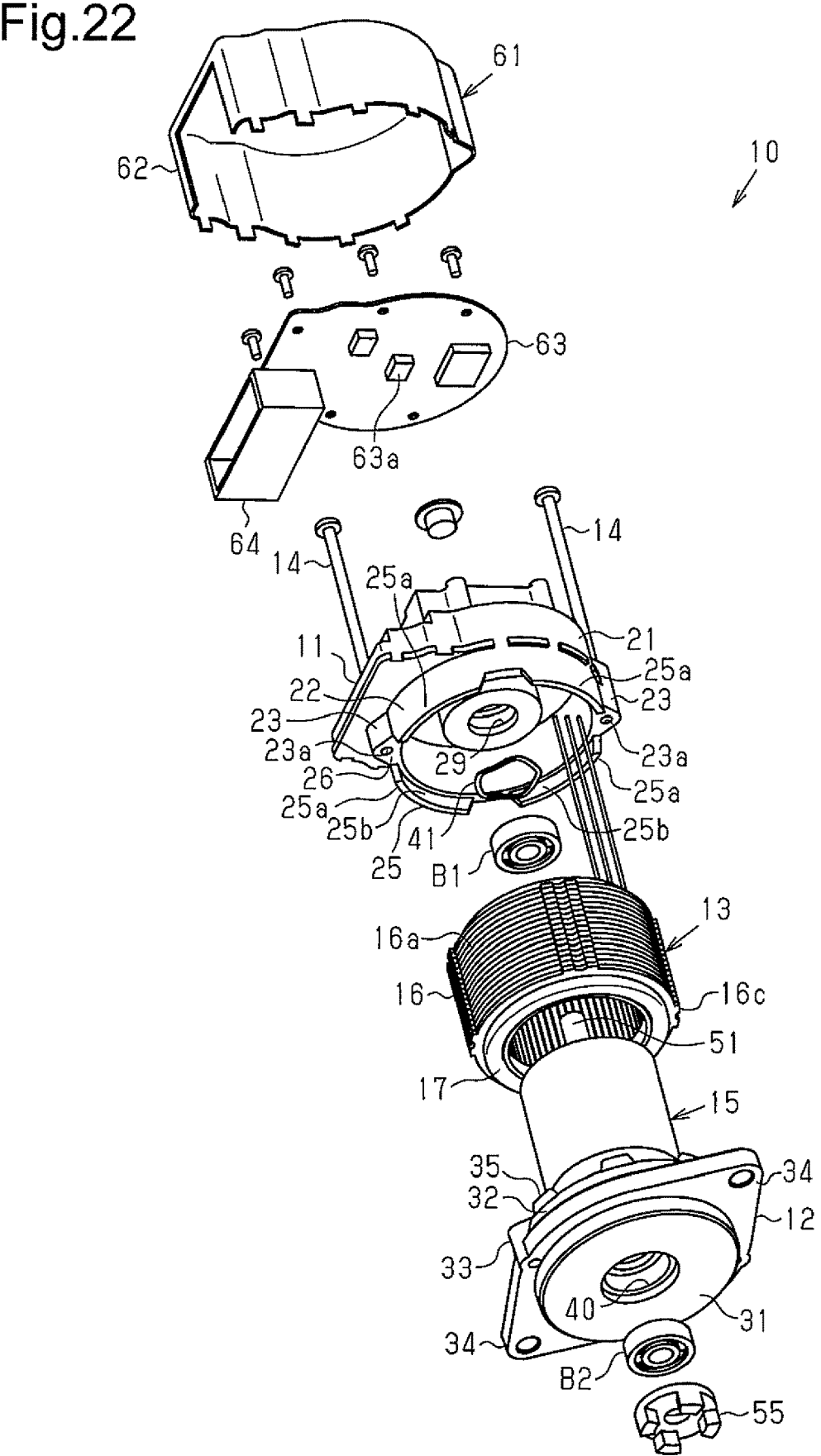
FIG. 22 is an exploded perspective view of the motor shown in FIG. 21.
Figure 23B:
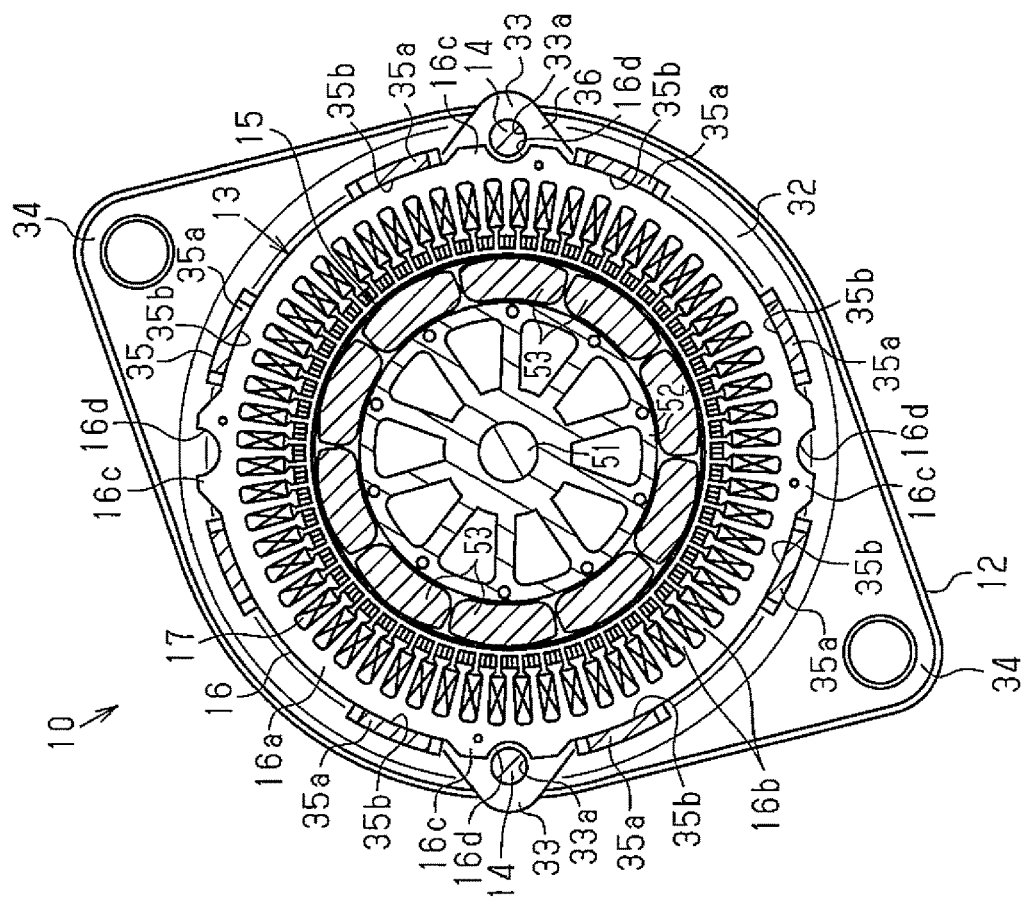
FIG. 23B is a cross-sectional view of the motor taken along line b-b in FIG. 23A.
Figure 23A:
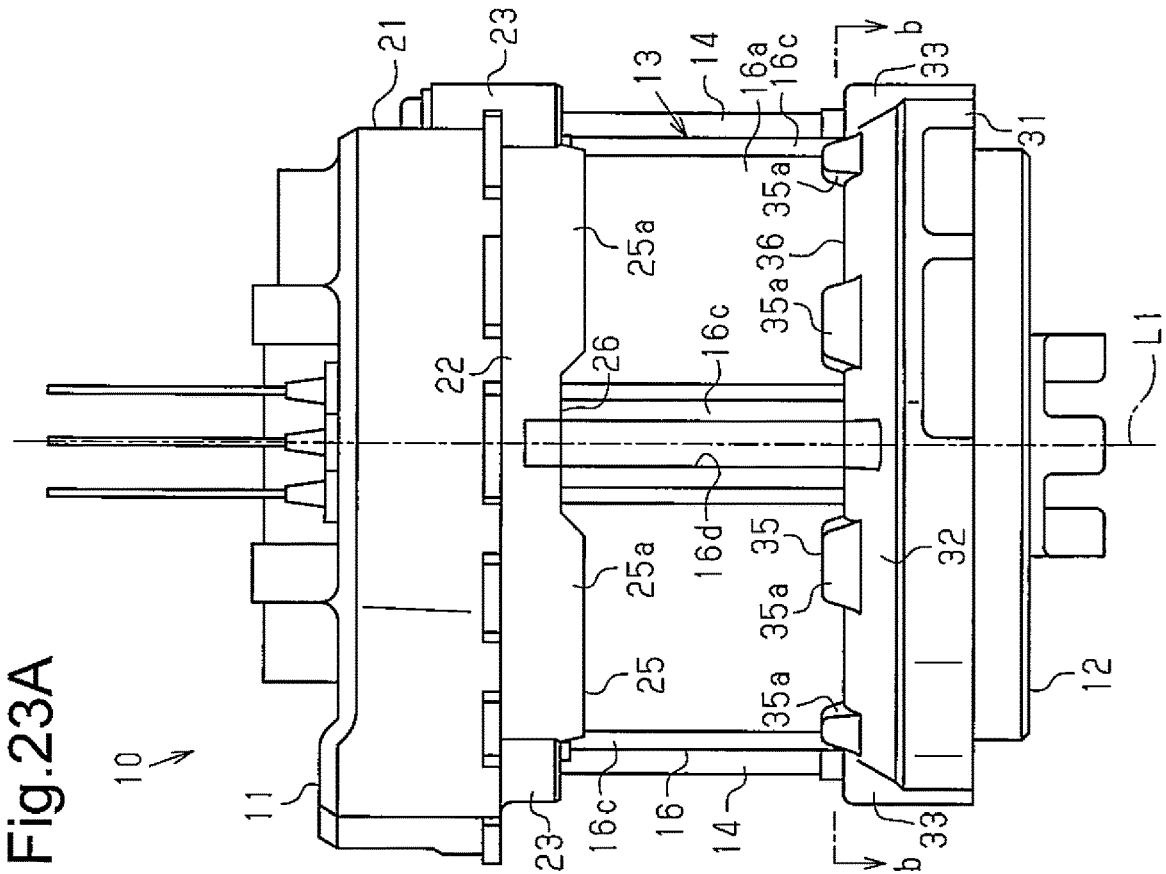
FIG. 23A is a side view of the motor shown in FIG. 21.

As shown in FIGS. 21 and 22, the control unit 61 is fixed to the outer surface of the first frame 11 in the same manner as the second embodiment. Various elements including a magnetic sensor 63*a*, which is opposed to the sensor magnet 57, are mounted on the circuit board 63.

Figure 24:
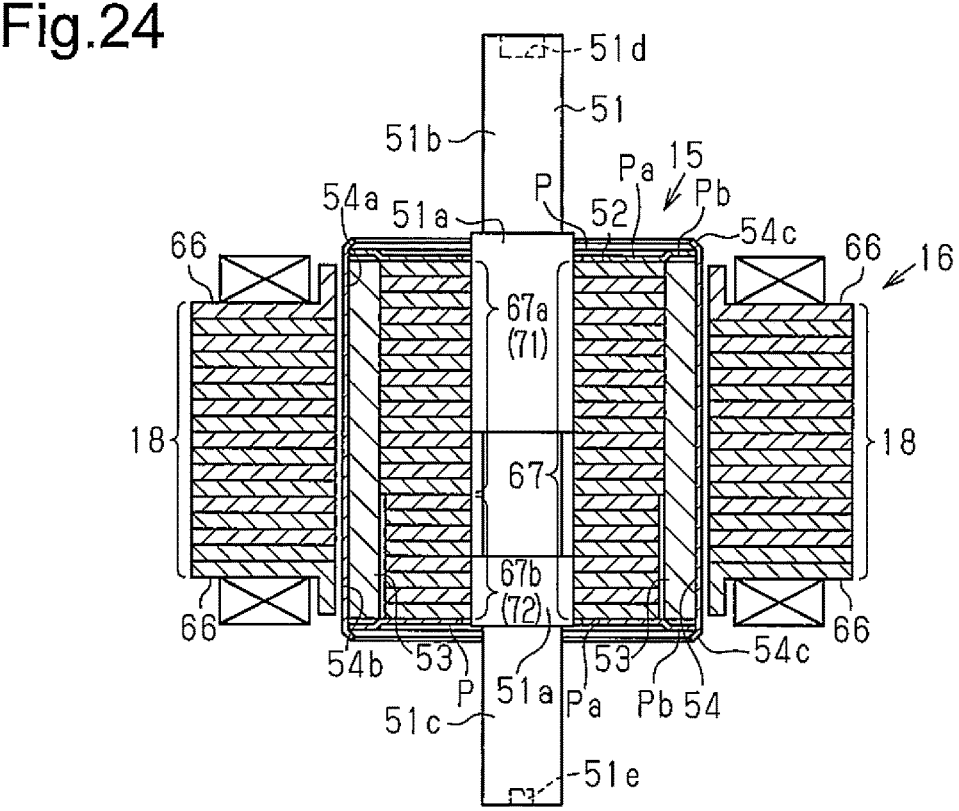
FIG. 24 is a cross-sectional view of a stator core and a rotor shown in FIG. 21.

As shown in FIG. 24, in the present embodiment, the rotor core 52 of the rotor 15 is formed by a stack of the rotor core sheets 67. The rotor core sheets 67 and the stator core sheets 18 each have the same thickness. The rotor core sheets 67 include the main rotor core sheets 67*a*, which serve as engagement sheets and the number of which is the same as the number of the stacked stator core sheets 18, and the auxiliary rotor core sheets 67*b*, the number of which corresponds to the number of non-engagement sheets that are lacking, so that the outer circumferential surface of the rotor core 52 opposes the entire inner circumferential surface of the stator core 16 that includes the L-shaped cores 66 (rotor opposing portion 65).

The main rotor core sheets 67a are pressed and punched from the same magnetic steel sheets as the stator core sheets 18. More specifically, referring to FIG. 25, the stator core sheets 18 and the main rotor core sheets 67a are each formed by pressing the same magnetic steel sheet 68.

Each main rotor core sheet 67a serves as an engagement sheet having an outer surface including magnet engagement portions 69 (refer to FIG. 27) that contact and engage the outer surfaces of the permanent magnets 53 in the circumferential direction. In the present embodiment, each magnet engagement portion 69 projects radially outward and has a circumferential width that decreases toward the distal side.

The auxiliary rotor core sheets 67b are formed in a separate process by punching SPCC steel (cold rolled steel sheet) that is softer (have lower hardness) than magnetic steel. Each auxiliary rotor core sheet 67b serves as a non-engagement sheet that does not engage the permanent magnets 53 in the circumferential direction (magnet engagement portions 69 not included). The auxiliary rotor core sheets 67b have a smaller outer diameter than the main rotor core sheets 67a. In detail, the outer diameter of each auxiliary rotor core sheets 67b, excluding the magnet engagement portions 69, is smaller than the outer diameter of each main rotor core sheet 67a, which contacts the radially inner end surfaces of the permanent magnets 53.

In the same manner as the second embodiment, the rotor core 52 includes the high hardness portion 71, which has a high hardness and is formed by stacking the main rotor core sheets 67a, and the low hardness portion 72, which has a low hardness and is formed by stacking the auxiliary rotor core sheets 67b, in the axial direction. More specifically, in the present embodiment, the rotor core 52 includes the stack of the main rotor core sheets 67a at one axial end (upper side as viewed in FIGS. 24 and 26) and the stack of the auxiliary rotor core sheets 67b at the other axial end (lower side as viewed in FIGS. 24 and 26). Further, there are more main rotor core sheets 67a than the auxiliary rotor core sheets 67b, and the high hardness portion 71 is longer in the axial direction than the low hardness portion 72. To aid visual understanding, the drawings are illustrated in an exaggerated manner to show that the outer diameter of the auxiliary rotor core sheets 67b (low hardness portion 72) is smaller than the outer diameter of the main rotor core sheets 67a (the high hardness portion 71). The outer diameter of the auxiliary rotor core sheets 67b is set so as not to be larger than the outer diameter of the main rotor core sheets 67a even when a manufacturing error occurs.

Figure 26:
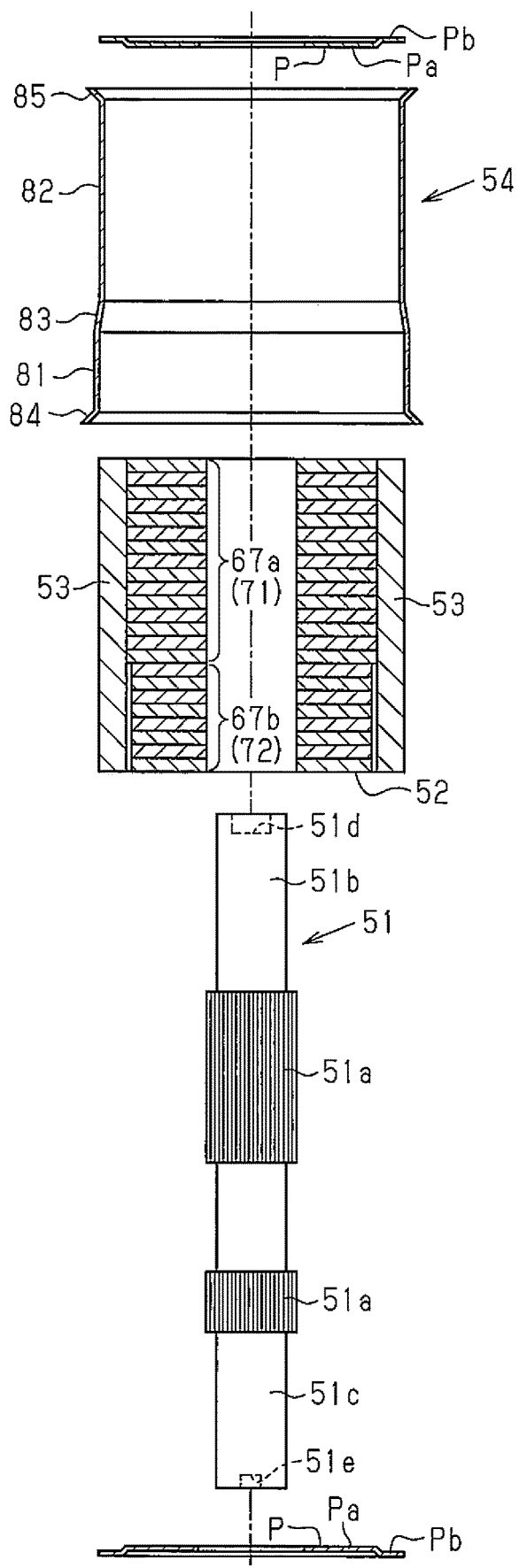
FIG. 26 is a diagram showing a method for manufacturing the motor of FIG. 21.

As shown in FIGS. 21 and 26, the rotor core 52 is fitted to and fixed to the middle portion of the rotation shaft 51 in the longitudinal direction (axial direction). In other words, the rotation shaft 51 includes the knurled portion 51a (not shown in FIG. 24), which serves as a press-fit portion and to which the rotor core 52 is press-fitted. In the present embodiment, the knurled portion 51a has a larger diameter than the other portions and is formed at a plurality of (two in present embodiment) locations in the axial direction. Each knurled portion 51a is formed by performing knurling to obtain a large number of grooves that extend in the axial direction next to one another in the circumferential direction. The two knurled portions 51a, which are spaced apart, are press-fitted and fixed to the two ends of the rotor core 52 (open end at side of high hardness portion 71 and open end at side of low hardness portion 72). Further, the knurled portions 51a are press-fitted into the rotor core 52 in a range that excludes the boundary of the high hardness portion 71 and the low hardness portion 72. That is, the two knurled portions 51a are press-fitted into the rotor core 52 so that the boundary of the high hardness portion 71 and the low hardness portion 72 is located between the knurled portions 51a. The two ends of the rotation shaft 51 define the non-knurled portions 51b and 51c that are free from the knurled portions 51a. The non-knurled portions 51b and 51c have different lengths. The non-knurled portion 51b located at one axial end (upper end as viewed in FIG. 21) to which the sensor magnet 57 is fixed is longer than the non-knurled portion 51c located at the other axial direction (lower end as viewed in FIG. 21). One axial end surface (upper end surface as viewed in FIG. 21) and the other axial end surface (lower end surface as viewed in FIG. 21) of the rotation shaft 51 respectively include the grooves 51d and 51e that have different shapes. In the present embodiment, the groove 51d in one axial end surface of the rotation shaft 51 and the groove 51e in the other axial end surface of the rotation shaft 51 are circular grooves having different diameters as viewed in the axial direction. The groove 51d in one axial end surface is a circular grove having a larger diameter than the groove 51e in the other axial end surface. Further, the rotation shaft 51 is fixed to the rotor core 52 with the knurled portions 51a press-fitted to the rotor core 52 so that the longer non-knurled portion 51b, that is, the non-knurled portion 51b located at the one axial end including the groove 51d with the large diameter, is located closer to the high hardness portion 71 of the rotor core 52.

Figure 27A:
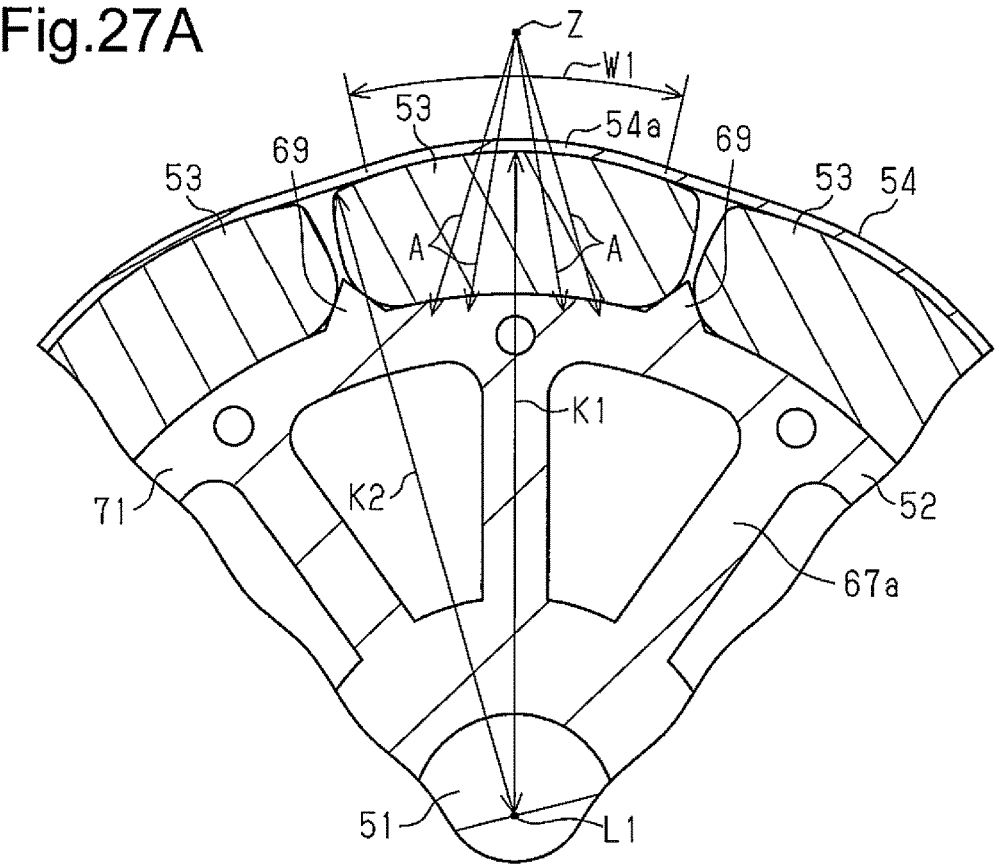
FIG. 27A is a partially, enlarged cross-sectional view of the rotor shown in FIG. 21.
Figure 27B:
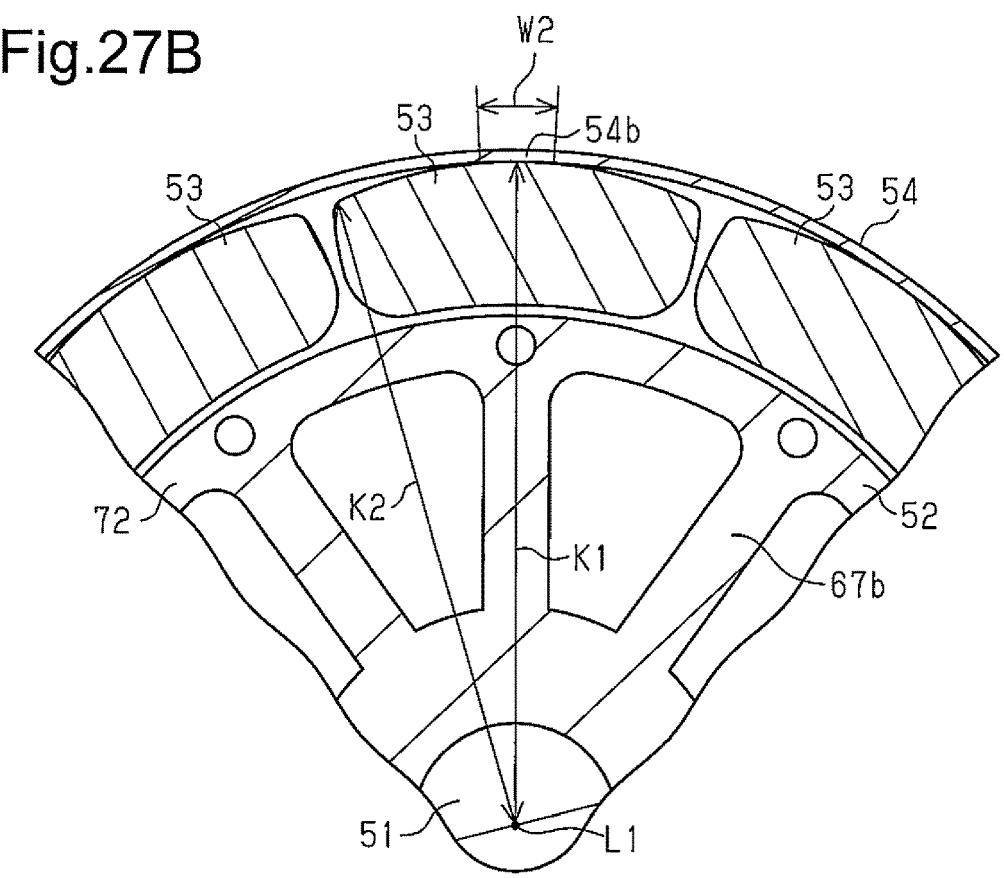
FIG. 27B is a partially, enlarged cross-sectional view of the rotor shown in FIG. 21.

As shown in FIGS. 27A and 27B, a plurality of (ten in the present embodiment) of the permanent magnets 53 are arranged in the circumferential direction contacting the outer surface (outer circumferential surface) of the rotor core 52. In the present embodiment, the permanent magnets 53 are arranged in contact with the outer surface of the high hardness portion 71, which is formed by the stack of the main rotor core sheets 67a (excluding magnet engagement portions 69, refer to FIG. 27A), and slightly separated from the outer surface of the low hardness portion 72, which is formed by the stack of the auxiliary rotor core sheets 67b. The permanent magnets 53 are each arranged so that its two circumferential ends are engaged with the magnet engagement portions 69 in the circumferential direction. Otherwise, the structure of the permanent magnets 53 is the same as the second embodiment.

The tubular non-magnetic cover 54 that covers the outer surfaces of the permanent magnets 53 includes the high-pressure contact portion 54a (refer to FIG. 27A) and the low-pressure contact portion 54b (refer to FIG. 27B) in the axial direction in the same manner as the second embodiment. Further, as shown in FIGS. 21 and 24, plates P are arranged in the non-magnetic cover 54 at the two axial ends in contact with the axial end surfaces of the rotor core 52. The plates P each include a contact portion Pa, which contacts the rotor core 52, and an outer ring Pb, which is bent from the contact portion Pa and away from the permanent magnets 53 in the axial direction while extending radially outward. The two axial ends of the non-magnetic cover 54 are swaged about the edges of the plates P to form swaged enclosing portions 54c. This fixes and restricts movement of the non-magnetic cover 54. The plates P are each arranged so that the outer ring Pb is spaced apart from the permanent magnets 53 in the axial direction to limit cracking of the permanent magnets 53 when the swaged enclosing portions 54c are formed.

In the present embodiment, the permanent magnets 53 are longer in the axial direction than the stator core 16 that includes the L-shaped cores 66. Further, the relationship of each member shown in FIG. 21 is set to satisfy thickness T0 of bent portion of each L-shaped core 66 greater than axial thickness T1 of planar portion (portion excluding rotor opposing portion 65) of each L-shaped core 66 and radial thickness T1 of the rotor opposing portion 65 greater than axial distance S between axial end of the permanent magnets 53 and corresponding axial end of the rotor opposing portion 65.

A method for manufacturing the motor 10 will now be described.

In the present embodiment, the method for manufacturing the motor 10 includes a "main punching step," a "sub-punching step," a "stator forming step," a "rotor core forming step," a "shaft press-fitting step," a "non-magnetic cover forming step," and a "cover press-fitting step."

Figure 25:
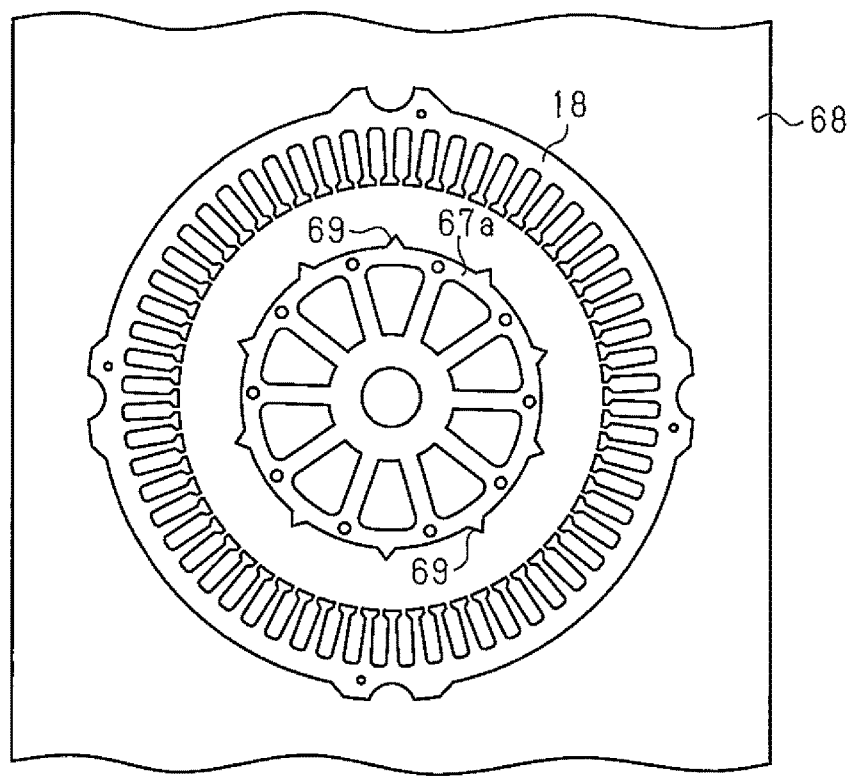
FIG. 25 is a diagram showing a method for manufacturing the motor of FIG. 21.

As shown in FIG. 25, in the "main punching step," the main rotor core sheets 67a, the number of which is the same as the stator core sheets 18, are punched from the same magnetic steel sheet 68 together with the stator core sheets 18. In the present embodiment, the main rotor core sheets 67a are punched as engagement sheets including the magnet engagement portions 69 that engage the permanent magnets 53 in the circumferential direction.

In the "sub-punching step," the auxiliary rotor core sheets 67b are punched from SPCC steel (cold rolled steel sheet) that is softer (have lower hardness) than magnetic steel. In the present embodiment, the auxiliary rotor core sheets 67b are punched as non-engagement sheets (free of magnet engagement portions 69) that do not engage the permanent magnets 53 in the circumferential direction. The auxiliary rotor core sheets 67b have a smaller outer diameter than the main rotor core sheets 67a.

In the "stator forming step," the stator core sheets 18 formed in the "main punching step" are stacked on the separately formed L-shaped cores 66 to form the stator core 16 that includes the rotor opposing portions 65.

In the "rotor core forming step," the main rotor core sheets 67a and the auxiliary rotor core sheets 67b, which are formed in the "main punching step" and the "sub-punching step," are stacked to form the rotor core 52.

Referring to FIG. 26, in the "shaft press-fitting step," the rotation shaft 51 is inserted from the low hardness portion 72 (portion where auxiliary rotor core sheets 67b are stacked) to press-fit the knurled portions 51a into the rotor core 52, which is formed in advanced as described above. The rotation shaft 51 includes the two knurled portions 51a that are spaced apart in the axial direction as described above. Thus, the rotation shaft 51 (knurled portions 51a) is press-fitted to the rotor core 52 in a shorter range than the axial length of the rotor core 52. In other words, the pressure-fitting applies pressure to a range that that is shorter than the axial length of the rotor core 52.

Further, as shown in FIG. 26, the "non-magnetic cover forming step" forms the tubular non-magnetic cover 54 that covers the outer surface of each permanent magnet 53. The non-magnetic cover 54 includes the large-diameter portion 81 (subsequently forming low-pressure contact portion 54b), which has a large inner diameter, and the small-diameter portion 82 (subsequently forming high-pressure contact portion 54a), which has a small inner diameter, arranged in the axial direction. Further, in the present embodiment, the "non-magnetic cover forming step" forms the diameter decreasing portion 83, which has a gradually decreasing inner diameter, between the large-diameter portion 81 and the small-diameter portion 82. In the present embodiment, the "non-magnetic cover forming step" also forms the diameter increasing guide portion 84, which has a gradually increasing inner diameter, at the open end of the large-diameter portion 81. Further, in the present embodiment, the "non-magnetic cover forming step" forms a diameter increasing portion 85, which has a gradually increasing diameter, at the open end of the small-diameter portion 82.

Then, in the subsequent "cover press-fitting step," the non-magnetic cover 54, which was formed in the "non-magnetic cover forming step," is press-fitted into the rotor core 52 with the outer surface of the rotor core 52 held in contact with the permanent magnets 53 so that the inner surface of the large-diameter portion 81 and the inner surface of the small-diameter portion 82 both contact the outer surfaces of the permanent magnets 53. More specifically, a strong pressure is applied to press the non-magnetic cover 54 in the axial direction and cover the rotor core 52 with the non-magnetic cover 54. In the present embodiment, the "cover press-fitting step" press-fits the non-magnetic cover 54 into the rotor core 52 from the large-diameter portion 81 (diameter increasing guide portion 84) of the non-magnetic cover 54. Further, in the present embodiment, the "cover press-fitting step" press-fits the non-magnetic cover 54 into the rotor core 52 from the high hardness portion 71 (main rotor core sheets 67a). Thus, the non-magnetic cover 54 is smoothly guided by the diameter increasing guide portion 84 so that the large-diameter portion 81 is first (lightly) press-fitted to cover the permanent magnets 53 and then smoothly guided by the diameter decreasing portion 83 until the small-diameter portion 82 covers the permanent magnets 53. Consequently, the large-diameter portion 81 forms the low-pressure contact portion 54b, and the small-diameter portion 82 deforms greatly and forms the high-pressure contact portion 54a. Then, referring to FIGS. 21 and 24, the plates P are accommodated in the non-magnetic cover 54 from the two axial sides. Further, the diameter increasing guide portion 84 and the diameter increasing portion 85 are swaged inward about the edges of the plates P to form the swaged enclosing portions 54c. This restricts relative movement of the rotor core 52 and the non-magnetic cover 54 in the axial direction and manufactures the rotor 15.

The advantages of the fourth embodiment will now be described.

(16) The rotor core 52 is formed by arranging the high hardness portion 71, which has a high hardness, and the low hardness portion 72, which has a low hardness, in the axial direction. Thus, by press-fitting the rotation shaft 51 (knurled portions 51a) to the rotor core 52 from the low hardness portion 72 (auxiliary rotor core sheets 67b), the formation of burrs may be reduced (as compared with when press-fitted from high hardness portion 71). This allows steps of, for example, deburring to be omitted and facilitates manufacturing. Further, the low hardness portion 72 has a smaller outer diameter than the high hardness portion 71. Thus, for example, unexpected steps are not formed in the outer surface of the rotor core 52. Such unexpected steps may be formed because of manufacturing errors when the low hardness portion 72 and the high hardness portion 71 have the same outer diameter. This, for example, limits tilting of the permanent magnets 53 that would be caused by, for example, an unexpected step, and the permanent magnets 53 are supported and held in stable contact (no tilt) with the outer surface of the high hardness portion 71. Thus, the step of press-fitting the non-magnetic cover 54 to cover the outer surface of each permanent magnet 53 is stably performed with the permanent magnets 53 held in contact with the outer surface of the rotor core 52 (high hardness portion 71).

(17) The high hardness portion 71 is longer in the axial direction than the low hardness portion 72. Thus, the permanent magnets 53 are supported and held in further stable contact (no tilt) with the outer surface of the high hardness portion 71.

(18) In the manufacturing method, the main rotor core sheets 67*a* are punched together with the stator core sheets 18 (at inner side of stator core sheets 18). This increases the yield as compared with when punching the main rotor core sheets 67*a* and the stator core sheets 18 from different sheets. Further, the auxiliary rotor core sheets 67*b* have a smaller outer diameter than the main rotor core sheets 67*a*, and the main rotor core sheets 67*a* having a large diameter are punched together with the stator core sheets 18. This, for example, increases the yield as compared with when punching the auxiliary rotor core sheets 67*b* instead with the stator core sheets 18.

(19) The non-magnetic cover 54 is press-fitted from the high hardness portion 71, which is formed by the main rotor core sheets 67*a*. This limits tilting of the permanent magnets 53 during the press-fitting. More specifically, when the non-magnetic cover 54 is press-fitted from the low hardness portion 72, which is formed by the auxiliary rotor core sheets 67*b*, the low hardness portion 72 that has a small outer diameter would produce force acting to tilt the permanent magnets 53 in the initial press-fitting stage. Such situations may be limited by press-fitting the non-magnetic cover 54 from the high hardness portion 71. Further, deformation of the rotor core 52 is limited as compared with when the non-magnetic cover 54 is press-fitted from the low hardness portion 72.

(20) The rotation shaft 51 (knurled portions 51*a*) is fixed and press-fitted to the rotor core 52 over a range that is shorter than the axial length of the rotor core 52. Thus, the press-fitting load is smaller as compared with when press-fitting the rotation shaft 51 over a range extending over the same axial length as the rotor core 52. This facilitates the press-fitting.

(21) The rotation shaft 51 (knurled portions 51*a*) is fixed and press-fitted to the two ends of the rotor core 52. This limits loosening of the rotation shaft 51 even though the rotation shaft 51 is press-fitted over a range that is shorter than the axial length of the rotor core 52. More specifically, when the rotation shaft 51 (knurled portions 51*a*) is press-fitted to the axially middle portion of the rotor core 52, the rotation shaft 51 easily becomes loose from the rotor core 52. However, the rotation shaft 51 is press-fitted to include the two ends of the rotor core 52 and limit loosening.

(22) The rotation shaft 51 (knurled portions 51*a*) is press-fitted to and fixed to the rotor core 52 in a range separated from the boundary of the high hardness portion 71 and the low hardness portion 72. Thus, even when a manufacturing error forms a slight step at the boundary between the high hardness portion 71 and the low hardness portion 72, stress would not be continuously applied to the boundary. More specifically, when a manufacturing error forms a slight step at the boundary of the high hardness portion 71, press-fitting of the rotation shaft 51 (knurled portion 51*a*) to the low hardness portion 72 at the boundary would cause the step to continuously apply stress to the press fitted portion. However, such a situation is avoided.

(23) The rotation shaft 51 includes a plurality of the knurled portions 51*a* in the axial direction serving as press-fitted portions having a large diameter. Thus, in the present embodiment, the rotor core 52 has a uniform inner diameter and facilitates manufacturing, and the rotation shaft 51 is press-fitted to the rotor core 52 over a range that is shorter than the axial length of the rotor core 52.

(24) The rotor core sheets 67 include the main rotor core sheets 67*a* serving as engagement sheets. Each engagement sheet includes the magnet engagement portions 69 that engage the permanent magnets 53 in the circumferential direction. This restricts displacement of the permanent magnets 53 in the circumferential direction. Further, the rotor core sheets 67 include the auxiliary rotor core sheets 67*b* serving as non-engagement sheets. Each non-engagement sheet does not engage the permanent magnets 53 in the circumferential direction. The auxiliary rotor core sheets 67*b* that are free of the magnet engagement portions 69 are produced with a higher yield and occupy less area than the main rotor core sheets 67*a*. For example, when all of the rotor core sheets 67 are main rotor core sheets 67*a*, the yield may be increased. This allows the sheet metal used to form (punch) the rotor core sheets 67 to be reduced in area.

(25) The main rotor core sheets 67*a*, which include the magnet engagement portions 69, are formed from a material having a higher hardness than the auxiliary rotor core sheets 67*b*. Thus, for example, displacement of the permanent magnets 53 in the circumferential direction is restricted in a further rigid manner as compared with when the main rotor core sheets 67*a* are formed from a material having a low hardness.

(26) The main rotor core sheets 67*a*, which is punched together with the stator core sheets 18 (at inner side of stator core sheets 18), uses the same area of a punched sheet regardless of whether or not the magnet engagement portions 69 are included. Thus, even when the main rotor core sheets 67*a* includes the magnet engagement portions 69, there is no difference in yield as compared to when the magnet engagement portions 69 are not included.

(27) The rotor core 52 includes a stack of the main rotor core sheets 67*a* at one axial end (upper side in FIGS. 24 and 26), and a stack of the auxiliary rotor core sheets 67*b* at the other axial end (lower side in FIGS. 24 and 26). Thus, for example, compared to when the auxiliary rotor core sheets 67*b* are stacked at both axial ends, the structure is simplified and manufacturing is facilitated.

The fourth embodiment may be modified as described below.

In the above embodiment, the rotor core 52 includes the stack of the main rotor core sheets 67*a* at one axial end and the stack of the auxiliary rotor core sheets 67*b* at the other axial end. Instead, the main rotor core sheets 67*a* and the auxiliary rotor core sheets 67*b* may be stacked in a different combination.

Figure 28:
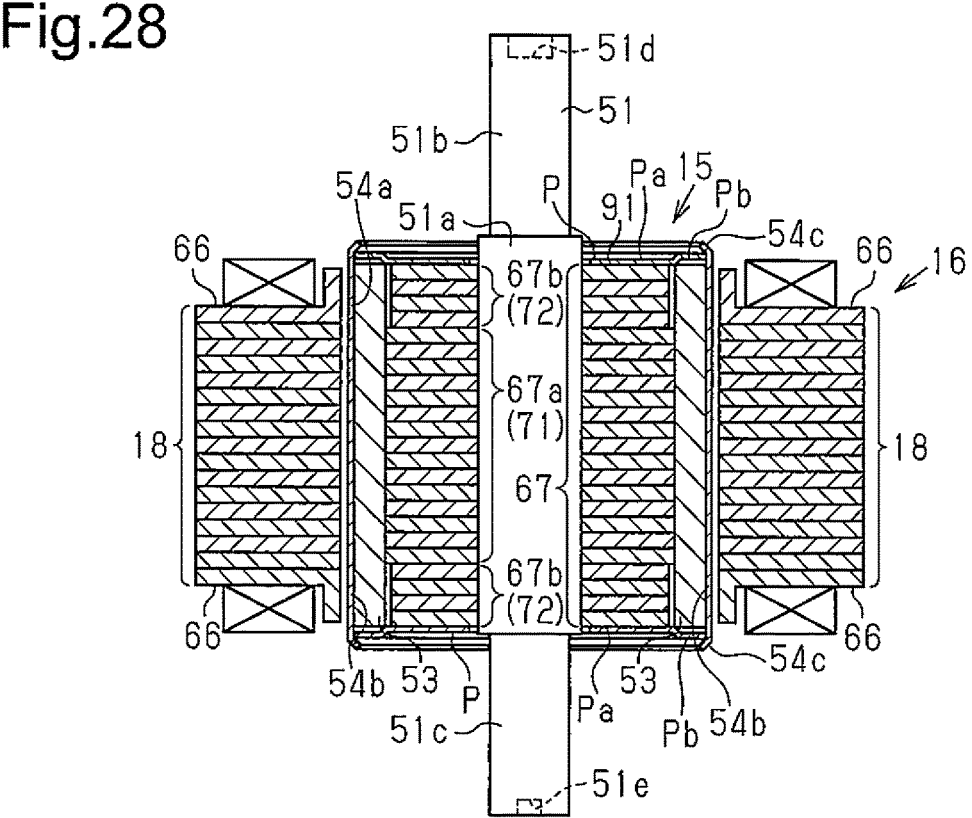
FIG. 28 is a cross-sectional view of a stator core and a rotor in a further example of the fourth embodiment.

For example, as shown in FIG. 28, a rotor core 91 may include a stack of the main rotor core sheets 67*a* (engagement sheets) at the axially middle portion and stacks of the auxiliary rotor core sheets 67*b* (non-engagement sheets) at the two axial ends in a symmetric manner with respect to the center in the axial direction.

This allows for satisfactory balance during rotation, and the magnet engagement portions 69 restrict circumferential displacement of the permanent magnets 53 in a well-balanced manner.

Further, in this example (FIG. 28), there is only one (non-separated) knurled portion 51*a* that is longer than the rotor core 91 in the axial direction. More specifically, the rotation shaft 51 (knurled portion 51*a*) is press-fitted over a range that is equal to the axial length of the rotor core 91. In this manner, there is no limit to the above embodiment, and the structure may be modified in such a manner.

In the above embodiment, the high hardness portion 71 is longer in the axial direction than the low hardness portion 72 but instead have the same axial length as the low hardness portion 72 or be shorter in the axial direction than the low hardness portion 72.

The manufacturing method of the above embodiment may be modified. For example, the main rotor core sheets 67a are punched together with the stator core sheets 18 (inner side of stator core sheets 18) but may instead be punched from different sheets. Further, for example, the non-magnetic cover 54 is press-fitted to the rotor core 52 from the high hardness portion 71 formed by the main rotor core sheets 67a but may instead be press fitted to the rotor core 52 from the low hardness portion 72.

In the above embodiment, the main rotor core sheets 67a are engagement sheets including the magnet engagement portions 69 that engage the permanent magnets 53 in the circumferential direction but may instead be non-engagement sheets that are less the magnet engagement portions 69 (for example, have simple circular shape).

In the above embodiment, the rotation shaft 51 includes the two knurled portions 51a that serve as the press-fitted portion and has a large diameter. Instead, the rotation shaft may include three or more knurled portions 51a.

Figure 29:
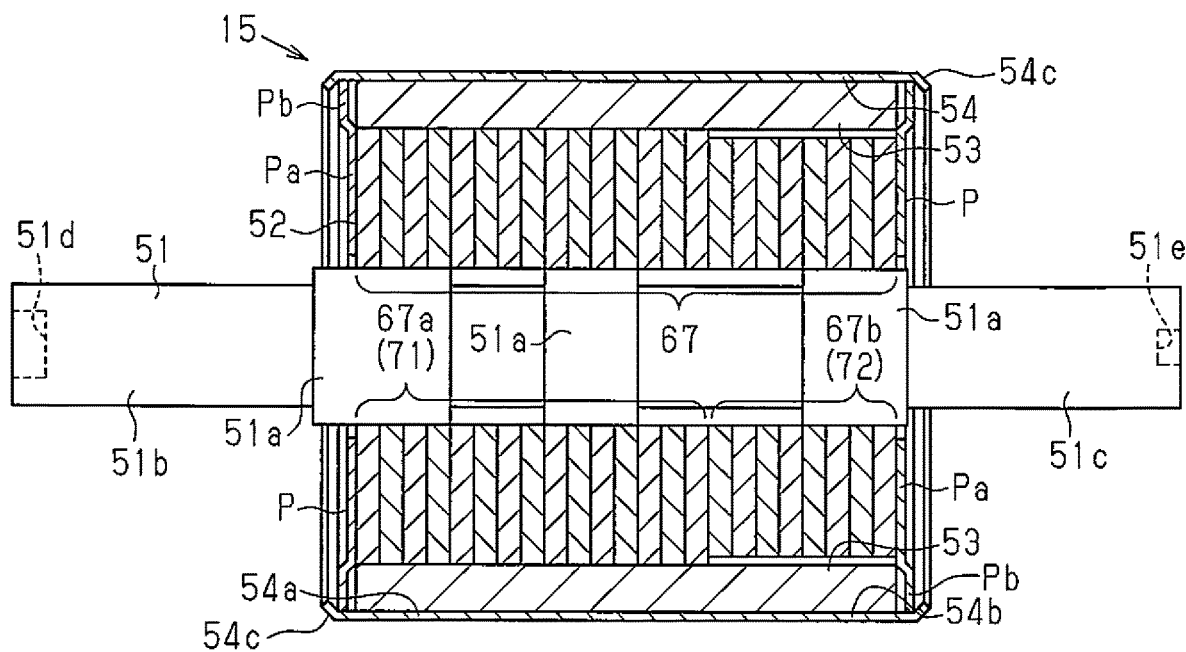
FIG. 29 is a cross-sectional view of a rotor in a further example of the fourth embodiment.

For example, a modification may be made as shown in FIG. 29. The rotation shaft 51 of this example includes three knurled portion 51a that are separated in the axial direction and serve as press-fitting portions. The knurled portions 51a at the two ends are press-fitted to include the two ends of the rotor core 52, and the middle knurled portion 51a is press-fitted to the axially middle portion of the high hardness portion 71. This obtains the same advantages as the fourth embodiment.

In the above embodiment, the rotor core 52 has a uniform inner diameter, and the rotation shaft 51 includes a plurality of the knurled portions 51a having a large diameter and serving as the press-fitted portions in the axial direction but may have a different structure as long as the rotation shaft 51 may be press-fitted into the rotor core 52 over a range that is shorter than the axial length of the rotor core 52.

Figure 30:
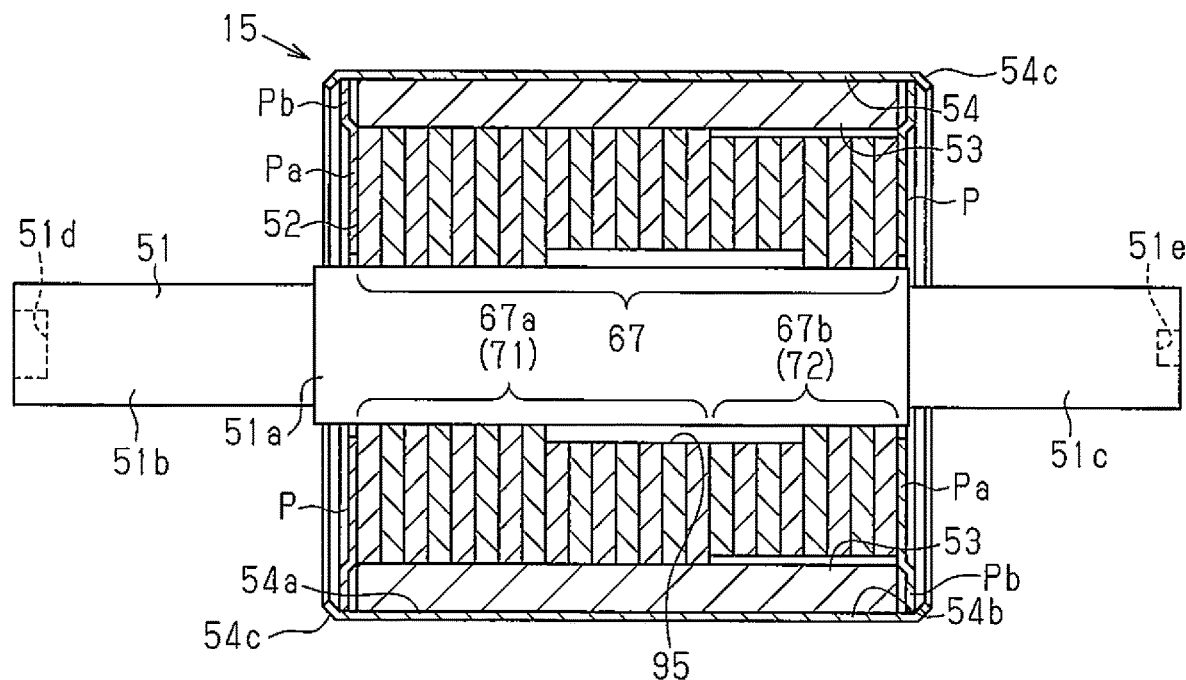
FIG. 30 is a cross-sectional view of a rotor in a further example of the fourth embodiment.

For example, a modification may be made as shown in FIG. 30. In this example, the rotation shaft 51 includes the knurled portion 51a that is longer than the rotor core 52 in the axial direction. The rotor core 52 includes a press-fit receiving portion 95 having a small inner diameter so that the rotation shaft 51 (the knurled portion 51a) is press-fitted into the rotor core 52 over a range that is shorter than the axial length of the rotor core 52. In detail, in this example, the press-fit receiving portion 95 is formed in the high hardness portion 71 (main rotor core sheets 67a) at the side of the low hardness portion 72, and the press-fit receiving portion 95 is formed in the low hardness portion 72 (auxiliary rotor core sheets 67b) at the side of the high hardness portion 71.

Figure 31:
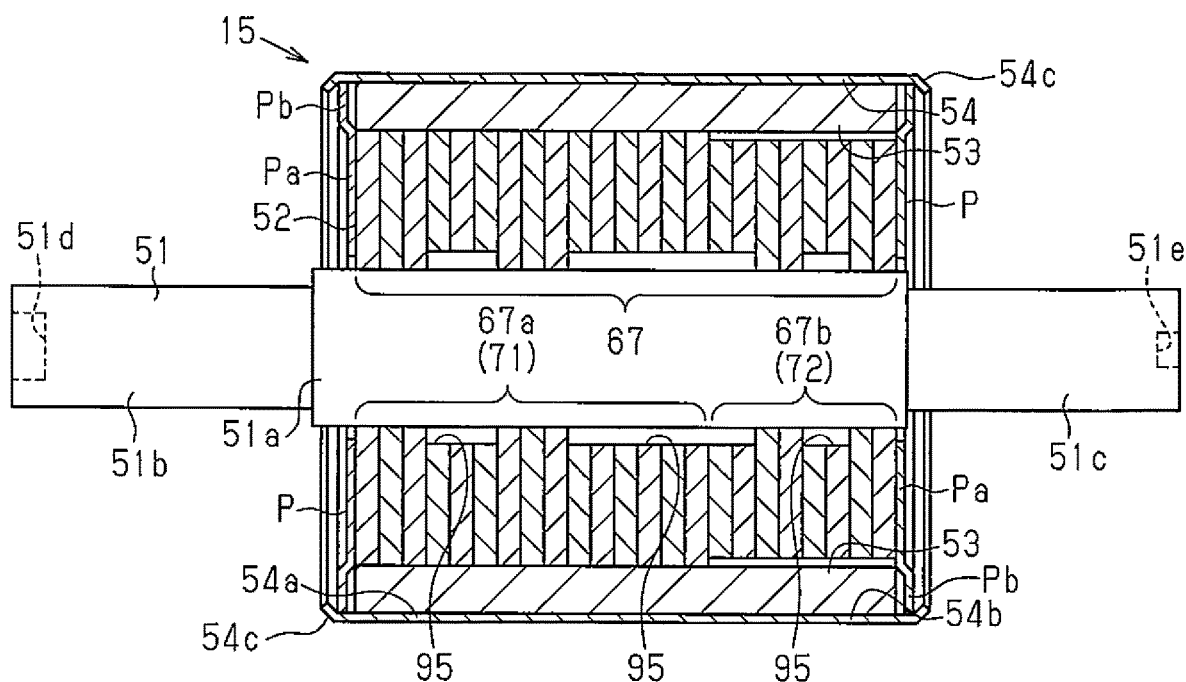
FIG. 31 is a cross-sectional view of a rotor in a further example of the fourth embodiment.

Further, for example, a modification may be made as shown in FIG. 31. In this example, a press-fit receiving portion 95 is formed in the high hardness portion 71 (main rotor core sheets 67a) at an axially middle part and at the side of the low hardness portion 72. Further, a press-fit receiving portion 95 is formed in the low hardness portion 72 (auxiliary rotor core sheets 67b) at an axially middle part and at the side of the high hardness portion 71.

Such structures set a uniform outer diameter for the rotation shaft 51 (knurled portion 51a) and facilitates manufacturing, while allowing the rotation shaft 51 to be press-fitted into the rotor core 52, which has a uniform outer diameter, over a range that is shorter than the axial length of the rotor core 52.

In the above embodiment, the rotation shaft 51 (the knurled portion 51a) is press-fitted and fixed to the two ends (range including two ends) of the rotor core 52. Instead of press-fitting the rotation shaft 51 to the two ends (range including two ends) of the rotor core 52, the rotation shaft 51 may be press-fitted to the axially middle portion of the rotor core 52.

In the above embodiment, the rotation shaft 51 (knurled portions 51a) is press-fitted and fixed to the rotor core 52 at a range excluding the boundary of the high hardness portion 71 and the low hardness portion 72. Instead, the rotation shaft 51 (knurled portions 51a) may be press fitted to a range including the boundary of the high hardness portion 71 and the low hardness portion 72.

In the above embodiment, the portion of the rotation shaft 51 press-fitted into the rotor core 52 undergoes knurling to form the knurled portion 51a. Instead, for example, the press-fitted portion may have a difference shape such as a serrated shape, a splined shape, or the shape of a true circle.

In the above embodiment, the low hardness portion 72 (auxiliary rotor core sheets 67b) has a smaller outer diameter than the high hardness portion 71 (main rotor core sheets 67a). Instead, for example, the low hardness portion 72 and the high hardness portion 71 may have the same outer diameter.

In the above embodiment, the main rotor core sheets 67a are engagement sheets including the magnet engagement portions 69 that engage the permanent magnets 53 in the circumferential direction but instead may be non-engagement sheets that are less the magnet engagement portions 69 (for example, have simple circular shape).

In the above embodiment, the main rotor core sheets 67a (engagement sheets) including the magnet engagement portions 69 are formed from a material having a higher hardness than the auxiliary rotor core sheets 67b (non-engagement sheets). Instead, for example, the main rotor core sheets 67a (engagement sheets) may be formed from a material having a lower hardness or the same hardness.

The rotation shaft 51 (knurled portion 51a) is press-fitted into the rotor core 52 from the low hardness portion 72 (auxiliary rotor core sheets 67b) but may instead be press-fitted into the rotor core 52 from the high hardness portion 71.

Technical concepts that may be acknowledged from the fourth embodiment and its modified examples will now be described.

(C) A method for manufacturing a motor wherein:
the main rotor core sheet is an engagement sheet including a magnet engagement portion that engages the permanent magnet in a circumferential direction; and
the auxiliary rotor core sheet is a non-engagement sheet that does not engage the permanent magnet in the circumferential direction.

In such a method, the main rotor core sheet is an engagement sheet including a magnet engagement portion that engages the permanent magnet in a circumferential direction. This restricts displacement of the permanent magnet in the circumferential direction. Further, the auxiliary rotor core sheet is a non-engagement sheet that does not engage the permanent magnet in the circumferential direction. The non-engagement sheet does not include the magnet engagement portion and occupies a small area. Thus, the non-engagement sheet has a higher yield than the engagement sheet. The yield may be increased as compared with when, for example, the rotor core sheets are all engagement sheets. In other words, the area of sheet metal punched to form the rotor core sheets may be decreased as compared with when the rotor core sheets are all engagement sheets. Further, the main rotor core sheets are punched together with the stator core sheets (inner side of stator core sheets), and the area of the sheet metal is the same regardless of whether or not the magnet engagement portion is included. Thus, even when the main rotor core sheet includes a magnet engagement portion, the yield does not decrease as compared with when manufacturing a main rotor core that does not include a magnet engagement portion.

(D) A rotor wherein:
the rotor core includes an axially middle portion, which is a stack of the engagement sheets, and two axial ends, which are stacks of the non-engagement sheets located at two opposite ends of the axially middle portion in the axial direction; and
the rotor core is configured to be symmetric with respect to an axial center.

The engagement sheets are stacked at the axially middle portion and the non-engagement sheets are stacked at the two axial ends direction so that the structure is configured to be symmetric with respect to the axial center. This obtains a well-balanced rotation and restricts displacement of the permanent magnets in a well-balanced manner.

(E) A rotor wherein the rotor core includes one axial end, which is a stack of the engagement sheets, and another axial end, which is located opposite to the one axial end and which is a stack of the non-engagement sheets.

In this structure, the rotor core is configured with the engagement sheets stacked at one axial end and the non-engagement sheets stacked at the other axial end. This simplifies the structure and facilitates manufacturing as compared with when the non-engagement sheets are stacked at the two axial ends.

A fifth embodiment of the present invention will now be described with reference to FIGS. 32 to 35. Elements that are the same as the first embodiment shown in FIGS. 1 to 12 and the second embodiment shown in FIGS. 13 to 16 will not be described.

Figure 32:
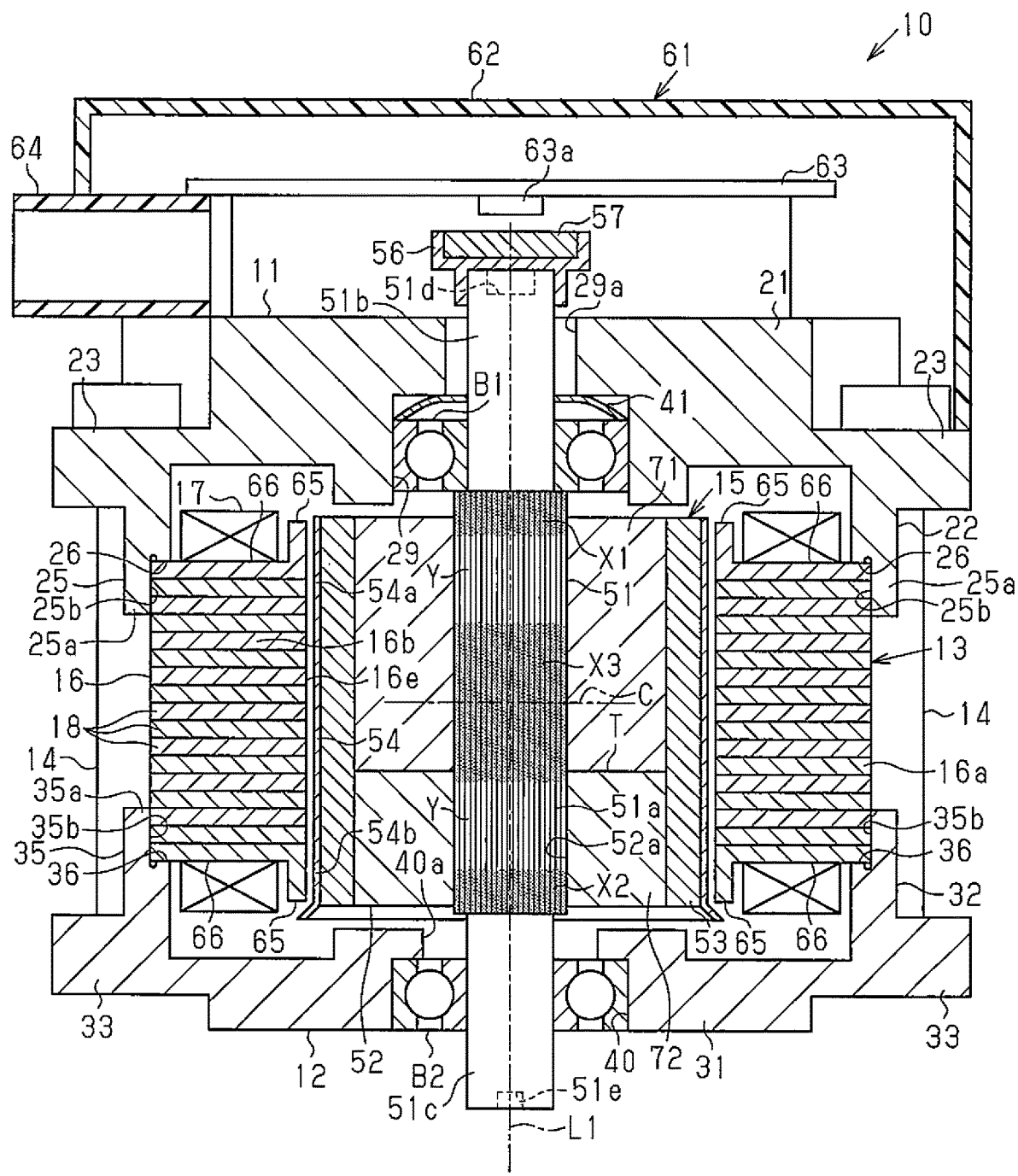
FIG. 32 is a schematic cross-sectional view showing the structure of a motor of a fifth embodiment.

As shown in FIG. 32, in the present embodiment, the knurled portion 51a is continuously formed in the axial direction at the axially middle portion of the rotation shaft 51. The knurled portion 51a is longer in the axial direction than the rotor core hole (press-fitting bore 52a), and the two axial ends of the knurled portion 51a respectively project from the two axial ends of the press-fitting bore 52a of the rotor core 52. That is, in the rotation shaft 51, the knurled portion 51a extends continuously and over the entire press-fitting bore 52a in the axial direction. The two axial ends of the knurled portion 51a respectively define tapered portions 51f and 51g that are reduced in diameter toward the outer side in the axial direction (refer to FIG. 34). FIG. 34 shows the tapered portions 51f and 51g in an exaggerated manner to aid understanding.

As shown in FIG. 32, the knurled portion 51a located at the axially middle portion of the outer circumferential surface of the rotation shaft 51 includes three quenched sections X1 to X3 spaced apart from one another in the axial direction. The quenched sections X1 to X3 are each formed by quenching the entire circumference of the knurled portion 51a at predetermined locations of the knurled portion 51a. In detail, the two axial ends of the knurled portion 51a respectively include the end quenched sections X1 and X2. In the knurled portion 51a, the end quenched section formed at the end of the longer non-knurled portion 51b including the groove 51d, which is circular and has a larger diameter, defines the first end quenched section X1, and the end quenched section formed at the opposite axial end defines the second end quenched section X2. The middle of the knurled portion 51a in the axial direction includes the middle quenched section X3. The end quenched sections X1 and X2 and the middle quenched section X3 are spaced apart from one another. More specifically, the knurled portion 51a includes non-quenched sections Y that are not quenched between the end quenched sections X1 and X2 and the middle quenched section X3. In the drawings, the quenched sections X1 to X3 are shaded. The quenched sections X1 to X3 are quenched to have a higher surface hardness than the non-quenched sections Y.

The quenched sections X1 to X3 are arranged to be symmetric with respect to the axial center C of the knurled portion 51a. That is, the end quenched sections X1 and X2 have equal axial lengths. Further, the non-quenched sections Y have equal axial lengths. The axial center position of the middle quenched section X3 coincides with the axial center C of the knurled portion 51a.

When the knurled portion 51a is press-fitted to and fixed to the press-fitting bore 52a, the first end quenched section X1 is press-fitted in a range including one axial end of the press-fitting bore 52a and located at the inner side of the one axial end of the press-fitting bore 52a. In this state, the second end quenched section X2 is press-fitted in a range including the other axial end of the press-fitting bore 52a and located at the inner side of the other axial end of the press-fitting bore 52a. Further, in this state, the middle quenched section X3 is press-fitted in a range including the boundary T of the high hardness portion 71 and the low hardness portion 72 in the rotor core 52 and located at the inner side of the boundary T. That is, the middle quenched section X3 extends over the high hardness portion 71 and the low hardness portion 72.

In the present embodiment, the quenched sections X1 to X3 are formed by, for example, performing induction hardening that heats the surface of the knurled portion 51a utilizing electromagnetic induction resulting from high-frequency electromagnetic waves. The quenching depth (hardened layer depth) of each of the quenched sections X1 to X3 will now be described with reference to FIG. 34. As shown in the drawing, the quenching depth of the middle quenched section X3 is greatest at the axial center of the middle quenched section X3 (axial center C of knurled portion 51a), gradually decreased toward the two axial ends of the middle quenched section X3, and smallest at the two axial ends. The peak position (deepest position) for the quenching depth of the first end quenched section X1 is located at the inner side of the tapered portion 51f formed at one axial end of the knurled portion 51a, and the quenching depth of the first end quenched section X1 decreases from the peak position toward the two axial sides. In the same manner, the peak position (deepest position) for the quenching depth of the second end quenched section X2 is located at the inner side of the tapered portion 51g formed at the other axial end of the knurled portion 51a, and the quenching depth of the second end quenched section X2 decreases from the peak position toward the two axial ends.

A method for manufacturing the rotor 15 will now be described.

In the present embodiment, the method for manufacturing the rotor 15 includes the "shaft press-fitting step," the "non-magnetic cover forming step," and the "cover press-fitting step."

Figure 33:
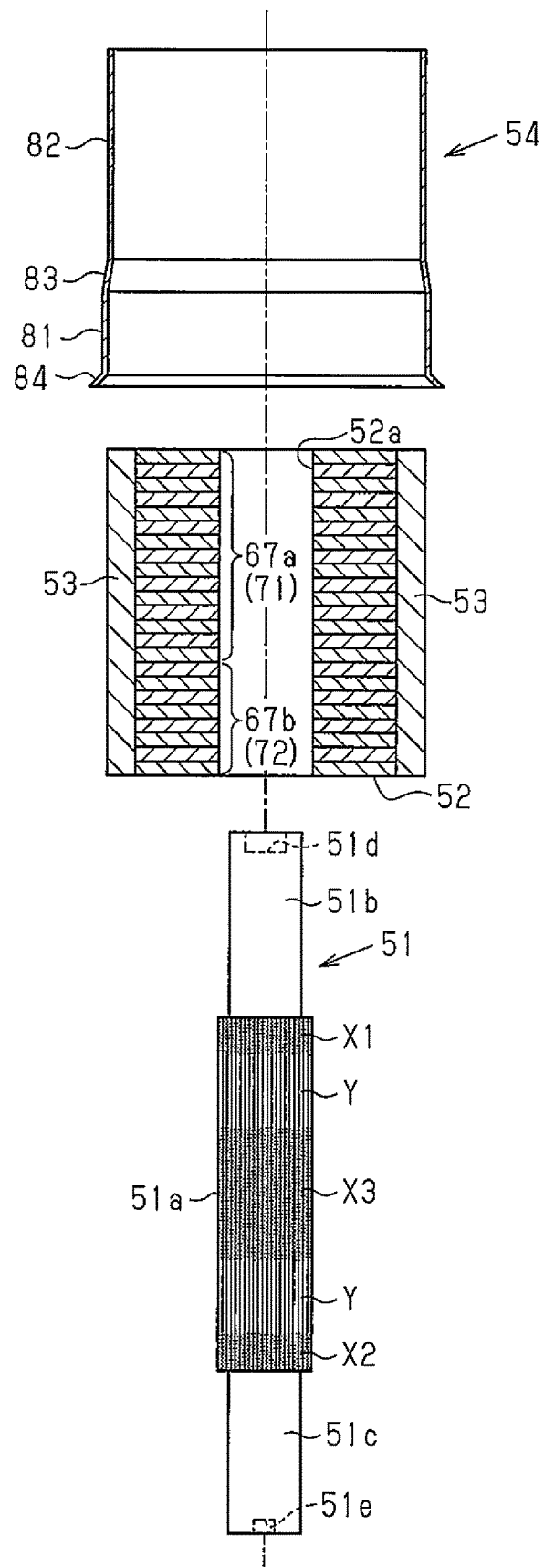
FIG. 33 is a diagram illustrating a method for manufacturing a rotor shown in FIG. 32.

As shown in FIG. 33, in the "shaft press-fitting step," the rotation shaft 51 is inserted into the rotor core 52 from the low hardness portion 72 to press-fit the knurled portion 51a, which has been configured in advance as described above.

Here, the rotation shaft 51 is inserted into the rotor core 52 from the longer non-knurled portion 51b, which includes the circular groove 51d having a large diameter at one axial end (upper end in FIG. 33).

The knurled portion 51a is press-fitted into the press-fitting bore 52a of the rotor core 52 with the end near the non-knurled portion 51b, namely, the first end quenched section X1, in front. The first end quenched section X1 has undergone quenching and has a higher hardness than the non-quenched sections Y. Thus, when press-fitting the knurled portion 51a, the ridges in the knurled shape of the first end quenched section X1 bite into the wall surface of the press-fitting bore 52a so as to enlarge the diameter. This limits unintentional axial deformation of the press-fitting bore 52a (press-fitting bore of each rotor core sheet 67) of the rotor core 52 when press-fitting the knurled portion 51a. Further, the first end quenched section X1, not a non-quenched section, is located at the front when performing press-fitting. This limits axial deformation of the press-fitting bore 52a.

When press-fitting the non-quenched section Y between the first end quenched section X1 and the middle quenched section X3, the first end quenched section X1 that has already been press-fitted, enlarges the diameter of the press-fitted portion of the press-fitting bore 52a and reduces axial deformation. When the part (axial length) of the non-quenched section Y is long and continuous, the non-quenched section Y may deform the press-fitting bore 52a in the axial direction. In the present embodiment, the middle quenched section X3 is located between the end quenched sections X1 and X2. This divides the non-quenched section Y into two with the middle quenched section X3. Thus, the non-quenched section Y is not long and continuous, and the non-quenched sections Y limit axial deformation of the press-fitting bore 52a.

In the present embodiment, the "non-magnetic cover forming step" and the "cover press-fitting step" are the similar to the "non-magnetic cover forming step" and the "cover press-fitting step" of the second embodiment and thus will not be described.

The advantages of the fifth embodiment will now be described.

(28) The rotor 15 includes the rotor core 52, in which the rotor core sheets 67 are stacked in the axial direction, and the rotation shaft 51, which includes the knurled portion 51a, which is press-fitted into and fixed to the press-fitting bore 52a of the rotor core 52. The knurled portion 51a includes axial portions defining the quenched sections X1 to X3. The quenched sections X1 to X3 of the knurled portion 51a are quenched and have a high hardness. Thus, when press-fitting the knurled portion 51a, unintentional axial deformation of the press-fitting bore 52a (press-fitting bore of each rotor core sheet 67) of the rotor core 52 is limited.

When the knurled portion 51a is entirely quenched in the axial direction, deformation in a direction orthogonal to the axis (axial bending) may occur in the knurled portion 51a in a prominent manner. In the present embodiment, the quenched sections X1 to X3 are formed in parts of the knurled portion 51a in the axial direction (i.e., non-quenched sections Y arranged in knurled portion 51a). This limits deformation of the knurled portion 51a in a direction orthogonal to the axis and reduces adverse effects on the straightness of the rotation shaft 51.

(29) The knurled portion 51a is formed continuously by the entire axial portion of the rotation shaft 51 located in the press-fitting bore 52a of the rotor core 52. In this structure, the rotation shaft 51 includes the knurled portion 51a defined by the entire portion press-fitted to the rotor core 52 in the axial direction. This increases the fixing strength of the rotation shaft 51 and the rotor core 52.

(30) The first end quenched section X1 is located at the axial end of the knurled portion 51a. This configuration allows the first end quenched section X1 to be press-fitted first when press-fitting the knurled portion 51a into the press-fitting bore 52a of the rotor core 52 in the axial direction. Thus, axial deformation in the press-fitting bore 52a of the rotor core 52 may be limited. Further, only the first end quenched section X1 is press-fitted (no passage of non-quenched section Y) at the exit side end of the press-fitting bore 52a. This reduces the formation of burrs or the like at the exit side end of the press-fitting bore 52a.

(31) The end quenched sections X1 and X2 are respectively located at the two axial ends of the knurled portion 51a. Thus, for example, the formation of burrs or the like are limited at the two axial ends of the press-fitting bore 52a.

(32) The quenched sections X1 to X3 are spaced apart from one another in the axial direction. In this structure, the quenched sections X1 to X3 and the non-quenched sections Y are well-balanced in the knurled portion 51a. As a result, axial deformation in the press-fitting bore 52a of the rotor core 52 and deformation of the knurled portion 51a in a direction orthogonal to the axis are both limited.

(33) The rotor core 52 includes the high hardness portion 71, which is formed by the main rotor core sheets 67a having a high hardness, and the low hardness portion 72, which is formed by the auxiliary rotor core sheets 67b that have a lower hardness than the main rotor core sheets 67a, arranged in the axial direction. The knurled portion 51a is fixed to the press-fitting bore 52a, with the middle quenched section X3 press-fitted to the range including the boundary T between the high hardness portion 71 and the low hardness portion 72. In this structure, when press-fitting the knurled portion 51a, deformation of the press-fitting bore 52a in the axial direction has a tendency to occur at the boundary T between the high hardness portion 71 and the low hardness portion 72 in the rotor core 52. However, the middle quenched section X3 of the knurled portion 51a is arranged in correspondence with the boundary T. This limits axial deformation of the press-fitting bore 52a at the boundary T.

(34) The knurled portion 51a is press-fitted into the press-fitting bore 52a of the rotor core 52 from the low hardness portion 72 (auxiliary rotor core sheets 67b). This reduces the formation of burrs as compared with performing press-fitting from the high hardness portion 71.

The fifth embodiment may be modified as described below.

In the above embodiment, the knurled portion 51a includes the three quenched sections X1 to X3 but may instead include two or less quenched sections or four or more quenched sections.

In the above embodiment, the knurled portion 51a is fixed to the press-fitting bore 52a with the middle quenched section X3 press-fitted to the range including the boundary T of the high hardness portion 71 and the low hardness portion 72 but instead may be fixed with the non-quenched section Y press-fitted to the range including the boundary T. Further, the second end quenched section X2 (or first end quenched section X1) may be press-fitted and fixed to the range including the boundary T.

In the above embodiment, the quenched portions (end quenched portions X1 and X2) are formed at the axial ends of the knurled portion 51a. Instead, quenching may be performed on only the axial middle section of the knurled portion 51a.

In the above embodiment, the knurled portion 51*a* is formed continuously in the axial direction by the portion of the rotation shaft 51 located in the press-fitting bore 52*a* of the rotor core 52. Instead, for example, the knurled portion 51*a* may be shorter in the axial direction than the press-fitting bore 52*a*.

In the above embodiment, with regard to the axial lengths of the quenched sections X1 to X3, the end quenched portions X1 and X2 have the same length in the axial direction, and the middle quenched section X3 is longer than the end quenched portions X1 and X2. Instead, for example, as shown in FIG. 35, the quenched sections X1 to X3 may have the same axial length D. In the illustrated structure, the non-quenched sections Y between the quenched sections X1 to X3 have the same axial length. Further, when the structure of the knurled portion 51*a* shown in FIG. 35 is press-fitted and fixed to the rotor core 52, the quenched sections X1 to X3 of the knurled portion 51*a* are each press-fitted to a range excluding the boundary T of the high hardness portion 71 and the low hardness portion 72. Further, in this state, it is preferred that the non-quenched section Y between the second end quenched section X2 and the middle quenched section X3 be press-fitted to the range including the boundary T so that the boundary T is located at the generally middle part of the non-quenched section Y in the axial direction.

The quenched sections X1 to X3 may have generally the same hardness (quenching depth). Alternatively, the first end quenched section X1 may have the greatest hardness (quenching depth) and the hardness may be decreased in the order of the middle quenched section X3 and the second end quenched section X2 so that the quenched sections X1 to X3 each have a different hardness.

The quenched sections X1 to X3 do not have to be formed through induction hardening and may be formed through, for example, flame hardening.

In the "shaft press-fitting step" of the above embodiment, the knurled portion 51*a* is press-fitted from the low hardness portion 72 but may instead be press-fitted from the high hardness portion 71.

The above embodiments and the modifications may be combined.

The invention claimed is:

1. A method for manufacturing a motor including a rotor, the rotor including:
   a rotor core;
   permanent magnets arranged on an outer surface of the rotor core in a circumferential direction, wherein the permanent magnets each have a curved outer surface as viewed in an axial direction; and
   a tubular non-magnetic cover that covers the outer surfaces of the permanent magnets, wherein
   the rotor core includes at least two stacked cores,
   the stacked cores each include a stack of core sheets, and
   one of the stacked cores is formed from a material having a lower hardness than another one of the stacked cores,
   the method comprising:
   pressing and punching sheet metal to form stator core sheets and rotor core sheets;
   stacking the stator core sheets to form a stator core; arranging an axial extension on an axial end of the stator core to oppose the rotor core over an increased area; stacking the rotor core sheets, which are greater in number than the stator core sheets, to oppose the stator core including the axial extension and form the rotor core; and press-fitting a rotation shaft into the rotor core;
   wherein main rotor core sheets, the number of which is the same as the stator core sheets, are punched and formed together with the stator core sheets;
   auxiliary rotor core sheets, the number of which corresponds to the rotor core sheets that are lacking, are formed by punching sheet metal having a lower hardness than a material of the stator core sheets;
   the main rotor core sheets and the auxiliary rotor core sheets are stacked to form the rotor core; and
   the rotation shaft is press-fitted into the rotor core from the auxiliary rotor core sheets stacked on one axial end of the rotor core.

2. The method according to claim 1, wherein
   the stator core sheets and the main rotor core sheets are formed by punching magnetic steel sheets, and
   the auxiliary rotor core sheets are formed by punching cold rolled steel sheets.

3. The method according to claim 1, wherein the rotation shaft is formed from a harder metal material than the auxiliary rotor core sheets.

4. The method according to claim 1, wherein
   main rotor core sheets, the number of which is the same as the stator core sheets, are formed by punching an inner side of the stator core sheets; and
   auxiliary rotor core sheets, the number of which corresponds to the rotor core sheets that are lacking, are formed by punching an inner side of stator core sheets of another motor.

5. The method according to claim 4, wherein the auxiliary rotor core sheets are punched and formed together with stator core sheets of a Lundell motor.

6. A method for manufacturing a rotor, the rotor including:
   a rotor core;
   permanent magnets arranged on an outer surface of the rotor core in a circumferential direction, wherein the permanent magnets each have a curved outer surface as viewed in an axial direction; and
   a tubular non-magnetic cover that covers the outer surfaces of the permanent magnets, wherein
   the rotor core includes at least two stacked cores,
   the stacked cores each include a stack of core sheets,
   one of the stacked cores is formed from a material having a lower hardness than another one of the stacked cores, and
   the permanent magnets each include an outer surface that extends so that a distance from an axis of the rotor to a circumferentially middle portion of the outer surface is longer than distances from the axis to two circumferential ends of the outer surface,
   the method comprising:
   forming the non-magnetic cover in which a large-diameter portion and a small-diameter portion are arranged in an axial direction, the large-diameter portion having an inner diameter that is larger than an inner diameter of the small-diameter portion; and
   press-fitting the non-magnetic cover to the rotor core when the permanent magnets are in contact with the outer surface of the rotor core so that an inner surface of the large-diameter portion and an inner surface of the small-diameter portion are both in contact with the outer surfaces of the permanent magnets.

7. The method according to claim 6, wherein the non-magnetic cover is press-fitted to the rotor core from the large-diameter portion.

8. The method according to claim 7, wherein forming the non-magnetic cover includes forming a diameter decreasing portion in which the inner diameter gradually decreases between the large diameter portion and the small diameter portion.

9. The method according to claim 7, wherein:
the high hardness portion and the low hardness portion are arranged in the axial direction; and
the non-magnetic cover is press-fitted to the rotor core from the high hardness portion.

10. A method for manufacturing a motor including a rotor, the rotor including:
a rotor core;
permanent magnets arranged on an outer surface of the rotor core in a circumferential direction, wherein the permanent magnets each have a curved outer surface as viewed in an axial direction; and
a tubular non-magnetic cover that covers the outer surfaces of the permanent magnets, wherein
the rotor core includes at least two stacked cores,
the stacked cores each include a stack of core sheets, and
one of the stacked cores is formed from a material having a lower hardness than another one of the stacked cores,
the method comprising:
pressing and punching sheet metal to form stator core sheets and rotor core sheets;
stacking the stator core sheets to form a stator core;
arranging an axial extension on an axial end of the stator core to oppose the rotor core over an increased area; and
stacking the rotor core sheets, which are greater in number than the stator core sheets, to oppose the stator core including the axial extension and form the rotor core;
wherein main rotor core sheets, the number of which is the same as the stator core sheets, are punched and formed together with the stator core sheets;
auxiliary rotor core sheets, the number of which corresponds to the rotor core sheets that are lacking, are formed by punching sheet metal having a lower hardness than a material of the stator core sheets, and the auxiliary rotor core sheets have a smaller outer diameter than the main rotor core sheets;
the main rotor core sheets and the auxiliary rotor core sheets are stacked to form the rotor core;
the rotation shaft is fixed to the rotor core from a portion where the auxiliary rotor core sheets are stacked; and
the tubular non-magnetic cover is press-fitted with the permanent magnets in contact with the outer surface of the rotor core.

11. The method according to claim 10, wherein the non-magnetic cover is press-fitted to the rotor core from the main rotor core sheets stacked on another axial end of the rotor core.

* * * * *